(12) United States Patent
Hokuto et al.

(10) Patent No.: US 12,459,467 B2
(45) Date of Patent: Nov. 4, 2025

(54) PEDAL DEVICE

(71) Applicant: DENSO CORPORATION, Kariya (JP)

(72) Inventors: Daisuke Hokuto, Kariya (JP); Etsugo Yanagida, Kariya (JP); Yuki Matsunaga, Kariya (JP); Masashi Arao, Kariya (JP); Atsushi Nishimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/911,761

(22) Filed: Oct. 10, 2024

(65) Prior Publication Data
US 2025/0033607 A1 Jan. 30, 2025

Related U.S. Application Data

(63) Continuation of application No. PCT/JP2023/016165, filed on Apr. 24, 2023.

(30) Foreign Application Priority Data

Apr. 29, 2022 (JP) ................. 2022-075563
Aug. 11, 2022 (JP) ................. 2022-128554

(51) Int. Cl.
B60T 7/06 (2006.01)
B60K 26/02 (2006.01)
(Continued)

(52) U.S. Cl.
CPC ............... *B60T 7/06* (2013.01); *G05G 1/44* (2013.01); *G05G 5/03* (2013.01); *G05G 5/05* (2013.01);
(Continued)

(58) Field of Classification Search
CPC .. G05G 1/30; G05G 1/38; G05G 1/44; G05G 5/03; G05G 5/05; G05G 2505/00;
(Continued)

(56) References Cited

U.S. PATENT DOCUMENTS 9,139,168 B2 * 9/2015 Jeon ...................... B60T 7/04
9,141,129 B2 * 9/2015 Kim ...................... G05G 5/03
(Continued)

FOREIGN PATENT DOCUMENTS

CN 106853817 A * 6/2017 ............ B60T 13/745
CN 107139904 A * 9/2017 ................ B60T 7/06
(Continued)

OTHER PUBLICATIONS

U.S. Appl. No. 18/909,781 to Makoto Shigematsu, filed Oct. 8, 2024 (118 pages).
(Continued)

*Primary Examiner* — Adam D Rogers
(74) *Attorney, Agent, or Firm* — Nixon & Vanderhye P.C.

(57) ABSTRACT

At a pedal device, a force applied from a pedal at a time of rotating the pedal moves a first guide portion of a first holder to slide relative to a second guide portion of a second holder in a vehicle front-rear direction, resulting in deformation of a first resilient member. Furthermore, the force applied from the pedal at the time of rotating the pedal moves the second guide portion to slide relative to a third guide portion of a guide member in the vehicle front-rear direction, resulting in deformation of a second resilient member.

41 Claims, 44 Drawing Sheets

(51) Int. Cl.
*G05G 1/30* (2008.04)
*G05G 1/44* (2008.04)
*G05G 5/03* (2008.04)
*G05G 5/05* (2006.01)
*B60T 7/04* (2006.01)
*G05G 1/38* (2008.04)

(52) U.S. Cl.
CPC ............. *B60K 26/021* (2013.01); *B60T 7/042* (2013.01); *G05G 1/38* (2013.01); *G05G 2505/00* (2013.01)

(58) Field of Classification Search
CPC ... B60T 7/042; B60T 7/06; B60T 8/17; B60K 26/021
See application file for complete search history.

(56) References Cited

U.S. PATENT DOCUMENTS

| | | | | |
|---|---|---|---|---|
| 9,358,964 | B2 * | 6/2016 | Ito | B60T 17/22 |
| 9,383,765 | B2 * | 7/2016 | Kim | B60T 8/4081 |
| 9,387,836 | B2 * | 7/2016 | Ryu | B60T 7/06 |
| 9,487,198 | B2 * | 11/2016 | Kim | B60T 8/409 |
| 10,571,949 | B2 * | 2/2020 | Isono | B60T 11/18 |
| 10,625,720 | B2 * | 4/2020 | Masuda | B60T 8/17 |
| 10,913,440 | B2 * | 2/2021 | Kim | B60T 8/4081 |
| 11,292,338 | B2 * | 4/2022 | Burke | B60T 8/3255 |
| 11,820,350 | B2 * | 11/2023 | Beuerle | B60T 7/06 |
| 12,090,980 | B2 * | 9/2024 | Wagner | B60T 11/18 |
| 12,269,452 | B2 * | 4/2025 | Hokuto | B60T 7/06 |
| 12,292,756 | B2 * | 5/2025 | Fukuda | B60T 7/04 |
| 12,296,672 | B2 * | 5/2025 | Fukuda | B60T 7/042 |
| 12,296,811 | B2 * | 5/2025 | Wagner | B60T 7/042 |
| 2014/0117602 | A1 | 5/2014 | Jeon | |
| 2023/0066640 | A1 * | 3/2023 | Nakagawa | B60T 8/409 |
| 2024/0059262 | A1 * | 2/2024 | Hokuto | B60T 8/17 |
| 2024/0375520 | A1 * | 11/2024 | Watanabe | B60T 13/586 |
| 2025/0026322 | A1 * | 1/2025 | Shigematsu | B60T 17/18 |
| 2025/0028346 | A1 * | 1/2025 | Hokuto | G05G 5/03 |
| 2025/0074370 | A1 * | 3/2025 | Fukuda | B60T 7/042 |
| 2025/0162548 | A1 * | 5/2025 | Shigematsu | G05G 25/04 |
| 2025/0165024 | A1 * | 5/2025 | Matsunaga | G05G 1/44 |

FOREIGN PATENT DOCUMENTS

| | | | | |
|---|---|---|---|---|
| DE | 102020204106 A1 | | 9/2021 | |
| EP | 2243655 A1 | * | 10/2010 | ............ B60T 7/042 |
| FR | 2567663 A2 | * | 1/1986 | ............ G05G 5/03 |
| KR | 20050010190 A | * | 1/2005 | |
| KR | 20060030263 A | * | 4/2006 | ............ G05G 1/30 |
| KR | 20190016665 A | * | 2/2019 | ............ B60T 8/409 |
| KR | 20230115767 A | * | 8/2023 | ............ G05G 1/30 |
| WO | WO-2010055842 A1 | * | 5/2010 | ............ B60T 8/4086 |
| WO | WO-2016066166 A1 | * | 5/2016 | ............ B60T 7/042 |
| WO | WO-2021197676 A1 | * | 10/2021 | ............ B60T 8/409 |
| WO | 2023210602 A1 | | 11/2023 | |

OTHER PUBLICATIONS

U.S. Appl. No. 18/909,341 to Daisuke Hokuto, filed Oct. 8, 2024 (89 pages).

* cited by examiner

FIG. 2
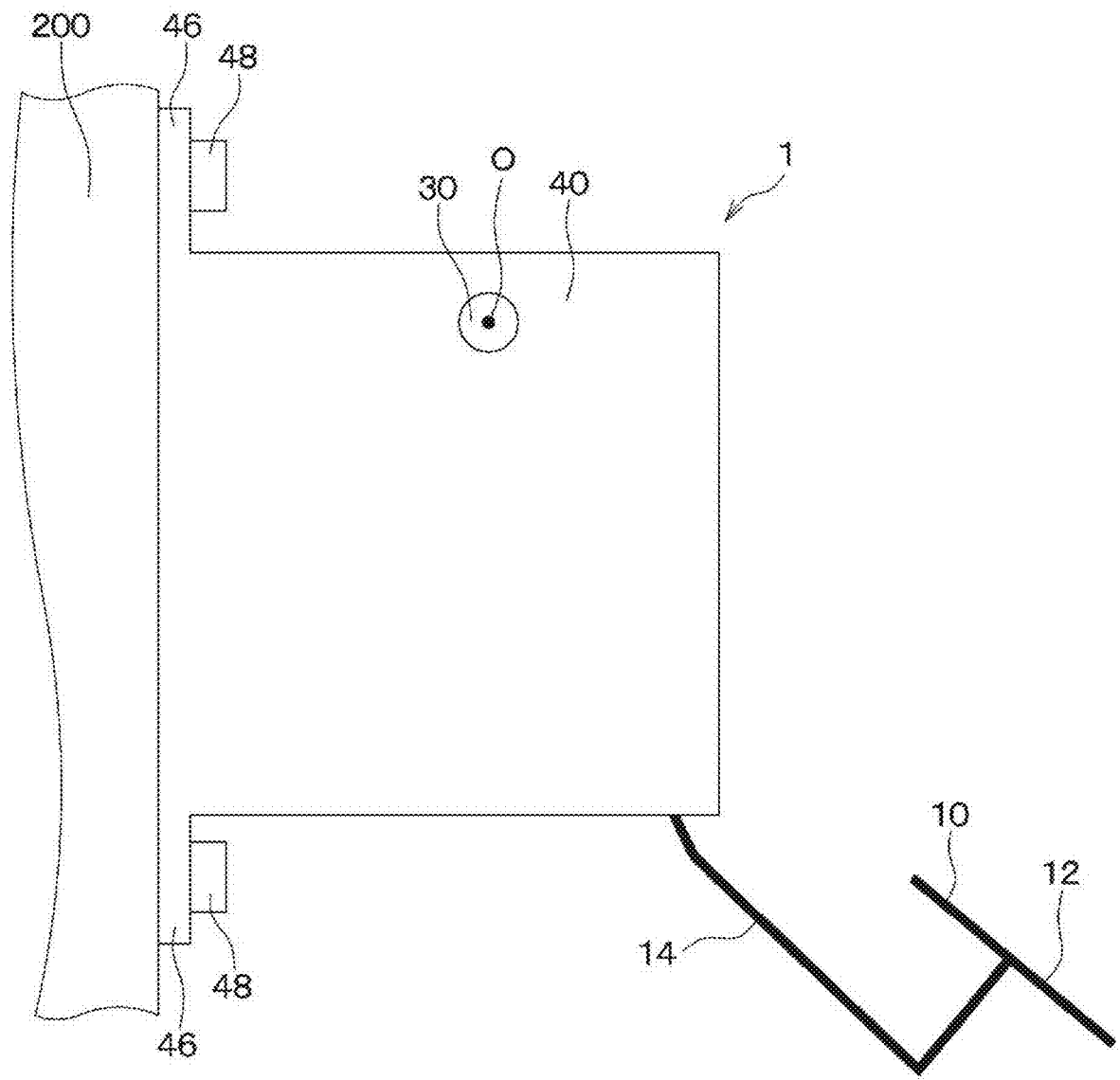
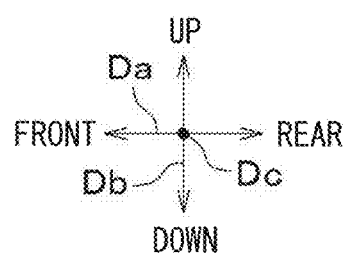

FIG. 3
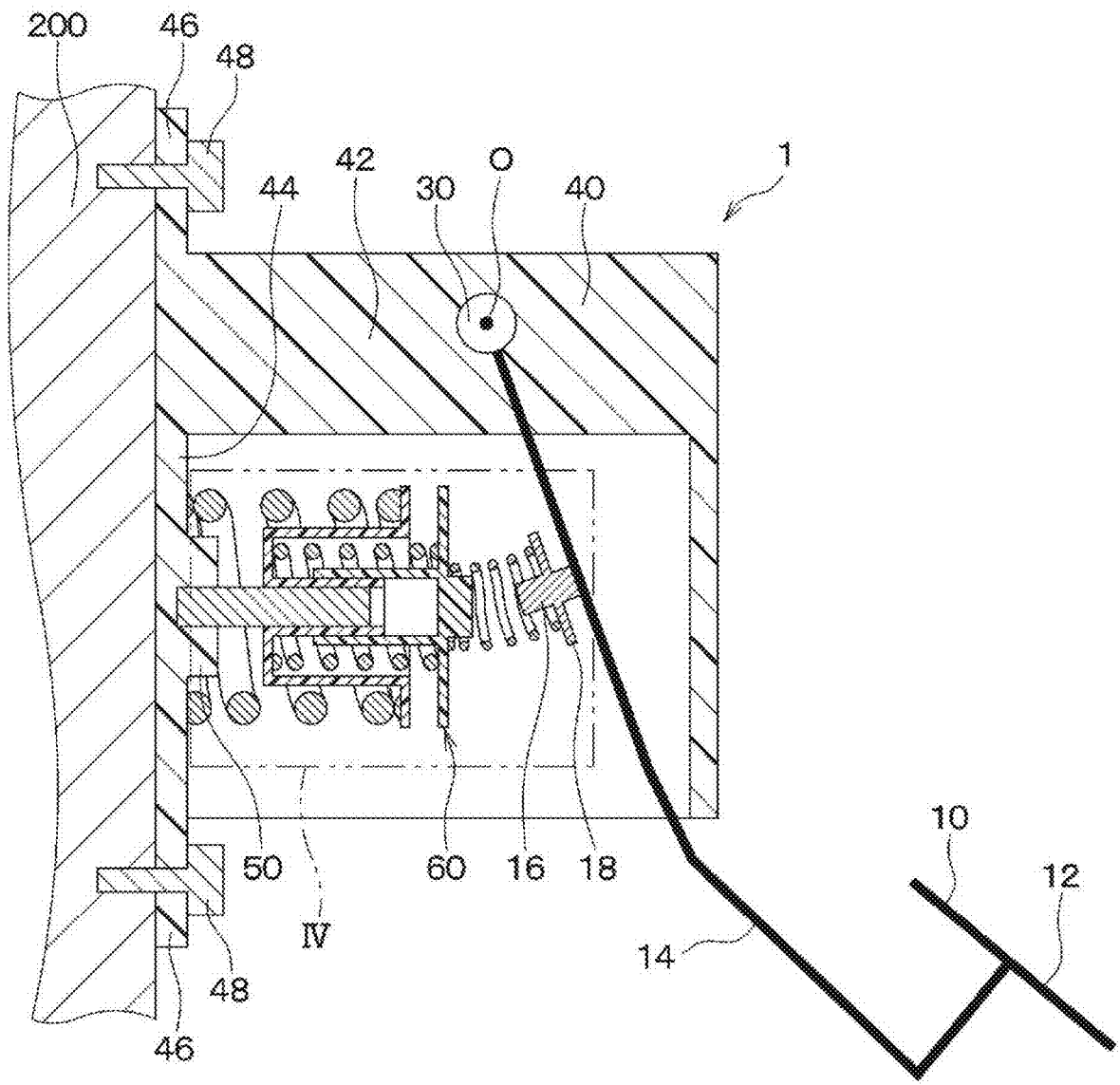
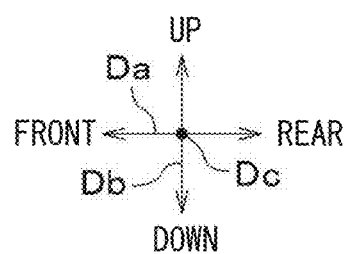

PEDAL DEVICE

CROSS REFERENCE TO RELATED APPLICATIONS

This application is a continuation application of International Patent Application No. PCT/JP2023/016165 filed on Apr. 24, 2023, which designated the U.S. and claims the benefit of priority from Japanese Patent Application No. 2022-075563 filed on Apr. 29, 2022 and Japanese Patent Application No. 2022-128554 filed on Aug. 11, 2022. The entire disclosures of all of the above applications are incorporated herein by reference.

TECHNICAL FIELD

The present disclosure relates to a pedal device.

BACKGROUND

There has been proposed a pedal simulator that includes a brake pedal, an actuating rod, a cylinder, a piston, a plurality of springs, and a plurality of spring seats. The actuating rod is coupled to the brake pedal. The actuating rod is inserted into the cylinder. The piston is placed at an inside of the cylinder such that the piston receives a force of the actuating rod. The springs are arranged in a multi-stage series form at the inside of the cylinder to support the piston. The spring seats are arranged at the inside of the cylinder such that the spring seats support springs, respectively.

SUMMARY

This section provides a general summary of the disclosure, and is not a comprehensive disclosure of its full scope or all of its features.

According to the present disclosure, there is provided a pedal device that includes a pedal, a first resilient member, a second resilient member, a first holder, a second holder, a fourth support portion and a third guide portion. The pedal is configured to rotate about a rotational axis when the pedal is pressed by an operator. The first holder includes a first support portion, which is placed adjacent to the pedal and supports one end part of the first resilient member, and a first guide portion, which extends from the first support portion in a deforming direction of the first resilient member. The second holder includes a second support portion, which supports another end part of the first resilient member opposite to the one end part of the first resilient member, a second guide portion which extends from the second support portion in the deforming direction of the first resilient member, and a third support portion that supports one end part of the second resilient member. The fourth support portion supports another end part of the second resilient member opposite to the one end part of the second resilient member. The third guide portion extends from the fourth support portion in a deforming direction of the second resilient member. The force applied from the pedal at the time of rotating the pedal moves the first guide portion in the deforming direction of the first resilient member to execute a relative movement of the first guide portion relative to the second guide portion, thereby causing the first guide portion to slide relative to the second guide portion in the deforming direction of the first resilient member, and resulting in the deformation of the first resilient member. The force applied from the pedal at the time of rotating the pedal moves the second holder in the deforming direction of the second resilient member to execute a relative movement of the second holder relative to the third guide portion, thereby causing the second holder to slide relative to the third guide portion in the deforming direction of the second resilient member, and resulting in the deformation of the second resilient member.

BRIEF DESCRIPTION OF DRAWINGS

The drawings described herein are for illustrative purposes only of selected embodiments and not all possible implementations, and are not intended to limit the scope of the present disclosure.

FIG. 2 is a side view of the pedal device.

FIG. 3 is a cross-sectional view of the pedal device.

DETAILED DESCRIPTION

Figure 1:
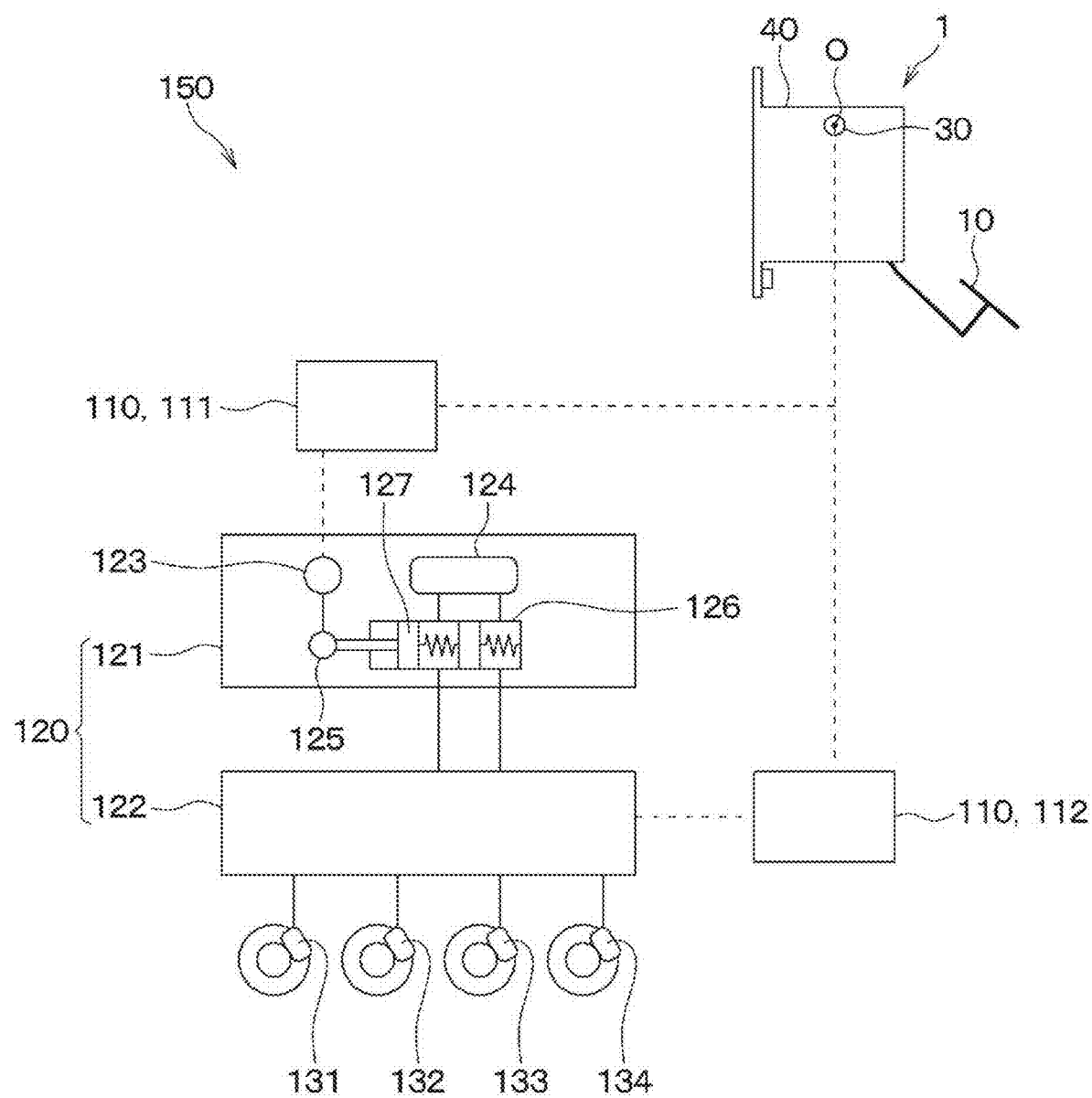
FIG. 1 is a diagram indicating a structure of a brake-by-wire system in which a pedal device of a first embodiment is used.

There has been proposed a pedal simulator that includes a brake pedal, an actuating rod, a cylinder, a piston, a plurality of springs, and a plurality of spring seats. The actuating rod is coupled to the brake pedal. The actuating rod is inserted into the cylinder. The piston is placed at an inside of the cylinder such that the piston receives a force of the actuating rod. The springs are arranged in a multi-stage series form at the inside of the cylinder to support the piston. The spring seats are arranged at the inside of the cylinder such that the spring seats support springs, respectively.

According to the study of the inventors of the present application, the following point is found. Specifically, in the pedal simulator described above, when the brake pedal is rotated, the actuating rod, which is coupled to the brake pedal, drives the piston along the cylinder to compress the springs. However, in the pedal simulator described above, minute objects such as wear debris particles generated by sliding between, for example, the piston and the cylinder, or foreign objects intruding from the outside, may possibly enter a sliding portion between the piston and the cylinder. When this happens, the piston is jammed, i.e., is fixed to the cylinder to prevent the piston from moving along the cylinder, and thereby the rotation of the brake pedal is locked.

According to one aspect of the present disclosure, there is provided a pedal device including:

a pedal that is configured to rotate about a rotational axis when the pedal is pressed by an operator;

a first resilient member that is configured to generate a reaction force against a pedal force applied from the operator to the pedal through deformation of the first resilient member in response to application of a force from the pedal to the first resilient member at a time of rotating the pedal;

a second resilient member that is configured to generate a reaction force against the pedal force applied from the operator to the pedal through deformation of the second resilient member in response to the application of the force from the pedal to the second resilient member at the time of rotating the pedal;

a first holder that includes a first support portion, which is placed adjacent to the pedal and supports one end part of the first resilient member, and a first guide portion, which extends from the first support portion in a deforming direction of the first resilient member, wherein the deforming direction of the first resilient member is defined as a direction in which the first resilient member is configured to deform;

a second holder that includes a second support portion, which supports another end part of the first resilient member opposite to the one end part of the first resilient member, a second guide portion which extends from the second support portion in the deforming direction of the first resilient member, and a third support portion that supports one end part of the second resilient member;

a fourth support portion that supports another end part of the second resilient member opposite to the one end part of the second resilient member; and a third guide portion that extends from the fourth support portion in a deforming direction of the second resilient member, wherein the deforming direction of the second resilient member is defined as a direction in which the second resilient member is configured to deform, wherein:

the force applied from the pedal at the time of rotating the pedal moves the first guide portion in the deforming direction of the first resilient member to execute a relative movement of the first guide portion relative to the second guide portion, thereby causing the first guide portion to slide relative to the second guide portion in the deforming direction of the first resilient member, and resulting in the deformation of the first resilient member; and the force applied from the pedal at the time of rotating the pedal moves the second holder in the deforming direction of the second resilient member to execute a relative movement of the second holder relative to the third guide portion, thereby causing the second holder to slide relative to the third guide portion in the deforming direction of the second resilient member, and resulting in the deformation of the second resilient member.

Therefore, even if one of two sliding portions is jammed, i.e., is fixed, a sliding operation can be carried out at the other one of the two sliding portions. Thus, the locking of the rotation of the pedal at the time of pressing the pedal is limited.

Hereinafter, embodiments of the present disclosure will be described with reference to the drawings. In each of the following embodiments, portions, which are the same or equivalent to each other, will be indicated by the same reference signs.

First Embodiment

A pedal device 1 of the present embodiment is used, for example, as a brake pedal in a brake-by-wire system 150 that controls brakes of a vehicle. First, this brake-by-wire system 150 will be described.

As shown in FIG. 1, the brake-by-wire system 150 includes a plurality of wheel cylinders 131-134, a plurality of ECUs (electronic control units) 110, a brake circuit 120 and the pedal device 1.

The wheel cylinders 131-134 are provided to a plurality of wheels, respectively, of the vehicle. Brake pads, not shown, are attached to each wheel cylinder 131-134.

The ECUs 110 include a first ECU 111 and a second ECU 112. The first ECU 111 has a microcomputer and a drive circuit. The first ECU 111 controls a first brake circuit 121 of the brake circuit 120 described later based on a signal outputted from the pedal device 1 described below. The second ECU 112 has a microcomputer and a drive circuit. The second ECU 112 controls a second brake circuit 122 of the brake circuit 120 described later based on a signal outputted from the pedal device 1 described below.

The brake circuit 120 includes the first brake circuit 121 and the second brake circuit 122. The first brake circuit 121 includes a reservoir 124, an electric motor 123, a gear mechanism 125 and a master cylinder 126. The reservoir 124 stores a brake fluid. The electric motor 123 drives the gear mechanism 125. The gear mechanism 125 drives and reciprocates a master piston 127 of the master cylinder 126 in an axial direction of the master cylinder 126. The second brake circuit 122 includes solenoid valves (not shown). The second brake circuit 122 opens and closes a corresponding one of the solenoid valves according to a control signal outputted from the second ECU 112 to control a fluid pressure of each corresponding wheel cylinder 131-134.

Here, for the purpose of describing the pedal device 1, a front-rear direction of the vehicle will be referred to as a vehicle front-rear direction Da. A vertical direction of the vehicle will be referred to as a vehicle up-down direction Db. A left-right direction of the vehicle will be referred to as a vehicle left-right direction Dc. A front side in the vehicle front-rear direction Da will be referred to as a vehicle front side. A rear side in the vehicle front-rear direction Da will be referred to as a vehicle rear side. An upper side in the vehicle up-down direction Db will be referred to as a vehicle upper side. A lower side in the vehicle up-down direction Db will be referred to as a vehicle lower side. A left side in the vehicle left-right direction Dc will be referred to as a vehicle left side. A right side in the vehicle left-right direction Dc will be referred to as a vehicle right side.

As shown in FIGS. 2 to 5, the pedal device 1 includes a pedal 10, a stroke sensor 30, a housing 40 and a reaction force generating mechanism 60.

As shown in FIGS. 2 and 3, the pedal 10 is operated by a pressing operation of the pedal 10 by a human driver (hereinafter simply referred to as a driver) of the vehicle. The driver of the vehicle serves as an operator.

Specifically, the pedal 10 includes a pedal portion 12, a lever portion 14, a lever projection 16 and a lever flange 18. The pedal portion 12 is where the driver places his or her foot to press the pedal portion 12. The lever portion 14 is coupled to the pedal portion 12. Furthermore, when the pedal portion 12 is pressed by the driver, the lever portion 14 is rotated about a rotational axis (an axis of a rotational shaft) O within a predetermined rotational range. The lever projection 16 is coupled to a side of the lever portion 14, which faces the vehicle front side, and the lever projection 16 projects toward the vehicle front side from the boundary with the lever portion 14. The lever flange 18 is joined to the lever projection 16 and projects from the boundary with the lever projection 16 in a direction perpendicular to a projecting direction of the lever projection 16.

The stroke sensor 30 is positioned around, for example, the rotational shaft having the rotational axis O of the lever portion 14. The stroke sensor 30 includes a magnet, a yoke and a Hall element. Therefore, the stroke sensor 30 senses a rotational angle and a stroke amount of the pedal 10 by measuring a rotational angle of the lever portion 14. Furthermore, the stroke sensor 30 outputs a signal corresponding to the sensed rotational angle and the sensed stroke amount of the pedal 10 to the first ECU 111 and the second ECU 112. The stroke sensor 30 senses the rotational angle and the stroke amount of the pedal 10 by having the Hall element. However, the present disclosure is not limited to this configuration. The stroke sensor 30 may sense the rotational angle and the stroke amount of the pedal 10 by having, for example, an MR element. Here, MR stands for Magneto Resistive. Furthermore, the stroke amount is the amount of movement of the pedal portion 12 in the vehicle front-rear direction Da.

The housing 40 is mounted to a dash panel 200 of the vehicle and is shaped in a bottomed tubular form to receive a portion of the lever portion 14, the stroke sensor 30, and the reaction force generating mechanism 60 described below. The dash panel 200 is a partition wall which partitions between an outside (e.g., an engine compartment of the vehicle) of a vehicle cabin and an inside of the vehicle cabin, and the dash panel 200 is also sometimes referred to as a bulkhead. In addition to the vehicle's engine, for example, the vehicle's battery and an air conditioning system are also located at the outside of the vehicle cabin.

Specifically, the housing 40 has a housing bottom portion 42, a housing tubular portion 44, a panel mounting portion 46, panel bolts 48 and a housing limiting portion 50.

The housing bottom portion 42 extends in the vehicle front-rear direction Da. The rotational shaft having the rotational axis O of the lever portion 14 and the stroke sensor 30 are installed to the housing bottom portion 42. The housing bottom portion 42 supports the portion of the lever portion 14 in a manner that enables the rotation of the lever portion 14 about the rotational axis O and also supports the stroke sensor 30.

The housing tubular portion 44 serves as a fourth support portion and is joined to an end part of the housing bottom portion 42 which faces in the vehicle front-rear direction Da, and the housing tubular portion 44 extends toward the vehicle lower side from the boundary with the housing bottom portion 42. Furthermore, the housing tubular portion 44 receives the portion of the lever portion 14, the stroke sensor 30 and the reaction force generating mechanism 60.

The panel mounting portion 46 is connected to a part of the housing bottom portion 42, which faces the vehicle front side and the vehicle upper side, and the panel mounting portion 46 extends toward the vehicle upper side from the boundary with the housing bottom portion 42. The panel mounting portion 46 is connected to an end of the housing tubular portion 44, which faces the vehicle front side and the vehicle lower side, and the panel mounting portion 46 extends toward the vehicle lower side from the boundary with the housing tubular portion 44. Holes are formed at the panel mounting portion 46, and the housing 40 is installed to the dash panel 200 by insertion of the panel bolts 48 into the holes of the panel mounting portion 46 and holes of the dash panel 200.

The housing limiting portion 50 is joined to an inner surface of the housing tubular portion 44 at the vehicle front side and projects from this inner surface of the housing tubular portion 44 toward the vehicle rear side. Furthermore, the housing limiting portion 50 has a hole into which a guide member 63 described later is inserted.

Figure 4:
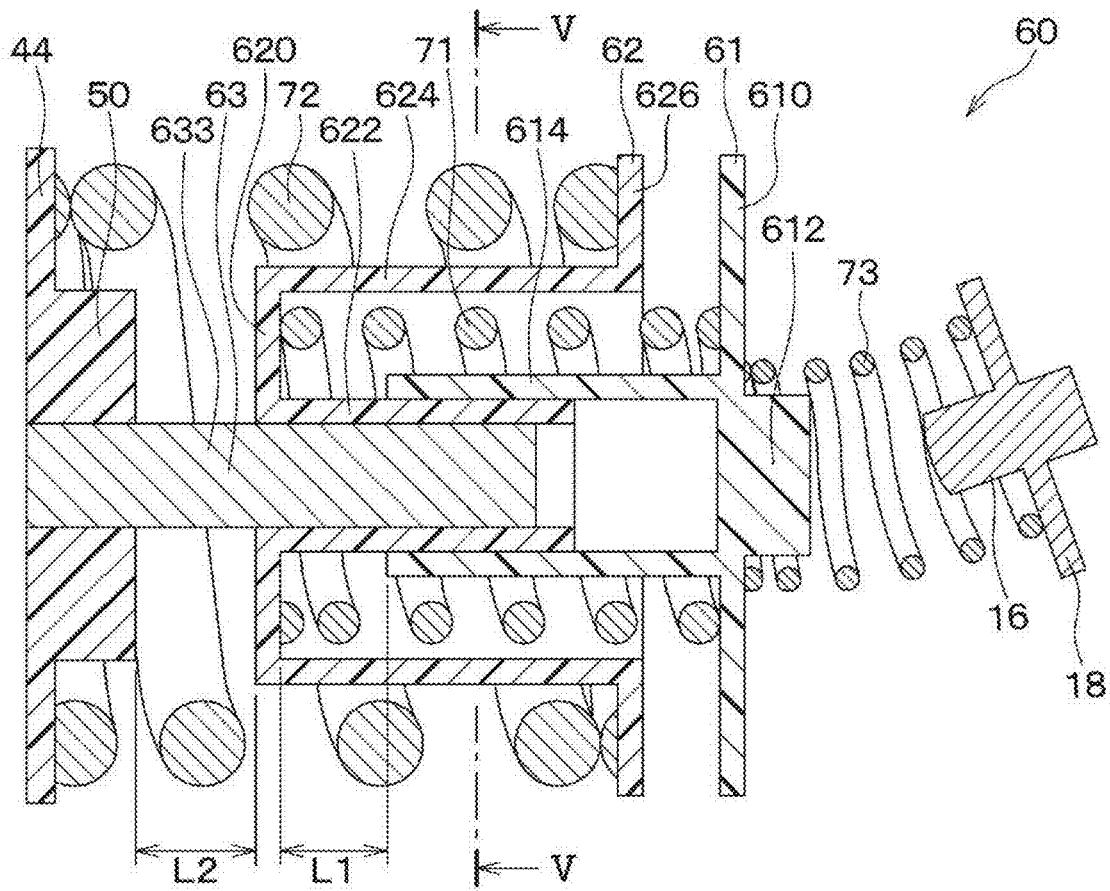
FIG. 4 is an enlarged view of a section IV of FIG. 3.

The reaction force generating mechanism 60 generates a reaction force against a pedal force of the driver applied to the pedal portion 12. Specifically, as shown in FIG. 4, the reaction force generating mechanism 60 includes a first holder 61, a second holder 62, the guide member 63, a first resilient member 71, a second resilient member 72 and a third resilient member 73.

The first holder 61 is made of, for example, resin. Furthermore, the first holder 61 includes a first support portion 610, a holder limiting portion 612 and a first guide portion 614. Here, as discussed above, the first holder 61 is made of the resin. However, the present disclosure is not limited to this. The first holder 61 may be made of, for example, metal.

Figure 5:
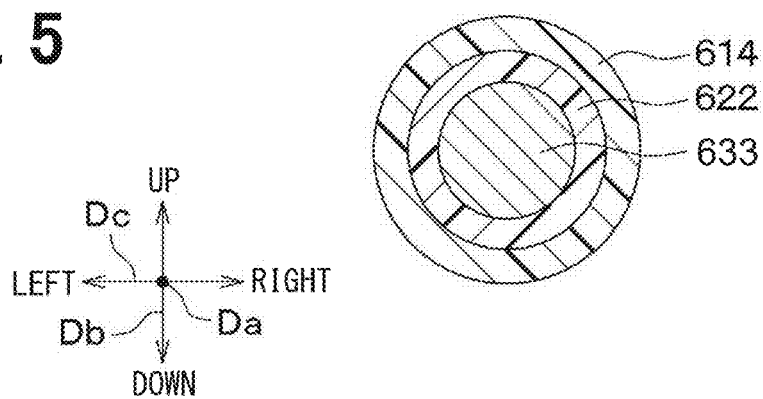
FIG. 5 is a partial cross-sectional view taken along line V-V in FIG. 4.

The first support portion 610 is shaped in, for example, a plate form and extends in a direction perpendicular to the vehicle front-rear direction Da. The holder limiting portion 612 is joined to the first support portion 610 and projects from the first support portion 610 toward the vehicle rear side. As shown in FIGS. 4 and 5, the first guide portion 614 is shaped in a cylindrical tubular form and extends from a part of the first support portion 610, which is opposite to the holder limiting portion 612, toward the vehicle front side.

The second holder 62 is made of, for example, resin. Furthermore, the second holder 62 includes a second support portion 620, a second guide portion 622, a holder tubular portion 624 and a third support portion 626. Here, as discussed above, the second holder 62 is made of the resin. However, the present disclosure is not limited to this. The second holder 62 may be made of, for example, metal.

The second support portion 620 is shaped in, for example, a ring plate form and extends in the direction perpendicular to the vehicle front-rear direction Da.

The second guide portion 622 is shaped in a cylindrical tubular form and is joined to an inner periphery of the second support portion 620 located at an inner side in the direction perpendicular to the vehicle front-rear direction Da, and the second guide portion 622 extends toward the vehicle rear side from the boundary with the second support portion 620. Furthermore, a portion of the second guide portion 622 is inserted into a hole of the first guide portion 614. Thereby, the first guide portion 614 and the second guide portion 622 mutually limit each other's movement in the vehicle up-down direction Db. Furthermore, since the first guide portion 614 and the second guide portion 622 both extend in the vehicle front-rear direction Da, an inner peripheral surface of the first guide portion 614 and an outer peripheral surface of the second guide portion 622 slide relative to each other in the vehicle front-rear direction Da.

The holder tubular portion 624 is joined to an outer periphery of the second support portion 620 located at an outer side of the second support portion 620 in the direction perpendicular to the vehicle front-rear direction Da, and the holder tubular portion 624 extends toward the vehicle rear side from the boundary with the second support portion 620.

The third support portion 626 is shaped in a ring plate form and extends in the direction perpendicular to the vehicle front-rear direction Da. The third support portion 626 is joined to a part of the holder tubular portion 624, which is opposite to the second support portion 620, so that the third support portion 626 is placed on the vehicle rear side of the second support portion 620. Furthermore, a portion of the first guide portion 614 is inserted into a hole of the third support portion 626.

The guide member 63 includes a third guide portion 633. The third guide portion 633 is made of, for example, metal. Also, the third guide portion 633 is shaped in a solid cylindrical form and extends in the vehicle front-rear direction Da. Furthermore, a portion of the third guide portion 633 is inserted into a hole of the housing tubular portion 44 and the hole of the housing limiting portion 50. Also, another portion of the third guide portion 633 is inserted into a hole of the second guide portion 622. Thereby, the second guide portion 622 and the third guide portion 633 mutually limit each other's movement in the vehicle up-down direction Db. Furthermore, since the second guide portion 622 and the third guide portion 633 both extend in the vehicle front-rear direction Da, an inner peripheral surface of the second guide portion 622 and an outer peripheral surface of the third guide portion 633 slide relative to each other in the vehicle front-rear direction Da.

Here, a first distance L1 is a distance in the vehicle front-rear direction Da between the first holder 61 and the second holder 62, and the first distance L1 is defined as a moving distance of the first holder 61 from a position at a time of starting to press the pedal 10 by the driver of the vehicle to a position where the first holder 61 and the second holder 62 contact each other in the vehicle front-rear direction Da. The first distance L1 is, for example, a distance from the first guide portion 614 to the second support portion 620 in the vehicle front-rear direction Da. Furthermore, a second distance L2 is a distance in the vehicle front-rear direction Da between the second holder 62 and an opposing portion opposed to the second holder 62 in a moving direction of the second holder 62, and the second distance L2 is defined as a moving distance of the second holder 62 from a position at the time of starting to press the pedal 10 by the driver of the vehicle to a position where the second holder 62 contacts the opposing portion in the vehicle front-rear direction Da. The second distance L2 is, for example, a distance from the second holder 62 to the housing limiting portion 50 in the vehicle front-rear direction Da.

In this instance, the first resilient member 71, the second resilient member 72 and the third resilient member 73 are arranged in series. Specifically, the first resilient member 71 is, for example, a coil spring and is configured to be resiliently deformed in the vehicle front-rear direction Da. Furthermore, the first guide portion 614 and the second guide portion 622 are placed at an inside of the first resilient member 71. Thereby, movement of the first resilient member 71 in the vehicle up-down direction Db is limited. Furthermore, the first resilient member 71 is in contact with the first support portion 610 and the second support portion 620 and is thereby supported by the first support portion 610 and the second support portion 620. Furthermore, when the pedal portion 12 is not pressed by the driver, the first resilient member 71 is resiliently deformed and is compressed in this instance. Here, as discussed above, when the pedal portion 12 is not pressed by the driver, the first resilient member 71 is resiliently deformed. However, the present disclosure is not limited to this. That is, when the pedal portion 12 is not pressed by the driver, the first resilient member 71 may not be resiliently deformed. In this case, a length of the first resilient member 71 is a free length.

The second resilient member 72 is, for example, a coil spring and is configured to be resiliently deformed in the vehicle front-rear direction Da. Furthermore, the second resilient member 72 is in contact with the third support portion 626 and the housing tubular portion 44 and is thereby supported by the third support portion 626 and the housing tubular portion 44. Furthermore, the housing limiting portion 50 and the holder tubular portion 624 are placed at an inside of the second resilient member 72. Thereby, movement of the second resilient member 72 in the vehicle up-down direction Db is limited. Furthermore, when the second resilient member 72 is projected (i.e., imagined to be extended) toward the first resilient member 71 in the vehicle up-down direction Db, the second resilient member 72, as projected, overlaps with the first resilient member 71. Furthermore, when the pedal portion 12 is not pressed by the driver, the second resilient member 72 is resiliently deformed and is compressed in this instance. Here, as discussed above, when the pedal portion 12 is not pressed by the driver, the second resilient member 72 is resiliently deformed. However, the present disclosure is not limited to this. That is, when the pedal portion 12 is not pressed by the driver, the second resilient member 72 may not be resiliently deformed. In this case, a length of the second resilient member 72 is a free length.

The third resilient member 73 is, for example, a coil spring and is configured to be resiliently deformed in the vehicle front-rear direction Da. Furthermore, the third resilient member 73 is in contact with the first support portion 610 and is thereby supported by the first support portion 610. Furthermore, the holder limiting portion 612 is placed at an inside of the third resilient member 73. Thereby, movement of the third resilient member 73 in the vehicle up-down direction Db is limited. A portion of the lever projection 16 is inserted into the inside of the third resilient member 73. Therefore, when the pedal portion 12 is not pressed by the driver, the third resilient member 73 is in contact with the lever flange 18. At this time, the third resilient member 73 is resiliently deformed and is compressed in this instance. Here, as discussed above, when the pedal portion 12 is not pressed by the driver, the third resilient member 73 is resiliently deformed. However, the present disclosure is not limited to this. That is, when the pedal portion 12 is not pressed by the driver, the third resilient member 73 may not be resiliently deformed. In this case, a length of the third resilient member 73 is a free length. Furthermore, as discussed above, when the pedal portion 12 is not pressed by the driver, the third resilient member 73 is in contact with the lever flange 18. However, the present disclosure is not limited to this. The third resilient member 73 and the lever flange 18 may be out of contact with each other by spacing the third resilient member 73 and the lever flange 18 away from each other when the pedal portion 12 is not pressed by the driver.

The brake-by-wire system 150 is configured in the above-described manner. Next, the operation of the pedal device 1 will be described.

When the pedal portion 12 is pressed by the driver of the vehicle, the lever portion 14 is rotated integrally with the pedal portion 12 about the rotational axis O. Furthermore, since the force applied from the pedal portion 12 is transmitted to the third resilient member 73 through the lever flange 18, the third resilient member 73 is compressed. Furthermore, the force applied from the pedal portion 12 is transmitted to the first holder 61. Thus, the first holder 61 is moved toward the vehicle front side. Therefore, the inner peripheral surface of the first guide portion 614 is slid along the outer peripheral surface of the second guide portion 622 toward the vehicle front side, and the first resilient member 71 is urged and is thereby compressed by the first support portion 610. Furthermore, the force applied from the pedal portion 12 is transmitted to the second holder 62. Thus, the second holder 62 is moved toward the vehicle front side. Therefore, the inner peripheral surface of the second guide portion 622 is slid along the outer peripheral surface of the third guide portion 633 toward the vehicle front side, and the second resilient member 72 is urged and is thereby compressed by the third support portion 626. Therefore, a reaction force is generated by the restoring forces generated by the compression of the first resilient member 71, the second resilient member 72 and the third resilient member 73. With this reaction force, even when a mechanical connection between the pedal and the master cylinder 126 is eliminated, the pedal device 1 can obtain the same reaction force as the reaction force generated in a case where the pedal 10 is connected to the master cylinder 126, i.e., the reaction force generated by the hydraulic pressure.

At this time, the stroke sensor 30 senses the rotational angle and the stroke amount of the pedal portion 12 by measuring the rotational angle of the lever portion 14. Furthermore, the stroke sensor 30 outputs the sensed rotational angle and the sensed stroke amount of the pedal portion 12 to the first ECU 111 and the second ECU 112.

At this time, the first ECU 111 rotates the electric motor 123 by, for example, supplying the electric power to the electric motor 123. Therefore, the gear mechanism 125 is driven to move the master piston 127. Therefore, the fluid pressure of the brake fluid, which is supplied from the reservoir 124 to the master cylinder 126, is increased. The increased fluid pressure is supplied to the second brake circuit 122.

Furthermore, the second ECU 112 supplies the electric power to, for example, the solenoid valves of the second brake circuit 122. Therefore, the solenoid valves of the second brake circuit 122 are opened. Thus, the brake fluid, which is supplied to the second brake circuit 122, is supplied to each of the wheel cylinders 131-134. Thus, the brake pads, which are installed to each of the wheel cylinders 131-134, are frictionally engaged with the corresponding brake disc. Thereby, each of the wheels is braked, and the speed of the vehicle is reduced accordingly. At this time, the second ECU 112 may execute an ABS control operation, a VSC control operation, a collision avoidance control operation and a regenerative coordination control operation based on the signal from the stroke sensor 30 and a signal(s) from an undepicted electronic controller device(s). Here, ABS stands for Anti-lock Braking System. Furthermore, VSC stands for Vehicle Stability Control.

Here, in a state where the second holder 62 and the third guide portion 633 are jammed, i.e., are fixed to each other, when the first holder 61 moves the first distance L1, an absolute value of an amount of speed reduction of the vehicle becomes equal to or larger than a first threshold value, thereby stopping the vehicle. Furthermore, in a state where the first guide portion 614 and the second guide portion 622 are jammed, i.e., are fixed to each other, when the second holder 62 moves the second distance L2, the absolute value of the amount of speed reduction of the vehicle becomes equal to or larger than a second threshold value, thereby stopping the vehicle. The first threshold value and the second threshold value are set through experiments and simulations to ensure that the sufficient amount of speed reduction can be obtained.

Then, when the driver of the vehicle stops the pressing of the pedal portion 12, the first holder 61 and the second holder 62 are pushed back toward the vehicle rear side by the restoring forces of the first resilient member 71 and the second resilient member 72. Therefore, the inner peripheral surface of the first guide portion 614 is slid along the outer peripheral surface of the second guide portion 622 toward the vehicle rear side, and the inner peripheral surface of the second guide portion 622 is slid along the outer peripheral surface of the third guide portion 633 toward the vehicle rear side. Furthermore, the lever flange 18 is pushed back by the restoring force of the third resilient member 73. Therefore, the pedal 10 is returned to an initial pedal position which is the position of the pedal 10 when the driver of the vehicle does not press the pedal portion 12.

The pedal device 1 is operated in the above-described manner. In this pedal device 1, at the time of pressing the pedal 10, occurrence of locking of the rotation of the pedal 10 is limited. Next, the limiting of the occurrence of the locking of the rotation of the pedal 10 will be described.

Figure 6:
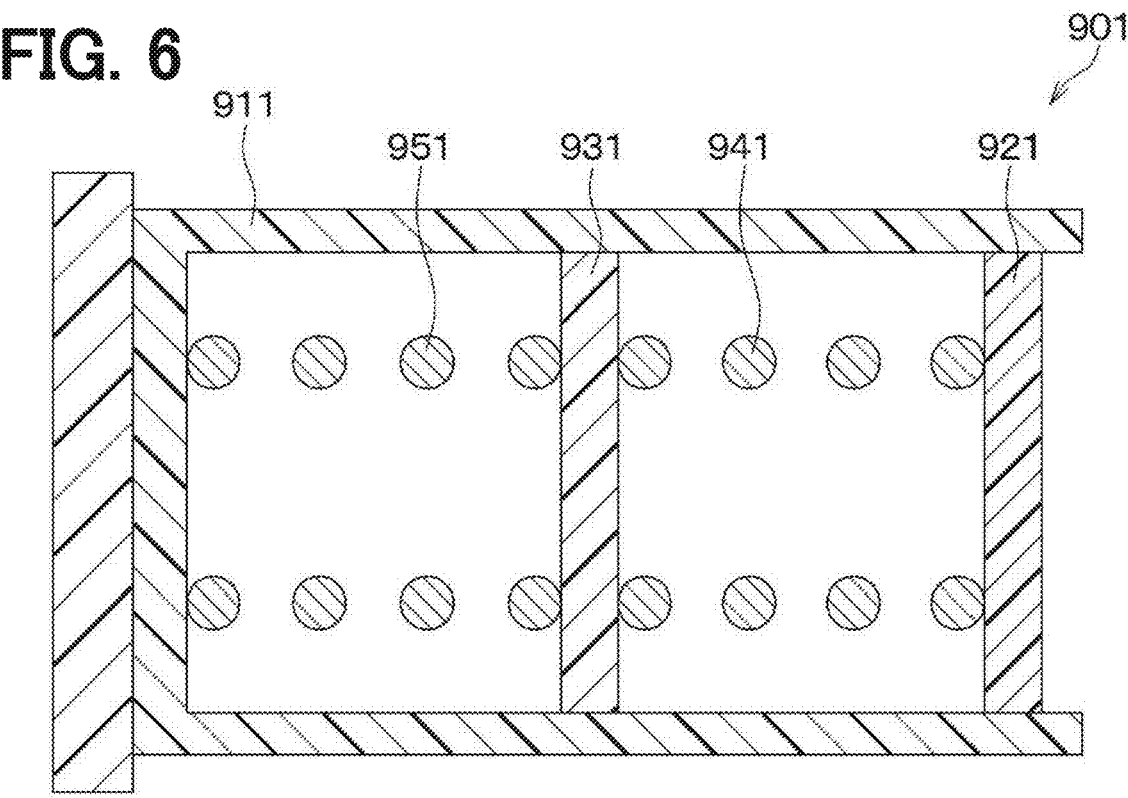
FIG. 6 is a cross-sectional view of a first comparative pedal device.

Here, the locking of the rotation of the pedal 10 will be described with reference to a first comparative pedal device 901 and a second comparative pedal device 902. First, the first comparative pedal device 901 will be described for this purpose. As shown in FIG. 6, the first comparative pedal device 901 includes a first comparative guide portion 911, a first comparative support portion 921, a second comparative support portion 931, a first comparative resilient member 941, a second comparative resilient member 951 and a comparative pedal (not shown).

The first comparative guide portion 911 is shaped in a bottomed tubular form and thereby receives the first comparative support portion 921, the second comparative support portion 931, the first comparative resilient member 941 and the second comparative resilient member 951. Each of the first comparative support portion 921 and the second comparative support portion 931 is shaped in a plate form and extends in a direction perpendicular to a left-right direction of the drawing. Furthermore, an outer peripheral surface of each of the first comparative support portion 921 and the second comparative support portion 931, which extends in the left-right direction of the drawing, is slid relative to an inner peripheral surface of the first comparative guide portion 911. The second comparative support portion 931 is placed on the left side of the drawing (hereinafter referred to as a drawing left side) of the first comparative support portion 921. The first comparative resilient member 941 is placed between the first comparative support portion 921 and the second comparative support portion 931 and is supported by the first comparative support portion 921 and the second comparative support portion 931. The second comparative resilient member 951 is placed between the second comparative support portion 931 and a bottom of the first comparative guide portion 911 and is supported by the second comparative support portion 931 and the bottom of the first comparative guide portion 911. Furthermore, each of the first comparative resilient member 941 and the second comparative resilient member 951 is configured to be resiliently deformed in the left-right direction of the drawing.

In the first comparative pedal device 901, for example, minute objects or foreign objects intruding from the outside of the first comparative pedal device 901 may enter a sliding portion between the first comparative support portion 921 and the first comparative guide portion 911 (i.e., a portion at which the first comparative support portion 921 and the first comparative guide portion 911 are slid relative each other). When this happens, the first comparative support portion 921 and the first comparative guide portion 911 are jammed, i.e., are fixed to each other, and thereby the first comparative support portion 921 is unable to move along the first comparative guide portion 911. In response to this, the first comparative resilient member 941 cannot be resiliently deformed, and thereby the force applied from the comparative pedal cannot be transmitted to the second comparative support portion 931. Thus, the second comparative support portion 931 is also unable to move along the first comparative guide portion 911. Thus, the comparative pedal (not shown) is locked and cannot be rotated. Furthermore, a reaction force to be generated by the first comparative resilient member 941 and the second comparative resilient member 951 cannot be transmitted to the comparative pedal (not shown). Here, the minute objects are, for example, wear debris particles, generated by sliding between: the first comparative support portion 921 and the second comparative support portion 931; and the first comparative guide portion 911.

Figure 7:
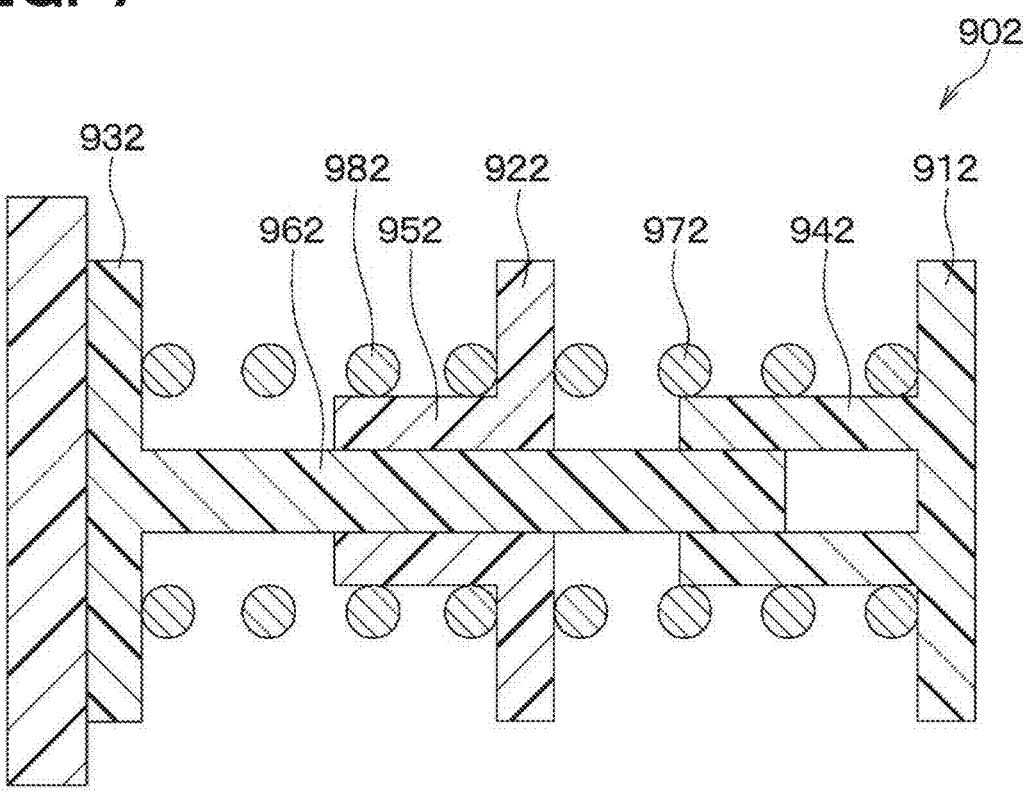
FIG. 7 is a cross-sectional view of a second comparative pedal device.

Next, the second comparative pedal device 902 will be described. As shown in FIG. 7, the second comparative pedal device 902 includes a third comparative support portion 912, a fourth comparative support portion 922 and a fifth comparative support portion 932. Furthermore, the second comparative pedal device 902 includes a first comparative tubular portion 942, a second comparative tubular portion 952, a second comparative guide portion 962, a third comparative resilient member 972, a fourth comparative resilient member 982 and a comparative pedal (not shown).

Each of the third comparative support portion 912, the fourth comparative support portion 922 and the fifth comparative support portion 932 is shaped in a plate form and extends in a direction perpendicular to the left-right direction of the drawing. The fourth comparative support portion 922 is placed on the drawing left side of the third comparative support portion 912. The fifth comparative support portion 932 is placed on the drawing left side of the fourth comparative support portion 922. The first comparative tubular portion 942 is joined to the third comparative support portion 912 and extends toward the drawing plane left side from the boundary with the third comparative support portion 912. The second comparative tubular portion 952 is joined to the fourth comparative support portion 922 and extends toward the drawing plane left side from the boundary with the fourth comparative support portion 922. The second comparative guide portion 962 is joined to the fifth comparative support portion 932 and extends from the boundary with the fifth comparative support portion 932 toward the right side of the drawing. Furthermore, a portion of the second comparative guide portion 962 is inserted in a hole of the first comparative tubular portion 942 and a hole of the second comparative tubular portion 952. Also, an outer peripheral surface of the second comparative guide portion 962, which extends in the left-right direction of the drawing, is configured to slide in the left-right direction of the drawing relative to an inner peripheral surface of the second comparative tubular portion 952 extending in the left-right direction of the drawing and also an inner peripheral surface of the first comparative tubular portion 942 extending in the left-right direction of the drawing. The third comparative resilient member 972 is placed between the third comparative support portion 912 and the fourth comparative support portion 922 and is supported by the third comparative support portion 912 and the fourth comparative support portion 922. The fourth comparative resilient member 982 is placed between the fourth comparative support portion 922 and the fifth comparative support portion 932 and is supported by the fourth comparative support portion 922 and the fifth comparative support portion 932. Furthermore, each of the third comparative resilient member 972 and the fourth comparative resilient member 982 is configured to be resiliently deformed in the left-right direction of the drawing.

Even in the second comparative pedal device 902, for example, the minute objects or the foreign objects intruding from the outside of the second comparative pedal device 902 may enter a sliding portion between the first comparative tubular portion 942 and the second comparative guide portion 962 (i.e., a portion at which the first comparative tubular portion 942 and the second comparative guide portion 962 are slid relative each other). At this time, the first comparative tubular portion 942 and the second comparative guide portion 962 are jammed, i.e., are fixed to each other, and thereby the first comparative tubular portion 942 cannot move along the second comparative guide portion 962. In response to this, the third comparative resilient member 972 cannot be resiliently deformed, and thereby the force applied from the comparative pedal cannot be transmitted to the fourth comparative support portion 922 and the second comparative tubular portion 952. Thus, the second comparative tubular portion 952 is also unable to move along the second comparative guide portion 962. Thus, the comparative pedal (not shown) is locked and cannot be rotated. Furthermore, a reaction force to be generated by the third comparative resilient member 972 and the fourth comparative resilient member 982 cannot be transmitted to the comparative pedal (not shown). Here, the minute objects are, for example, wear debris particles, generated by sliding between: the first comparative tubular portion 942 and the second comparative tubular portion 952; and the second comparative guide portion 962.

With respect this, in the pedal device 1 of the present embodiment, the first guide portion 614 is slid along the second guide portion 622 in the vehicle front-rear direction Da by the force applied from the pedal 10 at the time of rotating the pedal 10, and thereby the first resilient member 71 is deformed. Furthermore, the second guide portion 622 of the second holder 62 is slid along to the third guide portion 633 in the vehicle front-rear direction Da by the force applied from the pedal 10 at the time of rotating the pedal 10, and thereby the second resilient member 72 is deformed. The vehicle front-rear direction Da serves as a deforming direction of the first resilient member 71 that is defined as a direction in which the first resilient member 71 is configured to deform. Also, the vehicle front-rear direction Da serves as a deforming direction of the second resilient member 72 that is defined as a direction in which the second resilient member 72 is configured to deform.

Therefore, in the state where the second holder 62 and the third guide portion 633 are jammed, i.e., are fixed to each other, the first guide portion 614 and the second guide portion 622 are slid relative to each other in the vehicle front-rear direction Da by the force applied from the pedal 10 at the time of rotating the pedal 10. Furthermore, in the state where the first guide portion 614 and the second guide portion 622 are jammed, i.e., are fixed to each other, the second guide portion 622 of the second holder 62 and the third guide portion 633 are slid relative to each other in the vehicle front-rear direction Da by the force applied from the pedal 10 at the time of rotating the pedal 10. Therefore, even if one of the two sliding portions described above is jammed, i.e., is fixed, the sliding operation can be carried out at the other one of the two sliding portions. Thus, the occurrence of the locking of the pedal 10 is limited when the pedal 10 is pressed.

Furthermore, in the first embodiment, the following advantages are achieved.

[1-1] The first guide portion 614 is shaped in the cylindrical tubular form. The second guide portion 622 is shaped in the cylindrical tubular form. Therefore, at the time of assembling the first guide portion 614 and the second guide portion 622 together, the shape of the first guide portion 614 and the shape of the second guide portion 622 can easily correspond each other even when the first guide portion 614 and the second guide portion 622 rotate relative to each other about the axis. Thus, at the time of assembling the first guide portion 614 and the second guide portion 622 together, the first guide portion 614 and the second guide portion 622 can be assembled together without considering the rotational direction of the first guide portion 614 and the second guide portion 622 about the axis. This makes it easier to assemble the first guide portion 614 and the second guide portion 622 together.

Furthermore, the third guide portion 633 is shaped in the solid cylindrical form. Therefore, at the time of assembling the second guide portion 622 and the third guide portion 633 together, the shape of the second guide portion 622 and the shape of the third guide portion 633 can easily correspond each other even when the second guide portion 622 and the third guide portion 633 rotate relative to each other about the axis. Thus, at the time of assembling the second guide portion 622 and the third guide portion 633 together, the second guide portion 622 and the third guide portion 633 can be assembled together without considering the rotational direction of the second guide portion 622 and the third guide portion 633 about the axis. This makes it easier to assemble the second guide portion 622 and the third guide portion 633 together.

[1-2] Each of the deforming direction of the first resilient member 71, the deforming direction of the second resilient member 72 and the deforming direction of the third resilient member 73 is a linear direction (in this instance, the vehicle front-rear direction Da) that is perpendicular to the rotational axis O. This allows the first resilient member 71, the second resilient member 72 and the third resilient member 73 to be compressed easily without tilting, thus generating a stable reaction force.

[1-3] When the second resilient member 72 is projected in the vehicle up-down direction Db, the second resilient member 72, as projected, overlaps with the first resilient member 71. The vehicle up-down direction Db is a direction that is perpendicular to the deforming direction of the second resilient member 72.

With this configuration, a size of the reaction force generating mechanism 60, as measured in the vehicle front-rear direction Da, is reduced compared to a case where the second resilient member 72, as projected in the vehicle up-down direction Db, does not overlap with the first resilient member 71. Therefore, an increase in the size of the pedal device 1 is limited.

[1-4] The space is formed at the inside of the first resilient member 71, and the first guide portion 614 and the second guide portion 622 are placed at the inside of the first resilient member 71. With this configuration, a size of the first holder 61 and a size of the second holder 62, as measured in the vehicle up-down direction Db, are reduced compared to a case where the first guide portion 614 and the second guide portion 622 are placed at an outside of the first resilient member 71. Therefore, the increase in the size of the pedal device 1 is limited. Furthermore, since the first guide portion 614 and the second guide portion 622 are surrounded by the first resilient member 71, the foreign objects are less likely to enter the sliding portion between the first guide portion 614 and the second guide portion 622 from the outside.

[1-5] The space is formed at the inside of the second resilient member 72, and the second guide portion 622 and the third guide portion 633 are placed at the inside of the second resilient member 72. Therefore, a size of the second holder 62, as measured in the vehicle up-down direction Db, is reduced compared to a case where the second guide portion 622 and the third guide portion 633 are placed at the outside of the second resilient member 72. Therefore, the increase in the size of the pedal device 1 is limited. Furthermore, since the second guide portion 622 and the third guide portion 633 are surrounded by the second resilient member 72, the foreign objects are less likely to enter the sliding portion between the second guide portion 622 and the third guide portion 633 from the outside.

[1-6] The first guide portion 614 and the second guide portion 622 limit movement of the first resilient member 71 in the vehicle up-down direction Db. Therefore, the first resilient member 71 is less likely to move in the vehicle up-down direction Db, and thereby the first resilient member 71 is less likely to generate the friction with the first support portion 610 and the second support portion 620 which support the first resilient member 71. Thus, the amount of wear of each of the first resilient member 71, the first support portion 610 and the second support portion 620 is reduced. Furthermore, since the first resilient member 71 is less likely to move in the vehicle up-down direction Db, the first resilient member 71 is more likely to be compressed without tilting, thus generating a stable reaction force. Each of the first guide portion 614 and the second guide portion 622 serves as a limiting portion.

[1-7] The holder tubular portion 624 and the housing limiting portion 50 limit movement of the second resilient member 72 in the vehicle up-down direction Db. Therefore, the second resilient member 72 is less likely to move in the vehicle up-down direction Db, and thereby the second resilient member 72 is less likely to generate the friction with the third support portion 626 and the housing tubular portion 44 which support the second resilient member 72. Thus, the amount of wear of each of the second resilient member 72, the third support portion 626 and the housing tubular portion 44 is reduced. Furthermore, since the second resilient member 72 is less likely to move in the vehicle up-down direction Db, the second resilient member 72 is more likely to be compressed without tilting, thus generating a stable reaction force. Each of the holder tubular portion 624 and the housing limiting portion 50 serves as a limiting portion.

[1-8] The third guide portion 633 includes the metal. As a result, since the metal is a material that is relatively resistant to deformation, the third guide portion 633 is limited from being damaged and ceasing to slide with the second guide portion 622. Furthermore, the housing 40 includes the resin. As a result, at the time forming the housing 40 joined to the third guide portion 633, the housing 40 and the third guide portion 633 can be integrally molded by, for example, injection molding. Furthermore, the second guide portion 622 includes the resin. As a result, compared to a case where the second guide portion 622 and the third guide portion 633 are made of metal, a friction coefficient between the second guide portion 622 and the third guide portion 633 is reduced. Thus, a frictional force, which is generated between the second guide portion 622 and the third guide portion 633, is reduced, thereby limiting generation of noise caused by the friction between the second guide portion 622 and the third guide portion 633. Additionally, since the resin has a relatively low specific gravity, an increase in the weight of the second guide portion 622 is limited, thereby allowing the weight of the second guide portion 622 to be reduced. Therefore, an increase in the weight of the pedal device 1 is limited, thereby allowing the weight of the pedal device 1 to be reduced.

[1-9] Each of the first resilient member 71, the second resilient member 72 and the third resilient member 73 is the coil spring. As a result, the influence of the temperature on the modulus of elasticity of each of the first resilient member 71, the second resilient member 72 and the third resilient member 73 is relatively small. Additionally, the first resilient member 71, the second resilient member 72, and the third resilient member 73 have relatively high oil resistance, solvent resistance, and chemical resistance. As a result, the first resilient member 71, the second resilient member 72 and the third resilient member 73 are relatively less susceptible to deterioration, resulting in the generation of the stable reaction force.

[1-10] The pedal 10 is the brake pedal used at the vehicle. In the pedal device 1 of the present embodiment, the locking of the rotation of the pedal 10 is limited at the time of pressing the pedal 10, thus limiting the vehicle from being unable to brake.

[1-11] The first guide portion 614 is opposed to the second support portion 620 in the vehicle front-rear direction Da and is moved toward the second support portion 620 by the force applied from the pedal 10 at the time of rotating the pedal 10. The second support portion 620 and the third support portion 626 are opposed to the housing tubular portion 44 in the vehicle front-rear direction Da and are moved toward the housing tubular portion 44 by the force applied from the pedal 10 at the time of rotating the pedal 10. Furthermore, when the first holder 61 moves the first distance L1, the absolute value of the amount of speed reduction of the vehicle becomes equal to or larger than the threshold value, thereby stopping the vehicle. Furthermore, when the second holder 62 moves the second distance L2, the absolute value of the amount of speed reduction of the vehicle becomes equal to or larger than the threshold value, thereby stopping the vehicle. As described above, the first threshold value and the second threshold value are set through experiments and simulations to ensure that the sufficient amount of speed reduction can be obtained.

With the configuration described above, even when the one of the two sliding portions is jammed, i.e., is fixed, the pedal 10 is rotated such that the speed of the vehicle can be sufficiently reduced. Therefore, it is possible to limit the vehicle from becoming unable to brake.

[1-12] The housing 40, which receives the reaction force generating mechanism 60, is placed on the vehicle cabin side of the dash panel 200 that partitions between the outside and the inside of the vehicle cabin. Therefore, since the water and the oil are less likely to enter from the engine compartment into the vehicle cabin, the water and the oil from the engine compartment are unlikely to adhere to the first resilient member 71, the second resilient member 72 and the third resilient member 73 of the reaction force generating mechanism 60. Additionally, external factors such as light and heat from the engine compartment are less likely to enter the vehicle cabin. Therefore, the first resilient member 71, the second resilient member 72 and the third resilient member 73 are less likely to deteriorate, thereby improving durability thereof.

[1-13] The first guide portion 614 and the second guide portion 622 mutually limit each other's movement in the vehicle up-down direction Db. The vehicle up-down direction Db is a direction that is perpendicular to the deforming direction of the first resilient member 71.

This limits the first guide portion 614 and the second guide portion 622 from entering the inside of the first resilient member 71, and thereby the resilient deformation of the first resilient member 71 is unlikely to be interfered. This also limits clamping of each of the first guide portion 614 and the second guide portion 622 between the coils of the first resilient member 71, and thereby the damage of the first resilient member 71 is also limited. Thus, the transmission of the restoring force of the first resilient member 71 to the pedal 10 is unlikely to be interfered, and thereby returning of the pedal 10 to the initial position is unlikely to be interfered.

Furthermore, the second holder 62 and the third guide portion 633 mutually limit each other's movement in the vehicle up-down direction Db. The vehicle up-down direction Db is the direction that is perpendicular to the deforming direction of the second resilient member 72.

This limits the second holder 62 and the third guide portion 633 from entering the inside of the second resilient member 72, and thereby the resilient deformation of the second resilient member 72 is unlikely to be interfered. This also limits clamping of each of the second holder 62 and the third guide portion 633 between the coils of the second resilient member 72, and thereby the damage of the second resilient member 72 is also limited. Thus, the transmission of the restoring force of the second resilient member 72 to the pedal 10 is unlikely to be interfered, and thereby returning of the pedal 10 to the initial position is unlikely to be interfered.

[1-14] Each of the first resilient member 71, the second resilient member 72 and the third resilient member 73 is resiliently deformed and, in this case, compressed when the pedal 10 is not pressed by the driver of the vehicle. With this configuration, even if one or more of the first to third resilient members 71, 72, 73 are damaged in their resiliently deformed state due to the pressing of the pedal 10 by the driver of the vehicle, the pedal 10 is likely to return to its original position due to the restoring force generated by the resilient members 71, 72, and 73 as they return to their free length.

Second Embodiment

Figure 8:
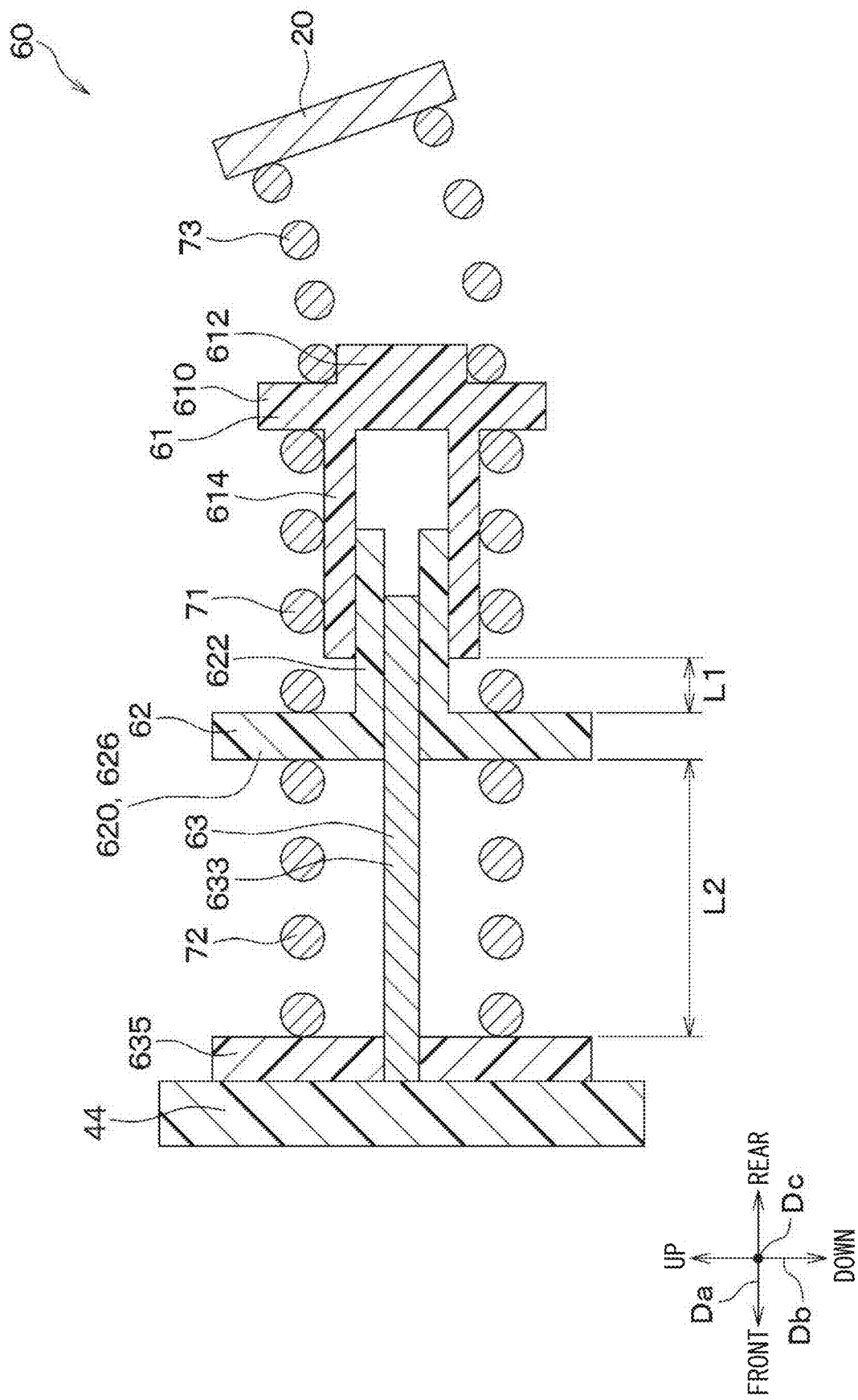
FIG. 8 is a cross-sectional view of a reaction force generating mechanism of a pedal device of a second embodiment.

In the second embodiment, as shown in FIG. 8, the configuration of the pedal 10 is different from that of the first embodiment. Furthermore, the configuration of the second holder 62 is different from that of the first embodiment. Also, the configuration of the guide member 63 is different from that of the first embodiment. In addition, the housing 40 does not have the housing limiting portion 50. The rest of the present embodiment is the same as that of the first embodiment.

The pedal 10 includes a lever plate 20 in place of the lever projection 16 and the lever flange 18. The lever plate 20 is shaped in a plate form and is joined to a front part of the lever portion 14 which faces the vehicle front side. Furthermore, the lever plate 20 is in contact with an opposite part of the third resilient member 73 which is opposite to the first support portion 610. At this time, the third resilient member 73 is not resiliently deformed. Therefore, when the pedal portion 12 is not pressed by the driver, the length of the third resilient member 73 is a free length. Here, as discussed above, when the pedal portion 12 is not pressed by the driver, the third resilient member 73 is not resiliently deformed. However, the present disclosure is not limited to this. That is, when the pedal portion 12 is not pressed by the driver, the third resilient member 73 may be resiliently deformed. Furthermore, as discussed above, when the pedal portion 12 is not pressed by the driver, the third resilient member 73 and the lever plate 20 are in contact with each other. However, the present disclosure is not limited to this. The third resilient member 73 and the lever plate 20 may be out of contact with each other by spacing the third resilient member 73 and the lever plate 20 away from each other when the pedal portion 12 is not pressed by the driver.

The second holder 62 does not include the holder tubular portion 624. Furthermore, the second support portion 620 and the third support portion 626 of the second holder 62 are formed integrally in one-piece.

The guide member 63 includes a guide member bottom portion 635 in addition to the third guide portion 633. The guide member bottom portion 635 serves as a fourth support portion. The guide member bottom portion 635 is made of, for example, resin. Furthermore, the guide member bottom portion 635 is joined to the third guide portion 633. Also, the guide member bottom portion 635 is joined to the inner surface of the housing tubular portion 44 placed at the vehicle front side. Furthermore, the guide member bottom portion 635 contacts a part of the second resilient member 72 opposite to the third support portion 626 and thereby supports the second resilient member 72.

The pedal device 1 of the second embodiment is configured in the above-described manner. Even in the second embodiment, the advantages, which are similar to those of the first embodiment, are achieved.

Third Embodiment

Figure 9:
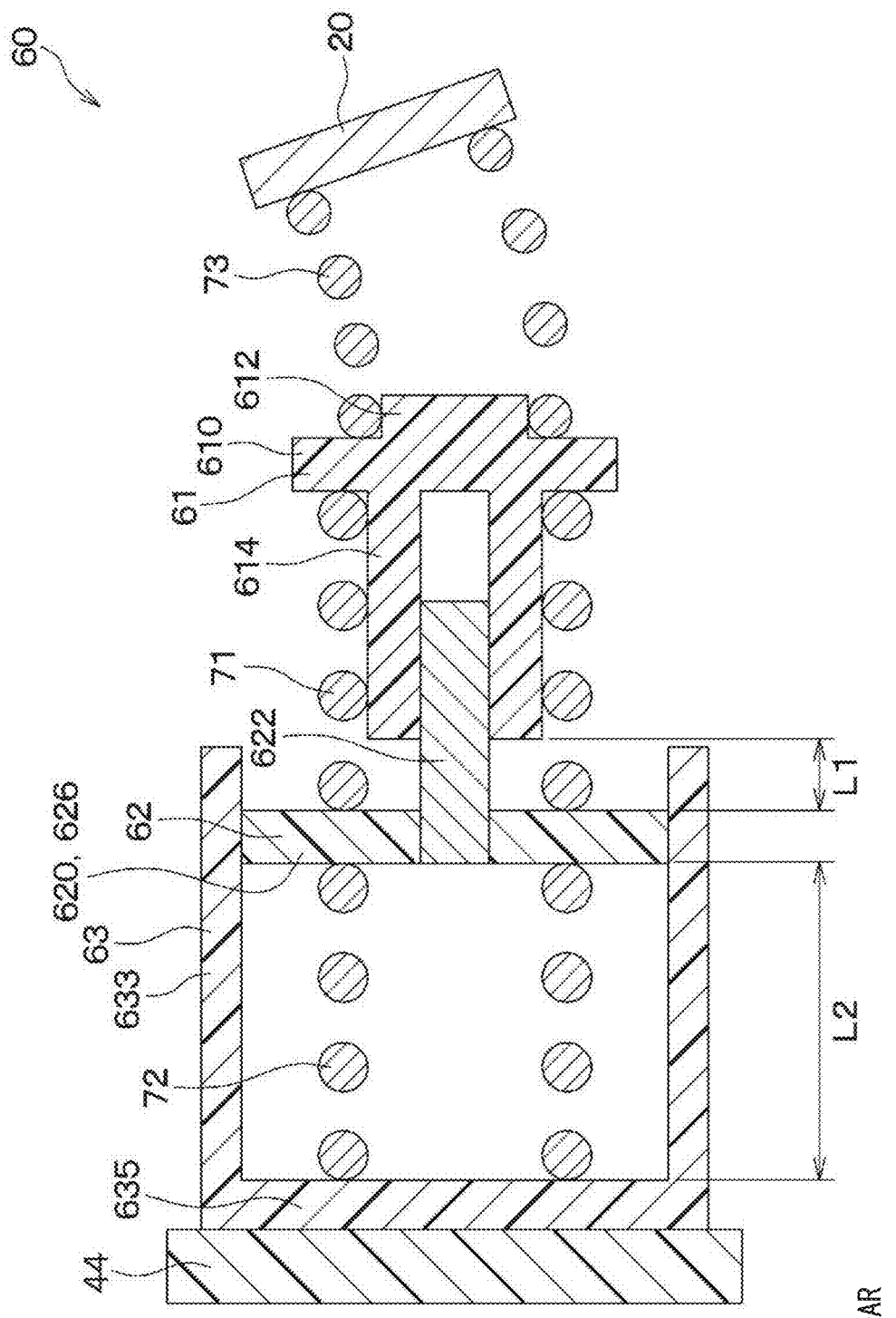
FIG. 9 is a cross-sectional view of a reaction force generating mechanism of a pedal device of a third embodiment.

In the third embodiment, as shown in FIG. 9, the configurations of the second holder 62 and the third guide portion 633 are different from those of the second embodiment. The rest of the present embodiment is the same as that of the second embodiment.

The second holder 62 includes the second support portion 620, the third support portion 626 and the second guide portion 622. The second support portion 620 is formed integrally with the third support portion 626 and is shaped in a plate form extending in the vehicle up-down direction Db. The second guide portion 622 is made of, for example, metal. The second guide portion 622 is joined to the second support portion 620 and is shaped in a solid cylindrical form such that the second guide portion 622 extends toward the vehicle rear side from the boundary with the second support portion 620. Furthermore, a portion of the second guide portion 622 is inserted into a hole of the first guide portion 614. Thereby, the first guide portion 614 and the second guide portion 622 mutually limit each other's movement in the vehicle up-down direction Db. Furthermore, since the first guide portion 614 and the second guide portion 622 both extend in the vehicle front-rear direction Da, an inner peripheral surface of the first guide portion 614 and an outer peripheral surface of the second guide portion 622 slide relative to each other in the vehicle front-rear direction Da.

The third guide portion 633 is made of resin instead of the metal. Also, the third guide portion 633 is shaped in a cylindrical tubular form extending in the vehicle front-rear direction Da instead of the solid cylindrical form. Therefore, the guide member 63 is shaped in a bottomed tubular form. Furthermore, the second support portion 620 and the third support portion 626 are inserted into a hole of the third guide portion 633. Thereby, movement of each of the second support portion 620, the third support portion 626 and the third guide portion 633 in the vehicle up-down direction Db is limited. Furthermore, since the third guide portion 633 extend in the vehicle front-rear direction Da, outer peripheral surfaces of the second support portion 620 and the third support portion 626 slide relative to an inner peripheral surface of the third guide portion 633.

The pedal device 1 of the third embodiment is configured in the above-described manner. Even in the third embodiment, the advantages, which are similar to those of the second embodiment, are achieved.

Fourth Embodiment

Figure 10:
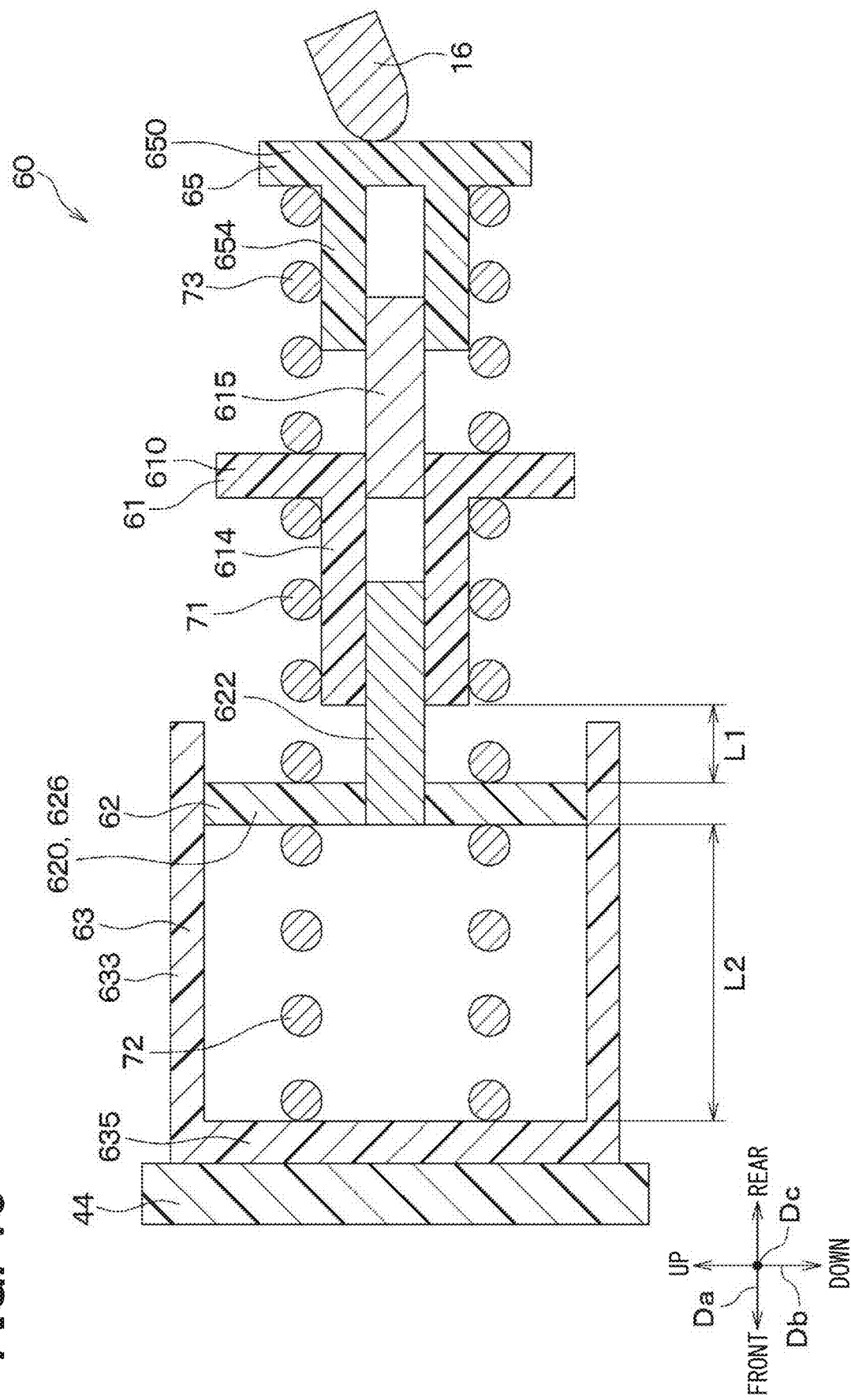
FIG. 10 is a cross-sectional view of a reaction force generating mechanism of a pedal device of a fourth embodiment.

In the fourth embodiment, as shown in FIG. 10, the configuration of the pedal 10 is different from that of the third embodiment. Furthermore, the reaction force generating mechanism 60 includes a third holder 65 in addition to the first holder 61, the second holder 62, the guide member 63, the first resilient member 71, the second resilient member 72 and the third resilient member 73. Furthermore, the configuration of the first holder 61 is different from that of the third embodiment. The rest of the present embodiment is the same as that of the third embodiment.

The pedal 10 includes the lever projection 16 in place of the lever plate 20. The lever projection 16 is coupled to a side of the lever portion 14, which faces the vehicle front side, and the lever projection 16 projects toward the vehicle front side from the boundary with the lever portion 14.

The third holder 65 is made of, for example, resin. The third holder 65 includes a holder support portion 650 and a fourth guide portion 654.

The holder support portion 650 is shaped in, for example, a plate form and extends in a direction perpendicular to the vehicle front-rear direction Da. Furthermore, the holder support portion 650 is in contact with the lever projection 16. As discussed above, the holder support portion 650 and the lever projection 16 are in contact with each other when the pedal portion 12 is not pressed by the driver. However, the present disclosure is not limited to this. The holder support portion 650 and the lever projection 16 may be out of contact with each other by spacing the holder support portion 650 and the lever projection 16 away from each other when the pedal portion 12 is not pressed by the driver.

The fourth guide portion 654 is shaped in, for example, a cylindrical tubular form and extends toward the vehicle front side from an end surface of the holder support portion 650 which is opposite to the lever projection 16. Furthermore, the fourth guide portion 654 is placed at the inside of the third resilient member 73. Thereby, movement of the third resilient member 73 in the vehicle up-down direction Db is limited.

The first holder 61 includes a fifth guide portion 615 in place of the holder limiting portion 612. The fifth guide portion 615 is made of, for example, metal. The fifth guide portion 615 is joined to the first support portion 610 and is shaped in a solid cylindrical form such that the fifth guide portion 615 extends toward the vehicle rear side from the boundary with the first support portion 610. Furthermore, a portion of the fifth guide portion 615 is inserted into a hole of the fourth guide portion 654. Thereby, the fourth guide portion 654 and the fifth guide portion 615 mutually limit each other's movement in the vehicle up-down direction Db. Also, since the fourth guide portion 654 and the fifth guide portion 615 extend in the vehicle front-rear direction Da, an inner peripheral surface of the fourth guide portion 654 and an outer peripheral surface of the fifth guide portion 615 slide relative to each other in the vehicle front-rear direction Da.

The pedal device 1 of the fourth embodiment is configured in the above-described manner. Even in the fourth embodiment, the advantages, which are similar to those of the third embodiment, are achieved.

Fifth Embodiment

Figure 11:
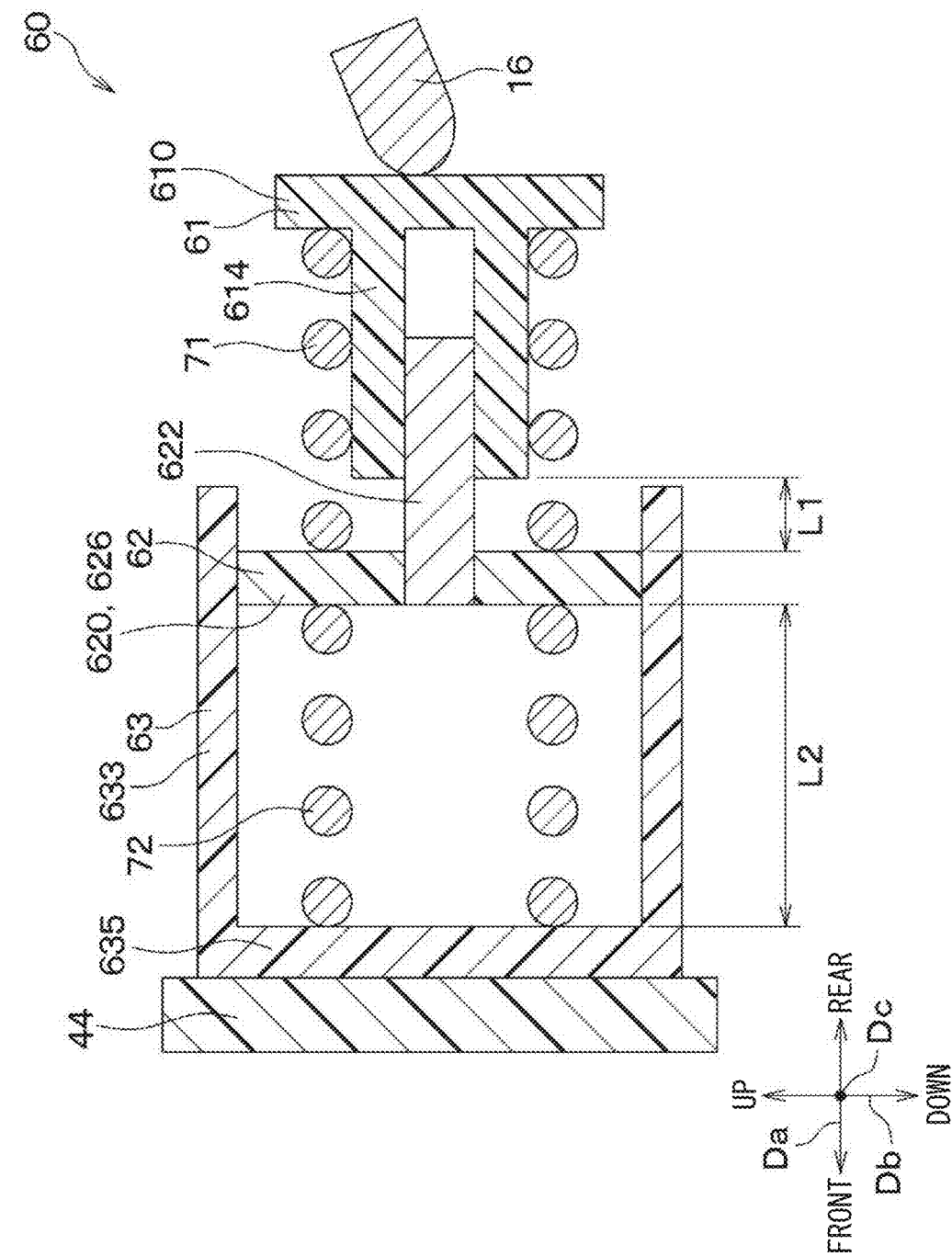
FIG. 11 is a cross-sectional view of a reaction force generating mechanism of a pedal device of a fifth embodiment.

In the fifth embodiment, as shown in FIG. 11, the configuration of the pedal 10 is different from that of the third embodiment. Furthermore, the reaction force generating mechanism 60 does not include the third resilient member 73 and the third holder 65. In addition, the first holder 61 does not include the fifth guide portion 615. The rest of the present embodiment is the same as that of the fourth embodiment.

The lever projection 16 of the pedal 10 is in contact with the first support portion 610 instead of being in contact with the holder support portion 650. As discussed above, the lever projection 16 and the first support portion 610 are in contact with each other when the pedal portion 12 is not pressed by the driver. However, the present disclosure is not limited to this. The first support portion 610 and the lever projection 16 may be out of contact with each other by spacing the first support portion 610 and the lever projection 16 away from each other when the pedal portion 12 is not pressed by the driver.

The pedal device 1 of the fifth embodiment is configured in the above-described manner. Even in the fifth embodiment, the advantages, which are similar to those of the fourth embodiment, are achieved.

Sixth Embodiment

Figure 12:
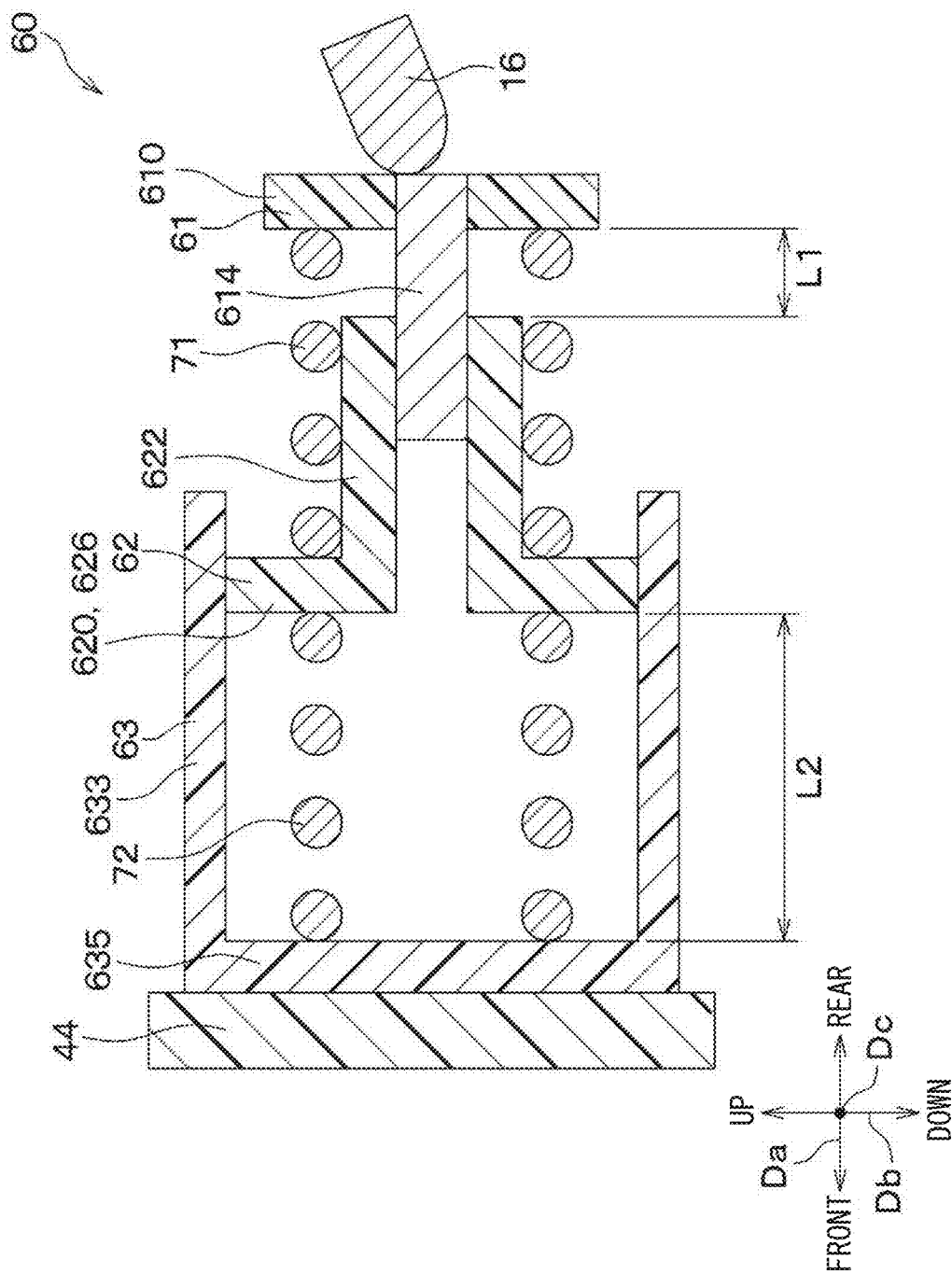
FIG. 12 is a cross-sectional view of a reaction force generating mechanism of a pedal device of a sixth embodiment.

In the sixth embodiment, as shown in FIG. 12, the configurations of the first guide portion 614 and the second guide portion 622 are different from those of the fifth embodiment. The rest of the present embodiment is the same as that of the fifth embodiment.

The first guide portion 614 is made of metal instead of the resin. Furthermore, the first guide portion 614 is shaped in a solid cylindrical form instead of the cylindrical tubular form. The second guide portion 622 is made of resin instead of the metal. Furthermore, the second guide portion 622 is shaped in a cylindrical tubular form instead of the solid cylindrical form. Furthermore, a portion of the first guide portion 614 is inserted into a hole of the second guide portion 622. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

The pedal device 1 of the sixth embodiment is configured in the above-described manner. Even in the sixth embodiment, the advantages, which are similar to those of the fifth embodiment, are achieved.

Seventh Embodiment

Figure 13:
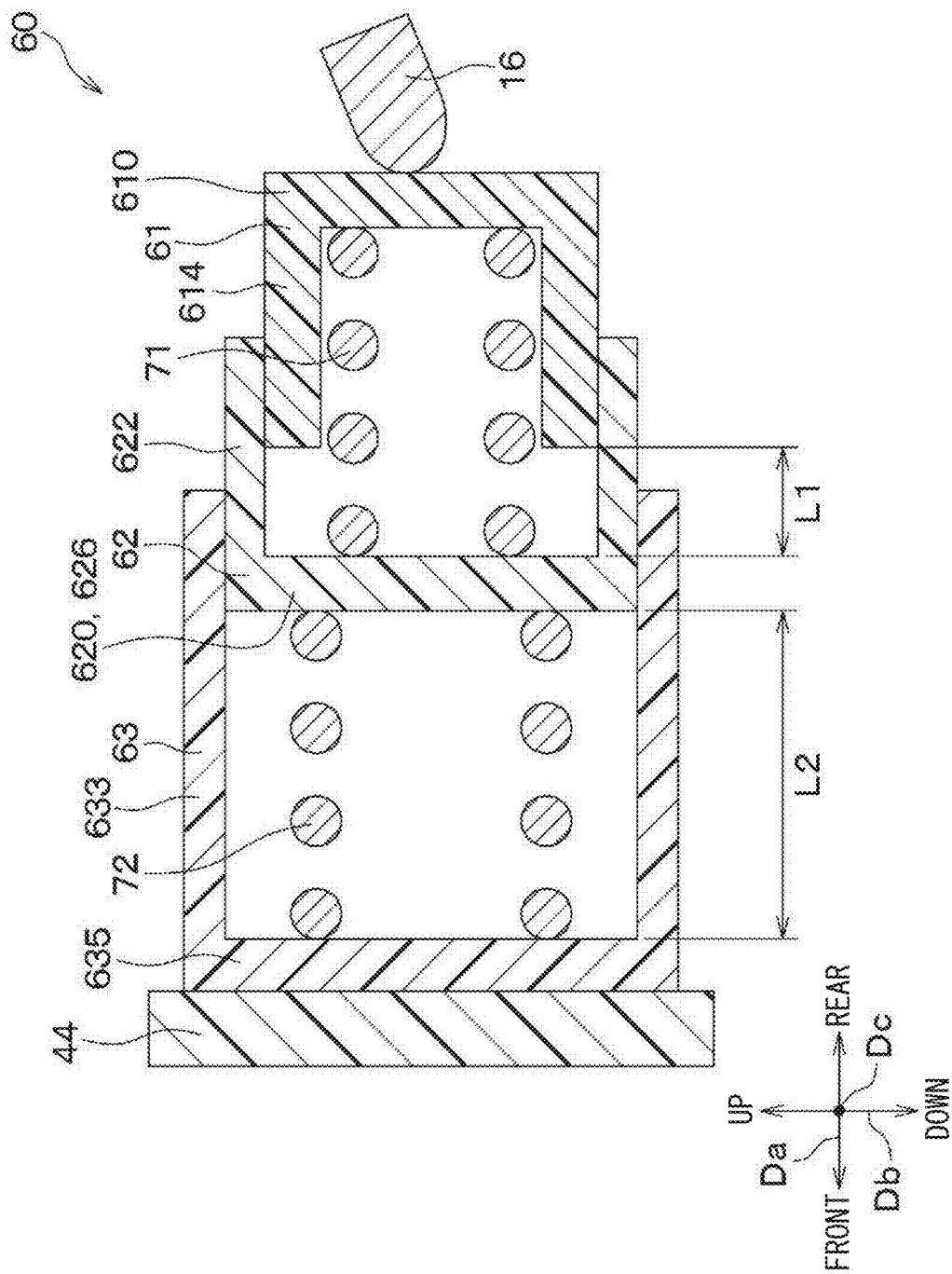
FIG. 13 is a cross-sectional view of a reaction force generating mechanism of a pedal device of a seventh embodiment.

In the seventh embodiment, as shown in FIG. 13, the configurations of the first guide portion 614 and the second guide portion 622 are different from those of the fifth embodiment. The rest of the present embodiment is the same as that of the fifth embodiment.

The first guide portion 614 is made of resin and is shaped in a cylindrical tubular form, and the first guide portion 614 is placed at the outside of the first resilient member 71.

The second guide portion 622 is made of resin instead of the metal. Furthermore, the second guide portion 622 is shaped in a cylindrical tubular form instead of the solid cylindrical form. Furthermore, a portion of the first guide portion 614 is inserted into a hole of the second guide portion 622. Here, a portion of the second guide portion 622 may be modified to be inserted into a hole of the first guide portion 614.

Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

Furthermore, a portion of the second guide portion 622 is inserted into a hole of the third guide portion 633. Thereby, the second guide portion 622 and the third guide portion 633 mutually limit each other's movement in the vehicle up-down direction Db. Also, since the second guide portion 622 and the third guide portion 633 extend in the vehicle front-rear direction Da, an outer peripheral surface of the second guide portion 622 and an inner peripheral surface of the third guide portion 633 slide relative to each other in the vehicle front-rear direction Da.

The pedal device 1 of the seventh embodiment is configured in the above-described manner. Even in the seventh embodiment, the advantages, which are similar to those of the fifth embodiment, are achieved.

Eighth Embodiment

Figure 14:
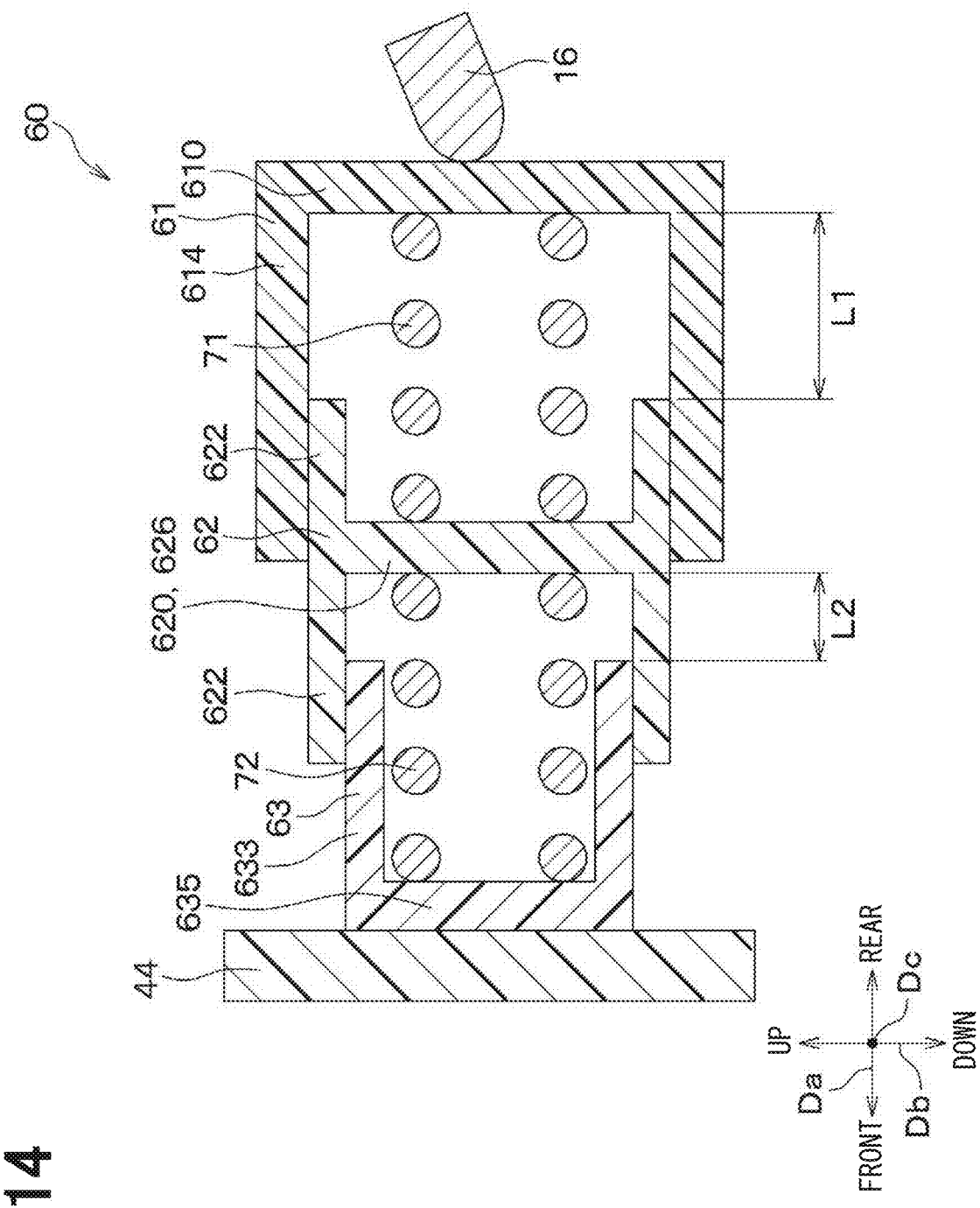
FIG. 14 is a cross-sectional view of a reaction force generating mechanism of a pedal device of an eighth embodiment.

In the eighth embodiment, as shown in FIG. 14, the configurations of the first guide portion 614 and the second guide portion 622 are different from those of the seventh embodiment. The rest of the present embodiment is the same as that of the seventh embodiment.

The second guide portion 622 extends from the second support portion 620 in the vehicle front-rear direction Da. Furthermore, a portion of the second guide portion 622 is inserted into a hole of the first guide portion 614. Here, a portion of the first guide portion 614 may be modified to be inserted into a hole of the second guide portion 622.

Thereby, the second guide portion 622 and the first guide portion 614 mutually limit each other's movement in the vehicle up-down direction Db. Furthermore, since the first guide portion 614 and the second guide portion 622 both extend in the vehicle front-rear direction Da, an inner peripheral surface of the first guide portion 614 and an outer peripheral surface of the second guide portion 622 slide relative to each other in the vehicle front-rear direction Da.

Furthermore, a portion of the third guide portion 633 is inserted into a hole of the second guide portion 622. Here, a portion of the second guide portion 622 may be modified to be inserted into a hole of the third guide portion 633.

Thereby, the second guide portion 622 and the third guide portion 633 mutually limit each other's movement in the vehicle up-down direction Db. Also, since the second guide portion 622 and the third guide portion 633 extend in the vehicle front-rear direction Da, an inner peripheral surface of the second guide portion 622 and an outer peripheral surface of the third guide portion 633 slide relative to each other in the vehicle front-rear direction Da.

The pedal device 1 of the eighth embodiment is configured in the above-described manner. Even in the eighth embodiment, the advantages, which are similar to those of the seventh embodiment, are achieved.

Ninth Embodiment

Figure 15:
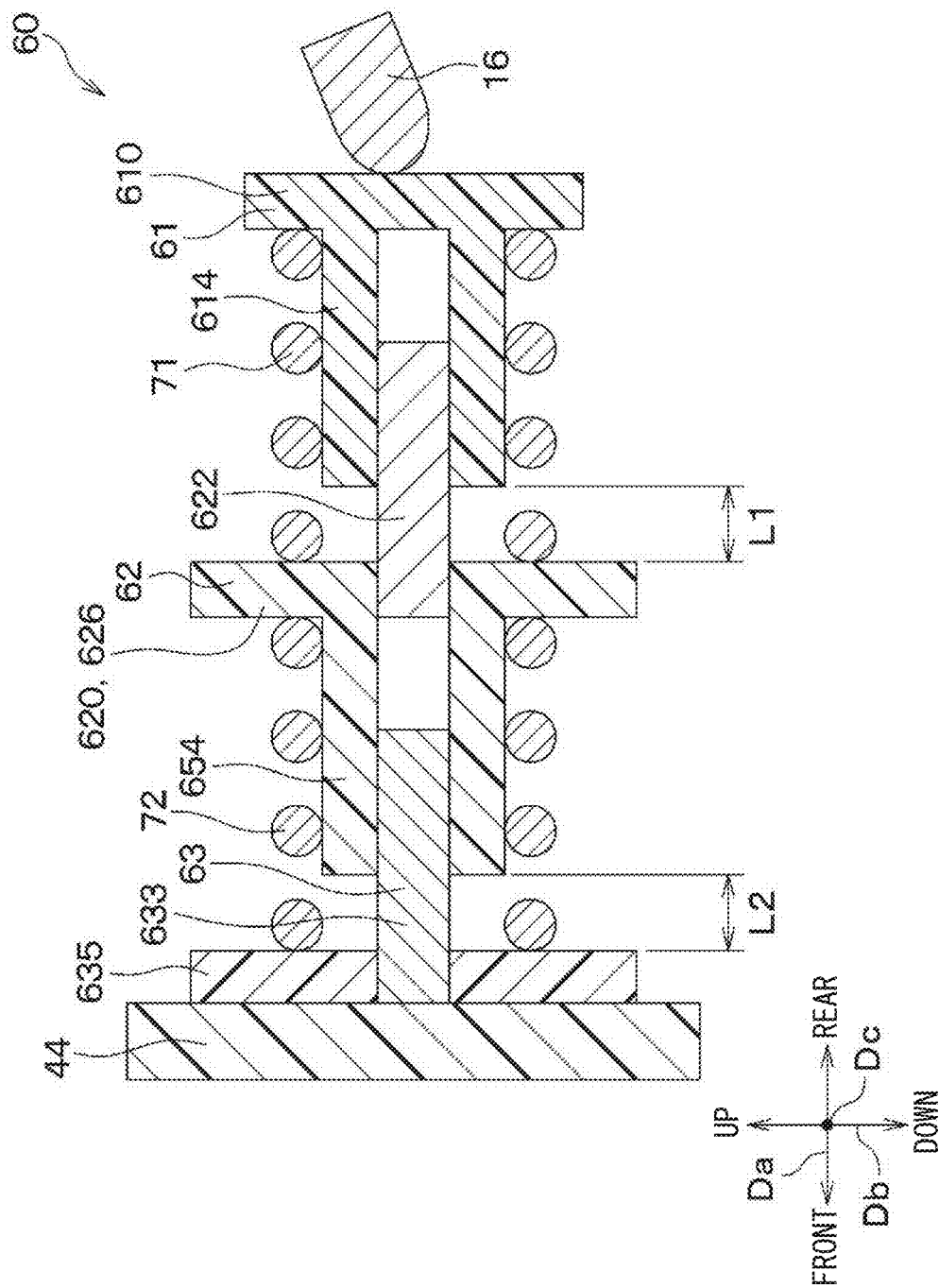
FIG. 15 is a cross-sectional view of a reaction force generating mechanism of a pedal device of a ninth embodiment.

In the ninth embodiment, as shown in FIG. 15, the configurations of the second holder 62 and the third guide portion 633 are different from those of the fifth embodiment. The rest of the present embodiment is the same as that of the fifth embodiment.

Furthermore, the second holder 62 includes a fourth guide portion 654 in addition to the second support portion 620, the third support portion 626 and the second guide portion 622.

The fourth guide portion 654 is made of, for example, resin. The fourth guide portion 654 is joined to the second support portion 620 and is shaped in a cylindrical tubular form such that the fourth guide portion 654 extends toward the vehicle front side from the boundary with the second support portion 620.

The third guide portion 633 is made of metal instead of the resin.

Furthermore, the third guide portion 633 is shaped in a solid cylindrical form instead of the cylindrical tubular form. Furthermore, a portion of the third guide portion 633 is inserted into a hole of the fourth guide portion 654. Thereby, the third guide portion 633 and the fourth guide portion 654 mutually limit each other's movement in the vehicle up-down direction Db. Also, since the third guide portion 633 and the fourth guide portion 654 extend in the vehicle front-rear direction Da, an outer peripheral surface of the third guide portion 633 and an inner peripheral surface of the fourth guide portion 654 slide relative to each other in the vehicle front-rear direction Da.

The pedal device 1 of the ninth embodiment is configured in the above-described manner. Even in the ninth embodiment, the advantages, which are similar to those of the fifth embodiment, are achieved.

Tenth Embodiment

Figure 16:
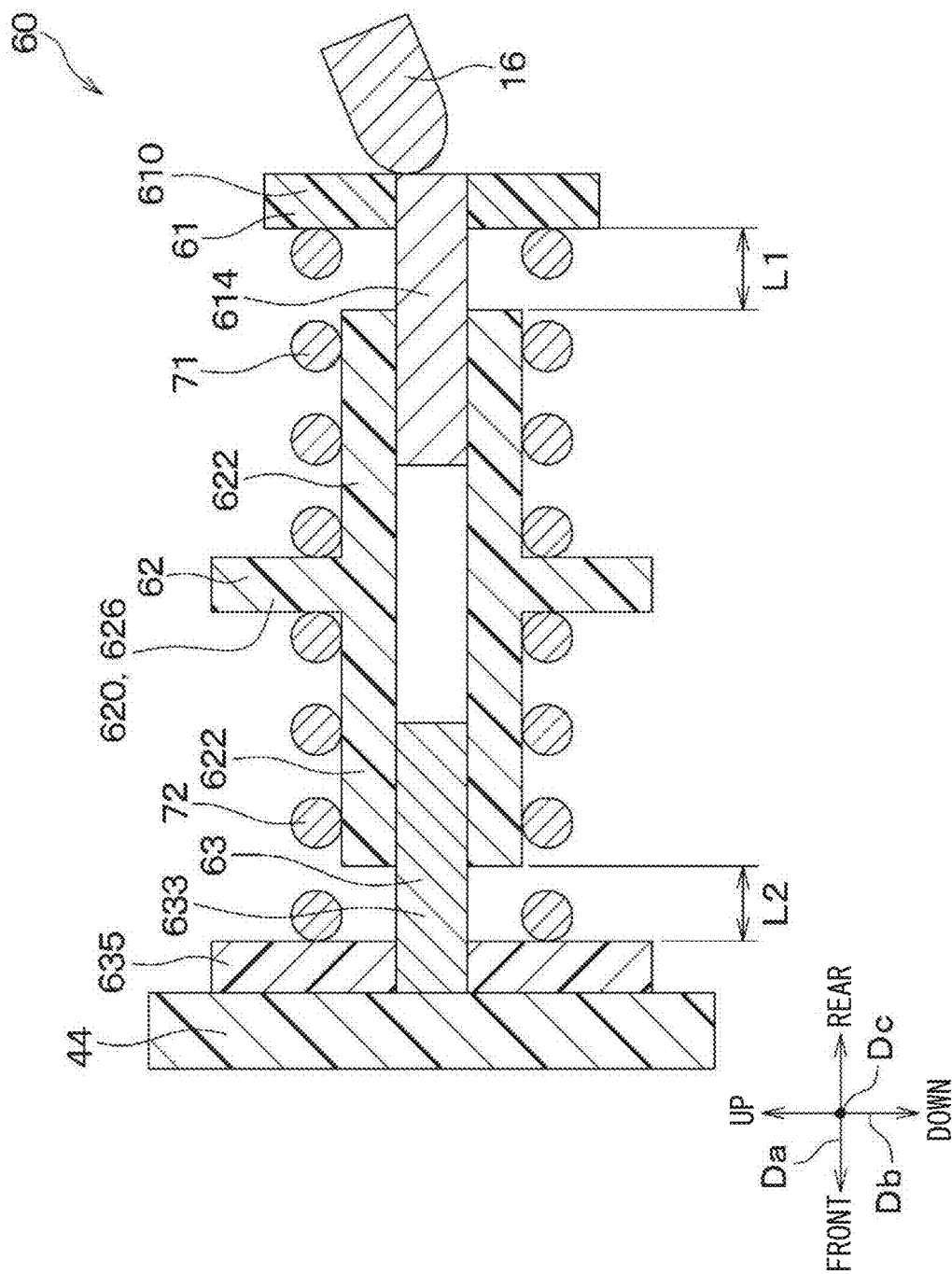
FIG. 16 is a cross-sectional view of a reaction force generating mechanism of a pedal device of a tenth embodiment.

In the tenth embodiment, as shown in FIG. 16, the configurations of the first guide portion 614, the second support portion 620, the third support portion 626, the second guide portion 622 and the third guide portion 633 are different from those of the fifth embodiment. The rest of the present embodiment is the same as that of the fifth embodiment.

The first guide portion 614 is made of metal instead of the resin. Furthermore, the first guide portion 614 is shaped in a solid cylindrical form instead of the cylindrical tubular form. The second support portion 620 and the third support portion 626 are shaped in a ring form.

The second guide portion 622 is made of resin instead of the metal. Also, the second guide portion 622 is shaped in a cylindrical tubular form extending in the vehicle front-rear direction Da instead of the solid cylindrical form. Furthermore, a hole of the second guide portion 622 is communicated with a hole of the second support portion 620. Furthermore, a portion of the first guide portion 614 is inserted into a hole of the second guide portion 622.

The third guide portion 633 is made of metal instead of the resin.

Furthermore, the third guide portion 633 is shaped in a solid cylindrical form instead of the cylindrical tubular form. Furthermore, a portion of the third guide portion 633 is inserted into a hole of the second guide portion 622. Thereby, the second guide portion 622 and the third guide portion 633 mutually limit each other's movement in the vehicle up-down direction Db. Also, since the second guide portion 622 and the third guide portion 633 extend in the vehicle front-rear direction Da, an inner peripheral surface of the second guide portion 622 and an outer peripheral surface of the third guide portion 633 slide relative to each other in the vehicle front-rear direction Da.

The pedal device 1 of the tenth embodiment is configured in the above-described manner. Even in the tenth embodiment, the advantages, which are similar to those of the fifth embodiment, are achieved.

Eleventh Embodiment

Figure 17:
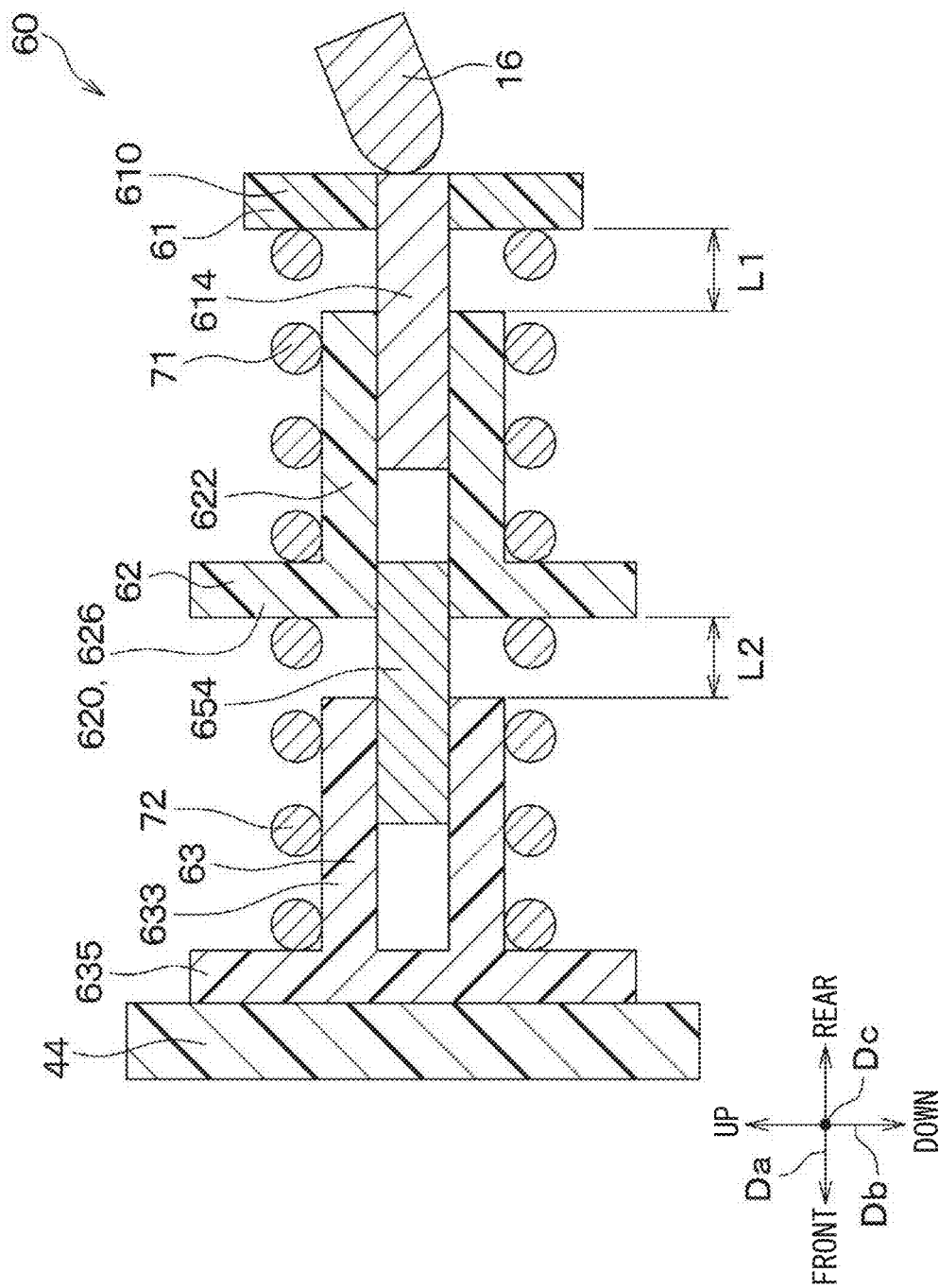
FIG. 17 is a cross-sectional view of a reaction force generating mechanism of a pedal device of an eleventh embodiment.

In the eleventh embodiment, as shown in FIG. 17, the configurations of the first guide portion 614, the second guide portion 622, the third guide portion 633 and the fourth guide portion 654 are different from those of the ninth embodiment. The rest of the present embodiment is the same as that of the ninth embodiment.

The first guide portion 614 is made of metal instead of the resin. Furthermore, the first guide portion 614 is shaped in a solid cylindrical form instead of the cylindrical tubular form.

The second guide portion 622 is made of resin instead of the metal. Furthermore, the second guide portion 622 is shaped in a cylindrical tubular form instead of the solid cylindrical form. Furthermore, a portion of the first guide portion 614 is inserted into a hole of the second guide portion 622. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

The third guide portion 633 is made of resin instead of the metal. Furthermore, the third guide portion 633 is shaped in a cylindrical tubular form instead of the solid cylindrical form.

The fourth guide portion 654 is made of metal instead of the resin. Furthermore, the fourth guide portion 654 is shaped in a solid cylindrical form instead of the cylindrical tubular form. Furthermore, a portion of the fourth guide portion 654 is inserted into a hole of the third guide portion 633. Thereby, the third guide portion 633 and the fourth guide portion 654 mutually limit each other's movement in the vehicle up-down direction Db. Also, since the third guide portion 633 and the fourth guide portion 654 extend in the vehicle front-rear direction Da, an inner peripheral surface of the third guide portion 633 and an outer peripheral surface of the fourth guide portion 654 slide relative to each other in the vehicle front-rear direction Da.

The pedal device 1 of the eleventh embodiment is configured in the above-described manner. Even in the eleventh embodiment, the advantages, which are similar to those of the ninth embodiment, are achieved.

Twelfth Embodiment

Figure 18:
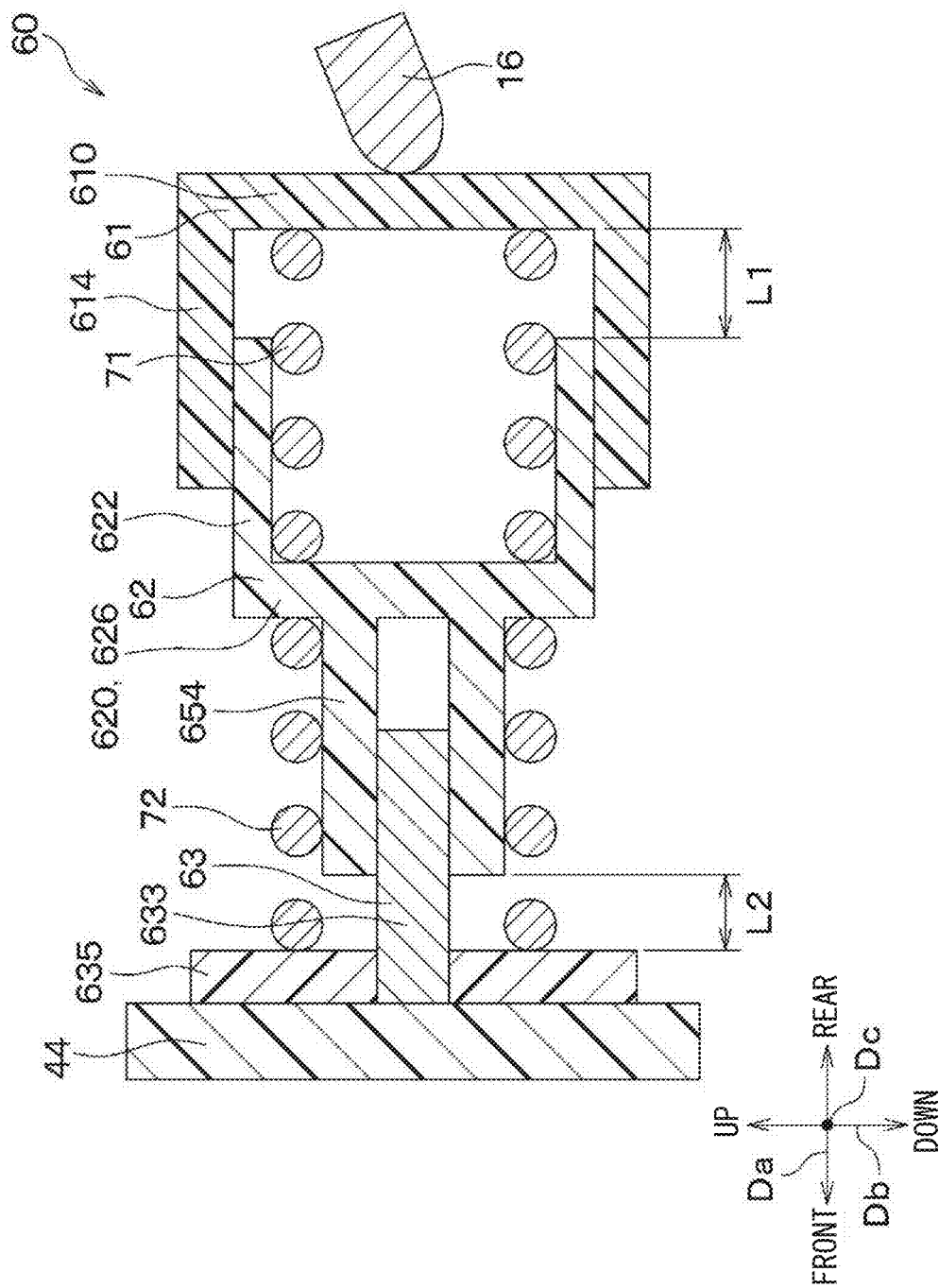
FIG. 18 is a cross-sectional view of a reaction force generating mechanism of a pedal device of a twelfth embodiment.

In the twelfth embodiment, as shown in FIG. 18, the configurations of the first guide portion 614 and the second guide portion 622 are different from those of the ninth embodiment. The rest of the present embodiment is the same as that of the ninth embodiment.

The first guide portion 614 is made of resin and is shaped in a cylindrical tubular form, and the first guide portion 614 is placed at the outside of the first resilient member 71.

The second guide portion 622 is made of resin instead of the metal. Furthermore, the second guide portion 622 is shaped in a cylindrical tubular form instead of the solid cylindrical form. Furthermore, a portion of the second guide portion 622 is inserted into a hole of the first guide portion 614. Here, a portion of the first guide portion 614 may be modified to be inserted into a hole of the second guide portion 622.

Thereby, the first guide portion 614 and the second guide portion 622 mutually limit each other's movement in the vehicle up-down direction Db. Furthermore, since the first guide portion 614 and the second guide portion 622 both extend in the vehicle front-rear direction Da, an inner peripheral surface of the first guide portion 614 and an outer peripheral surface of the second guide portion 622 slide relative to each other in the vehicle front-rear direction Da.

The pedal device 1 of the twelfth embodiment is configured in the above-described manner. Even in the twelfth embodiment, the advantages, which are similar to those of the ninth embodiment, are achieved.

Thirteenth Embodiment

Figure 19:
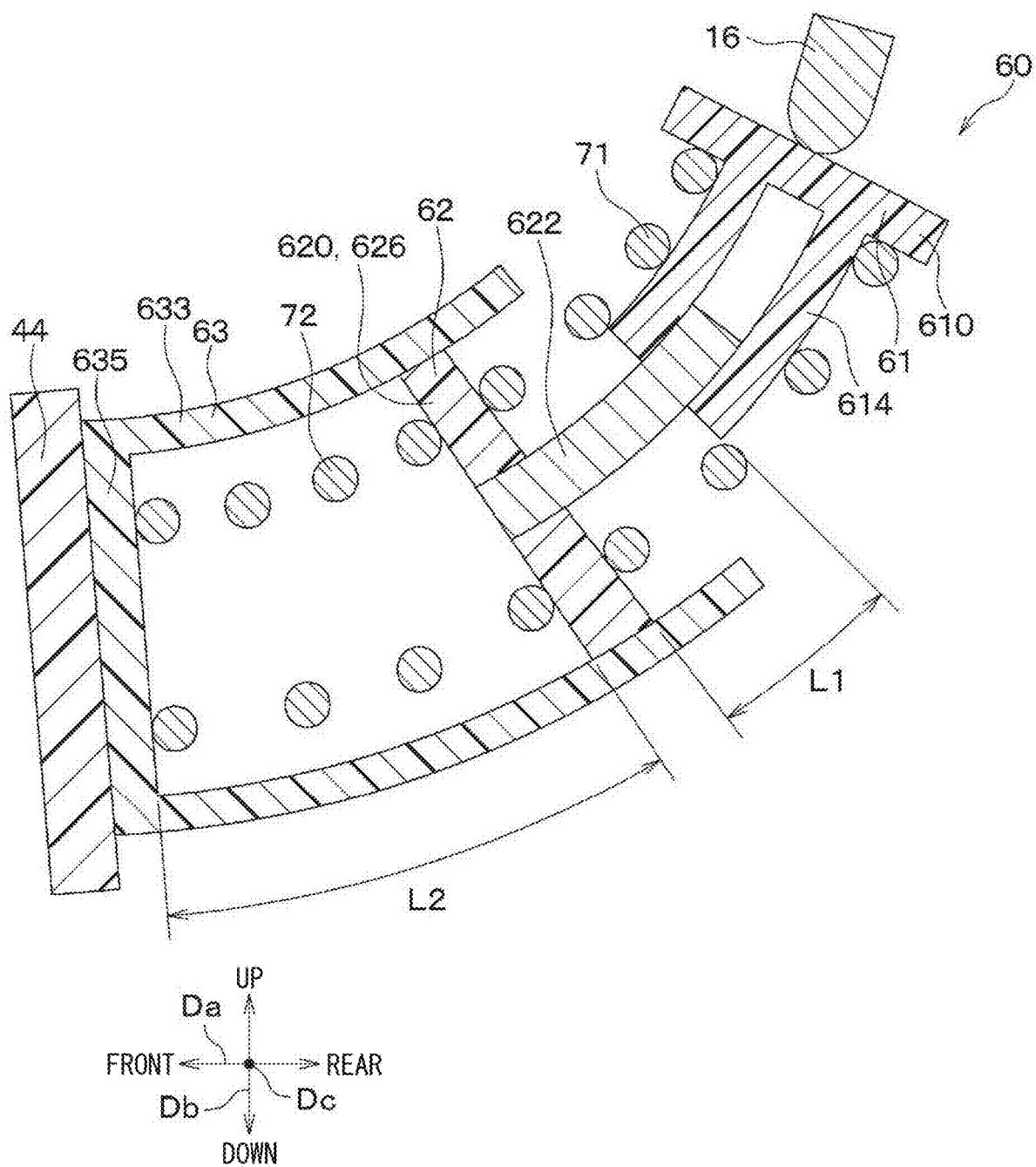
FIG. 19 is a cross-sectional view of a reaction force generating mechanism of a pedal device of a thirteenth embodiment.

In the thirteenth embodiment, as shown in FIG. 19, the configurations of the first support portion 610, the first guide portion 614, the second support portion 620, the second guide portion 622, the third guide portion 633, the first resilient member 71 and the second resilient member 72 are different from those of the fifth embodiment. The rest of the present embodiment is the same as that of the fifth embodiment.

The first support portion 610 extends in a direction that intersects both the vehicle front-rear direction Da and the vehicle up-down direction Db.

The first guide portion 614 is joined to the first support portion 610 and extends from the boundary with the first support portion 610 in a clockwise direction, which is one of two opposite rotational directions centered on an axis extending in the vehicle left-right direction Dc.

The second support portion 620 extends in a direction that intersects both the vehicle front-rear direction Da and the vehicle up-down direction Db.

The second guide portion 622 is joined to the second support portion 620 and extends from the boundary with the second support portion 620 in a counterclockwise direction, which is the other one of the two opposite rotational directions centered on the axis extending in the vehicle left-right direction Dc.

The third guide portion 633 is joined to the guide member bottom portion 635 and extends from the boundary with the guide member bottom portion 635 in the counterclockwise direction, which is the other one of the two opposite rotational directions centered on the axis extending in the vehicle left-right direction Dc.

Instead of being resiliently deformed in the linear moving direction, each of the first resilient member 71 and the second resilient member 72 is configured to be resiliently deformed in the clockwise direction among the two opposite rotational directions centered on the axis extending in the vehicle left-right direction Dc. The vehicle left-right direction Dc serves as an axial direction of the rotational axis O. The deforming direction of each of the first resilient member 71 and the second resilient member 72 corresponds to a tangential direction of a circle centered on the rotational axis O.

The pedal device 1 of the thirteenth embodiment is configured in the above-described manner. Even in the thirteenth embodiment, the advantages, which are similar to those of the fifth embodiment, are achieved. Furthermore, in the thirteenth embodiment, the following advantages are also achieved.

[2] The deforming direction of each of the first resilient member 71 and the second resilient member 72 is the rotational direction centered on the axis extending in the vehicle left-right direction Dc. With this configuration, compared to the case where the deforming direction of each of the first resilient member 71 and the second resilient member 72 is the linear moving direction (i.e., the linear direction), a length of each of the first resilient member 71 and the second resilient member 72 can be increased by the amount of length in the direction that intersects the linear moving direction. Therefore, since the deforming range of each of the first resilient member 71 and the second resilient member 72 is increased, the moving range of each of the first holder 61 and the second holder 62 is increased. Thus, by increasing the rotational moving range of the pedal 10, the pressing of the pedal 10 can be easily adjusted.

Fourteenth Embodiment

Figure 20:
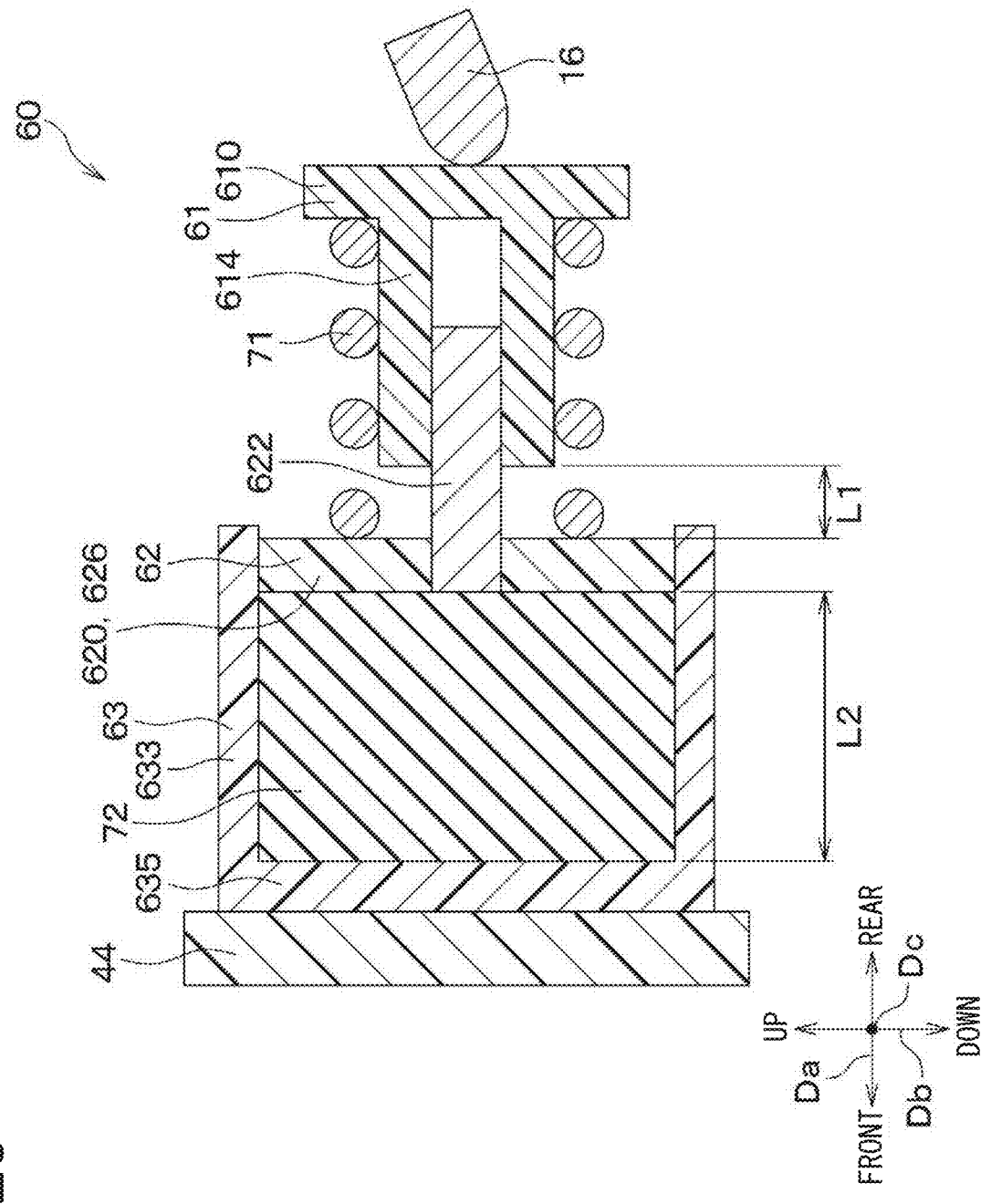
FIG. 20 is a cross-sectional view of a reaction force generating mechanism of a pedal device of a fourteenth embodiment.

In the fourteenth embodiment, as shown in FIG. 20, a form of the second resilient member 72 is different from that of the fifth embodiment. The rest of the present embodiment is the same as that of the fifth embodiment.

The second resilient member 72 is made of rubber instead of the coil spring. Here, the first resilient member 71 may be made of rubber instead of the coil spring.

The pedal device 1 of the fourteenth embodiment is configured in the above-described manner. Even in the fourteenth embodiment, the advantages, which are similar to those of the fifth embodiment, are achieved.

Fifteenth Embodiment

Figure 21:
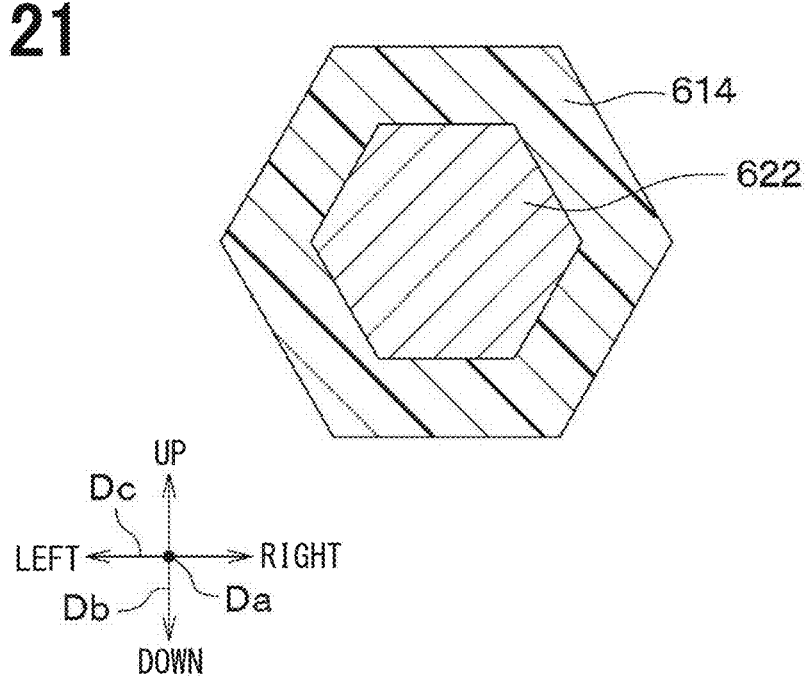
FIG. 21 is a cross-sectional view of a first guide portion and a second guide portion of a pedal device of a fifteenth embodiment.
Figure 22:
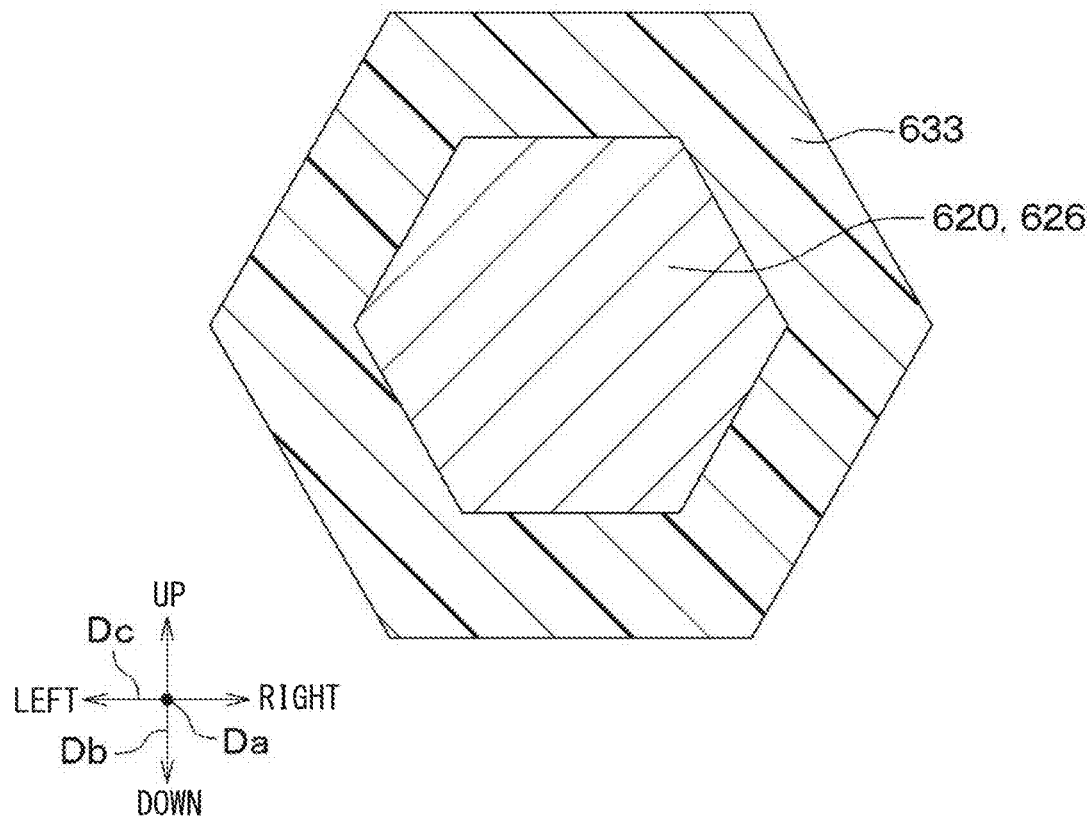
FIG. 22 is a cross-sectional view of a second support portion and a third guide portion of the pedal device.

In the fifteenth embodiment, as shown in FIGS. 21 and 22, the configurations of the first guide portion 614, the second guide portion 622, the second support portion 620, the third support portion 626 and the third guide portion 633 are different from those of the fifth embodiment. The rest of the present embodiment is the same as that of the fifth embodiment.

As shown in FIG. 21, the first guide portion 614 is shaped in a polygonal tubular form, such as a hexagonal tubular form instead of the cylindrical tubular form. The second guide portion 622 is shaped in a solid polygonal columnar form, such as a solid hexagonal columnar form, which corresponds to a shape of a hole of the first guide portion 614, instead of the solid cylindrical form.

As shown in FIG. 22, each of the second support portion 620 and the third support portion 626 is shaped in a polygonal plate form, such as a hexagonal plate form, instead of the circular plate form. The third guide portion 633 is shaped in a polygonal tubular form, such as a hexagonal tubular form, which corresponds to the shape of each of the second support portion 620 and the third support portion 626, instead of the cylindrical tubular form.

The pedal device 1 of the fifteenth embodiment is configured in the above-described manner. Even in the fifteenth embodiment, the advantages, which are similar to those of the fifth embodiment, are achieved.

Sixteenth Embodiment

Figure 23:
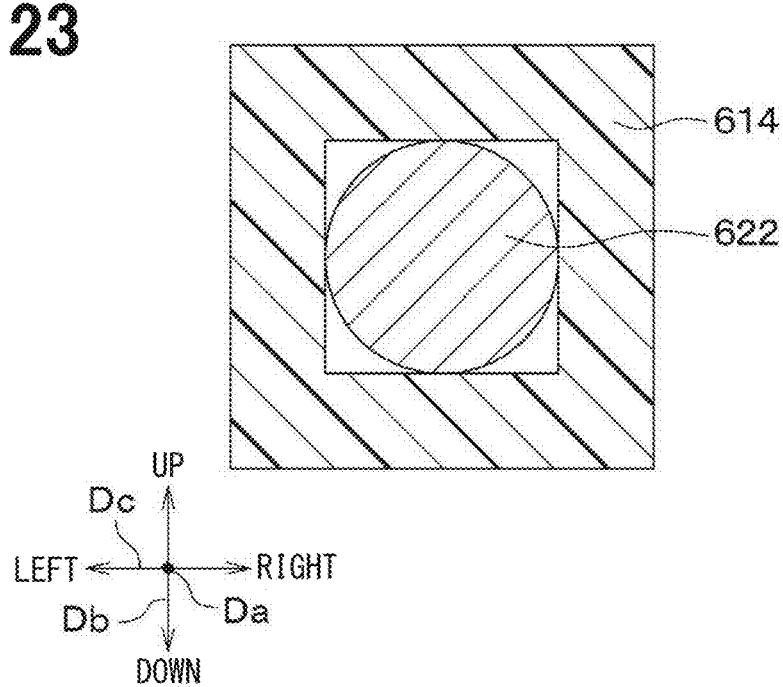
FIG. 23 is a cross-sectional view of a first guide portion and a second guide portion of a pedal device of a sixteenth embodiment.
Figure 24:
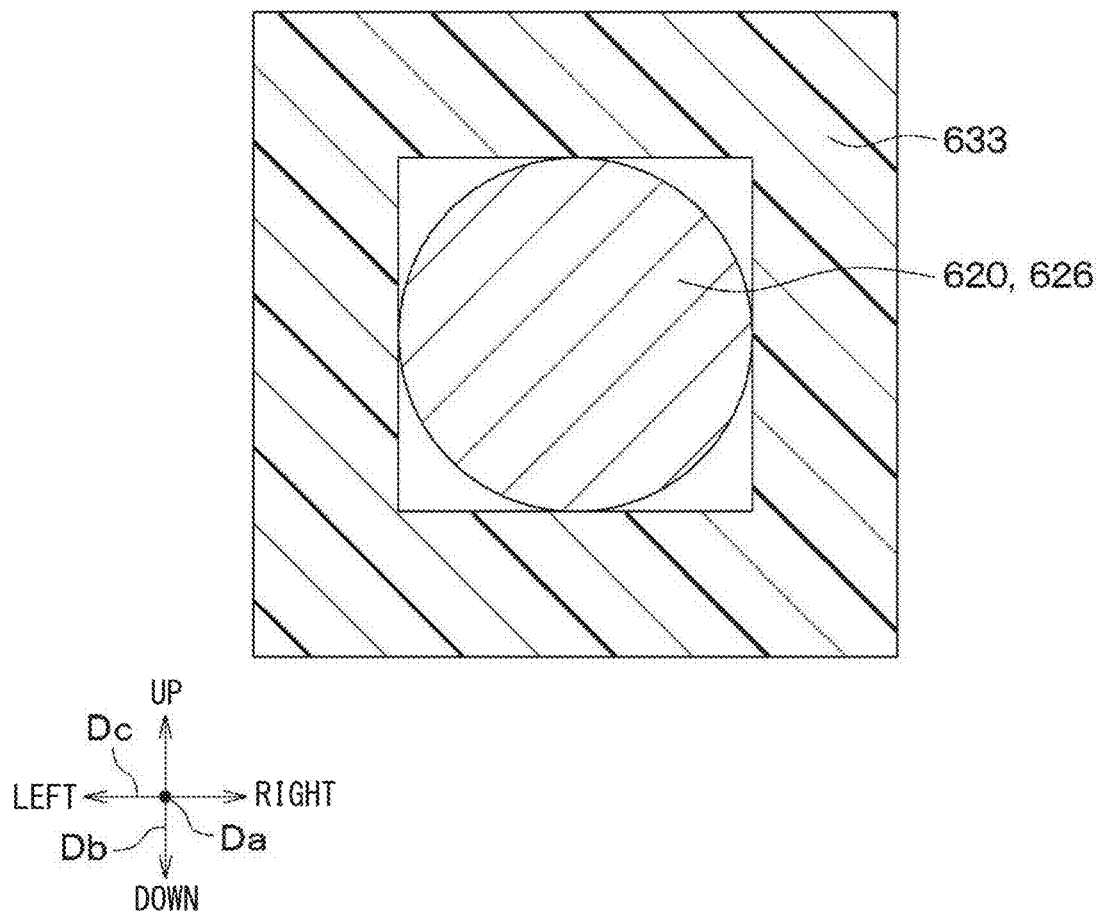
FIG. 24 is a cross-sectional view of a second support portion and a third guide portion of the pedal device.

In the sixteenth embodiment, as shown in FIGS. 23 and 24, the configurations of the first guide portion 614 and the third guide portion 633 are different from those of the fifth embodiment.

As shown in FIG. 23, the first guide portion 614 is shaped in a polygonal tubular form, such as a square tubular form, instead of the cylindrical tubular form. As shown in FIG. 24, the third guide portion 633 is shaped in a polygonal tubular form, such as a square tubular form, instead of the cylindrical tubular form.

The pedal device 1 of the sixteenth embodiment is configured in the above-described manner. Even in the sixteenth embodiment, the advantages, which are similar to those of the fifth embodiment, are achieved.

Seventeenth Embodiment

Figure 25:
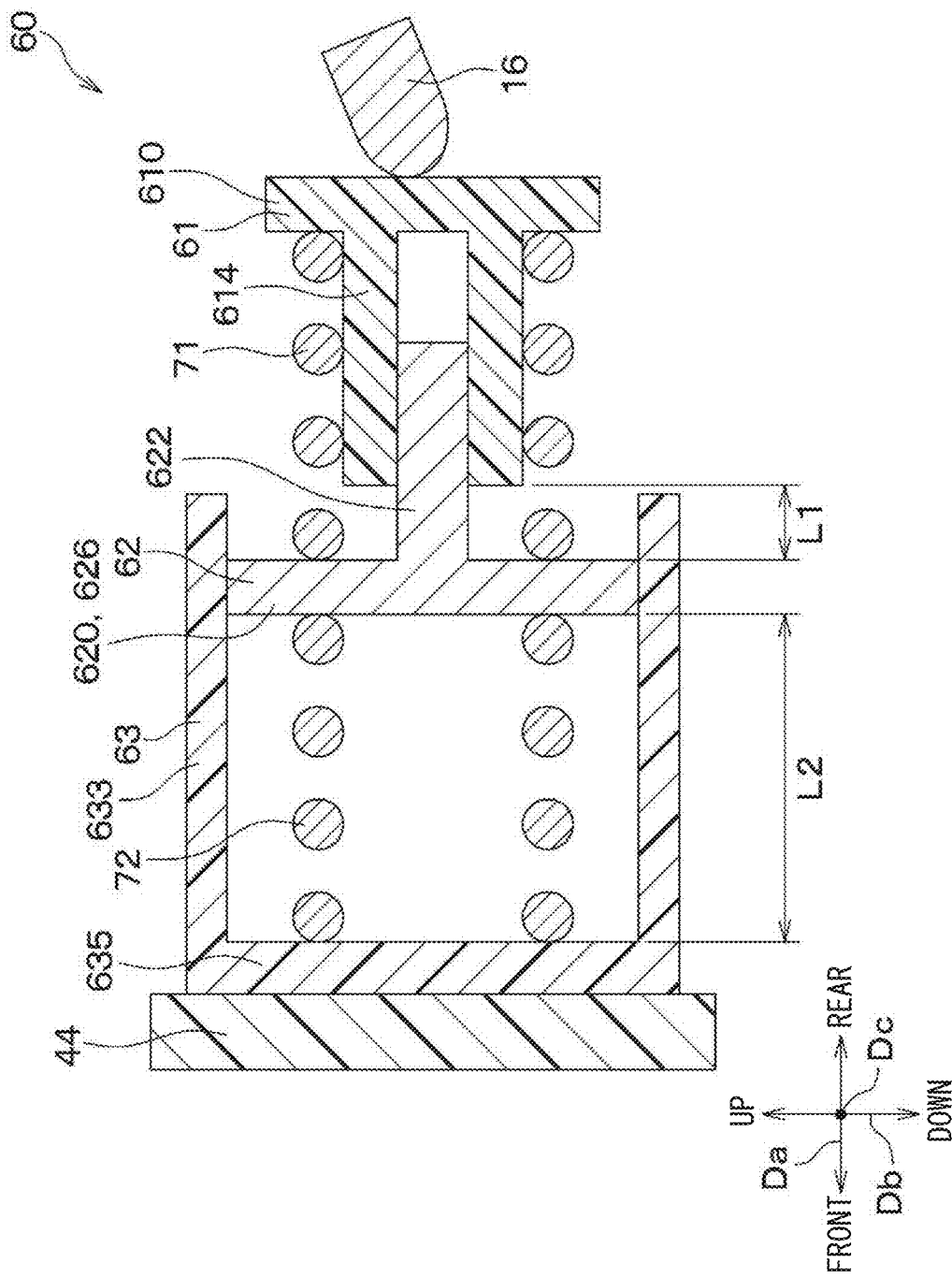
FIG. 25 is a cross-sectional view of a reaction force generating mechanism of a pedal device of a seventeenth embodiment.

In the seventeenth embodiment, as shown in FIG. 25, the configurations of the second support portion 620 and the third support portion 626 are different from those of the fifth embodiment. Specifically, each of the second support portion 620 and the third support portion 626 is made of metal instead of the resin. The rest of the present embodiment is the same as that of the fifth embodiment.

The pedal device 1 of the seventeenth embodiment is configured in the above-described manner. Even in the seventeenth embodiment, the advantages, which are similar to those of the fifth embodiment, are achieved.

Eighteenth Embodiment

Figure 26:
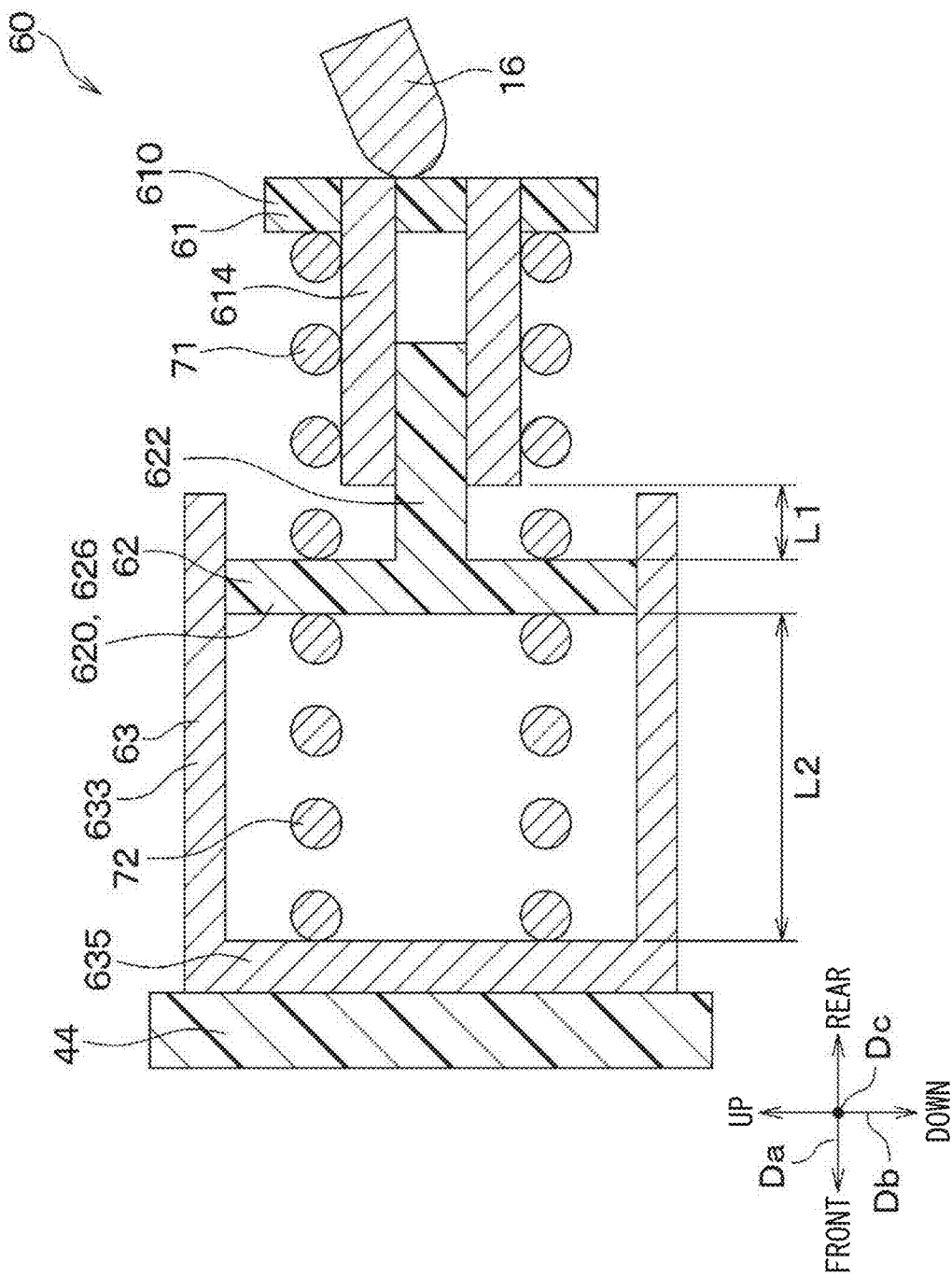
FIG. 26 is a cross-sectional view of a reaction force generating mechanism of a pedal device of an eighteenth embodiment.

In the eighteenth embodiment, as shown in FIG. 26, the configurations of the first guide portion 614, the second holder 62 and the guide member 63 are different from those of the seventeenth embodiment. The rest of the present embodiment is the same as that of the seventeenth embodiment.

The first guide portion 614 is made of metal instead of the resin. Furthermore, the second support portion 620, the second guide portion 622 and the third support portion 626 of the second holder 62 are respectively made of resin instead of the metal. In addition, the third guide portion 633 and the guide member bottom portion 635 of the guide member 63 are respectively made of metal instead of the resin.

The pedal device 1 of the eighteenth embodiment is configured in the above-described manner. Even in the eighteenth embodiment, the advantages, which are similar to those of the seventeenth embodiment, are achieved.

Nineteenth Embodiment

Figure 27:
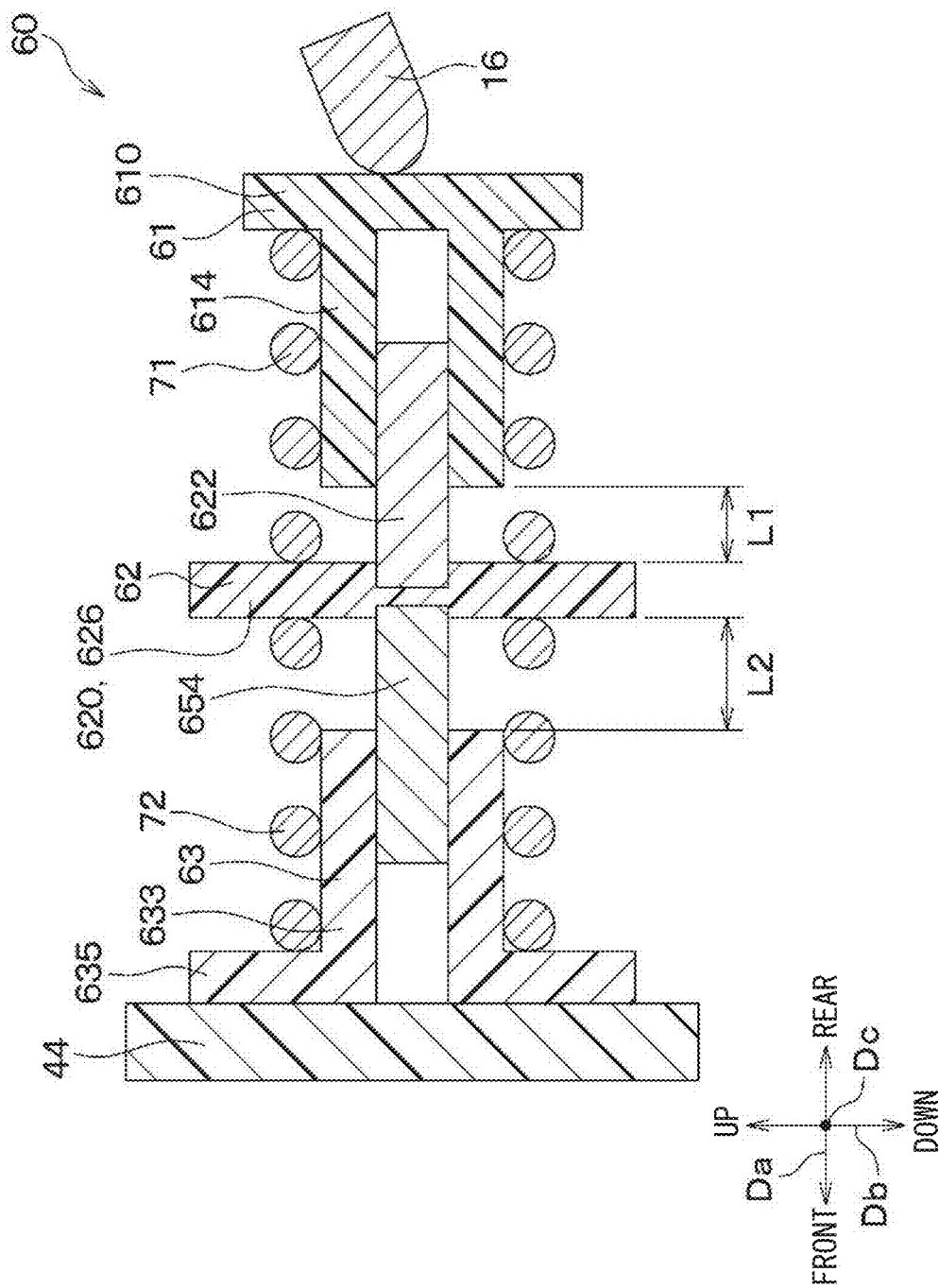
FIG. 27 is a cross-sectional view of a reaction force generating mechanism of a pedal device of a nineteenth embodiment.

In the nineteenth embodiment, as shown in FIG. 27, the configurations of the third guide portion 633 and the fourth guide portion 654 are different from those of the ninth embodiment. The rest of the present embodiment is the same as that of the ninth embodiment.

The third guide portion 633 is made of resin instead of the metal. Furthermore, the third guide portion 633 is shaped in a cylindrical tubular form instead of the solid cylindrical form.

The fourth guide portion 654 is made of metal instead of the resin. Furthermore, the fourth guide portion 654 is shaped in a solid cylindrical form instead of the cylindrical tubular form. Furthermore, a portion of the fourth guide portion 654 is inserted into a hole of the third guide portion 633. Thereby, the third guide portion 633 and the fourth guide portion 654 mutually limit each other's movement in the vehicle up-down direction Db. Also, since the third guide portion 633 and the fourth guide portion 654 extend in the vehicle front-rear direction Da, an inner peripheral surface of the third guide portion 633 and an outer peripheral surface of the fourth guide portion 654 slide relative to each other in the vehicle front-rear direction Da.

The pedal device 1 of the nineteenth embodiment is configured in the above-described manner. Even in the nineteenth embodiment, the advantages, which are similar to those of the ninth embodiment, are achieved.

Twentieth Embodiment

Figure 28:
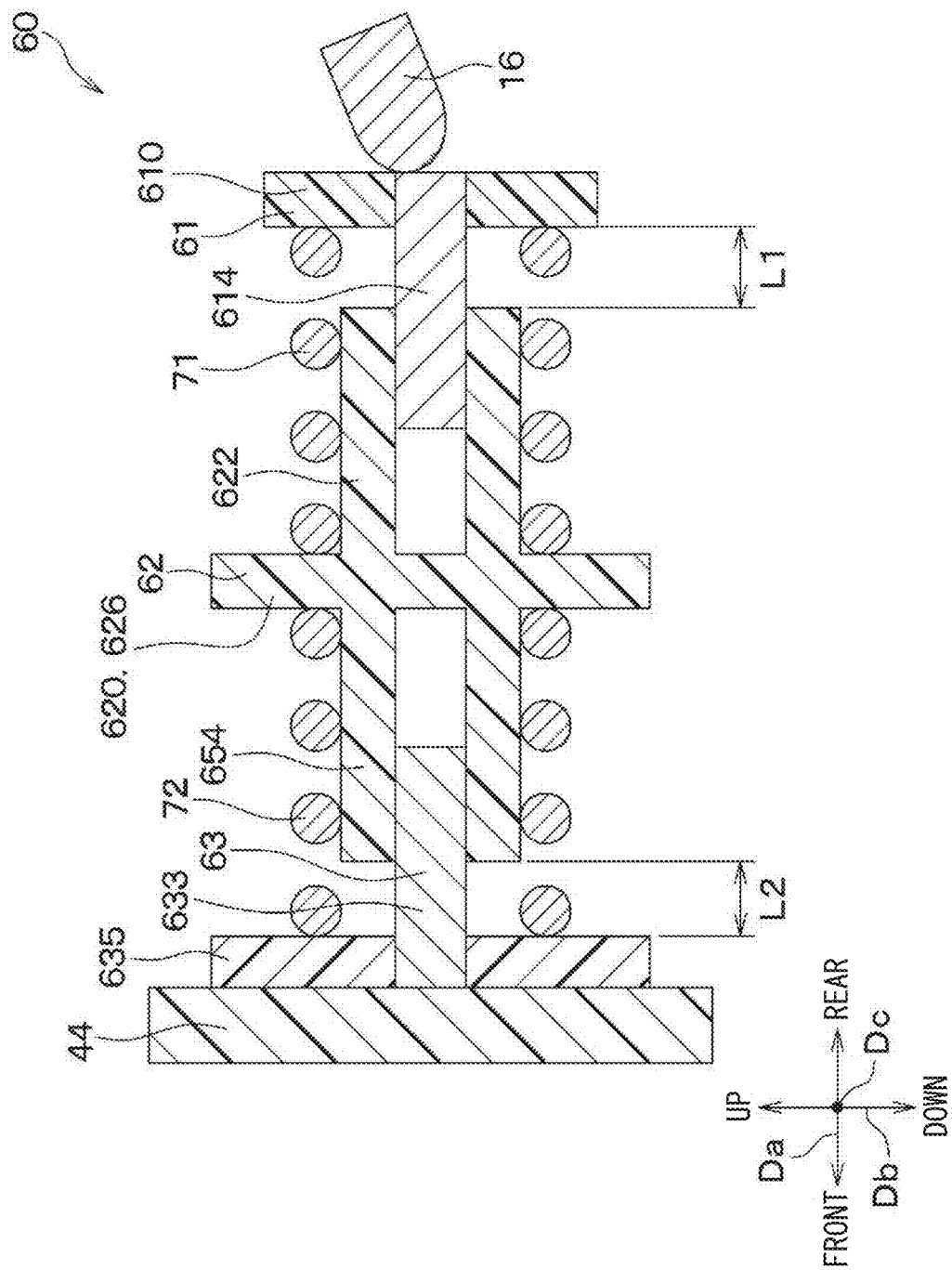
FIG. 28 is a cross-sectional view of a reaction force generating mechanism of a pedal device of a twentieth embodiment.

In the twentieth embodiment, as shown in FIG. 28, the configurations of the first guide portion 614 and the second guide portion 622 are different from those of the ninth embodiment. The rest of the present embodiment is the same as that of the ninth embodiment.

The first guide portion 614 is made of metal instead of the resin. Furthermore, the first guide portion 614 is shaped in a solid cylindrical form instead of the cylindrical tubular form.

The second guide portion 622 is made of resin instead of the metal. Furthermore, the second guide portion 622 is shaped in a cylindrical tubular form instead of the solid cylindrical form. Furthermore, a portion of the first guide portion 614 is inserted into a hole of the second guide portion 622. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

The pedal device 1 of the twentieth embodiment is configured in the above-described manner. Even in the twentieth embodiment, the advantages, which are similar to those of the ninth embodiment, are achieved.

Twenty-First Embodiment

Figure 29:
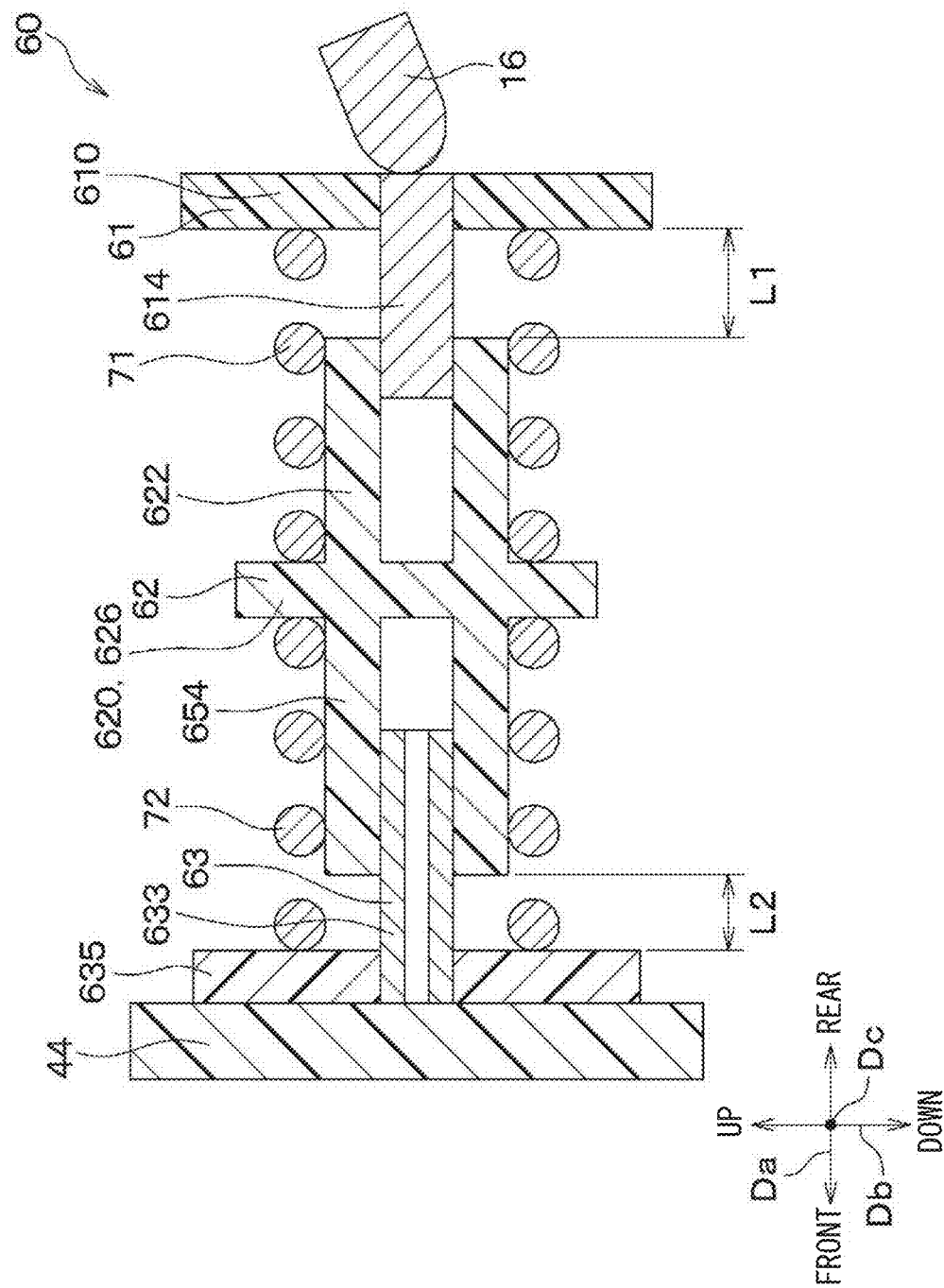
FIG. 29 is a cross-sectional view of a reaction force generating mechanism of a pedal device of a twenty-first embodiment.

In the twenty-first embodiment, as shown in FIG. 29, the configurations of the first guide portion 614, the second guide portion 622 and the third guide portion 633 are different from those of the twelfth embodiment. The rest of the present embodiment is the same as that of the twelfth embodiment.

The first guide portion 614 is made of metal instead of the resin. Furthermore, the first guide portion 614 is shaped in a solid cylindrical form instead of the cylindrical tubular form.

Furthermore, the second guide portion 622 is placed at the inside of the first resilient member 71. Furthermore, a portion of the first guide portion 614 is inserted into a hole of the second guide portion 622. Thereby, the first guide portion 614 and the second guide portion 622 mutually limit each other's movement in the vehicle up-down direction Db. Furthermore, since the first guide portion 614 and the second guide portion 622 both extend in the vehicle front-rear direction Da, an outer peripheral surface of the first guide portion 614 and an inner peripheral surface of the second guide portion 622 slide relative to each other in the vehicle front-rear direction Da.

The third guide portion 633 is shaped in a cylindrical tubular form instead of the solid cylindrical form. Furthermore, a portion of the third guide portion 633 is inserted into a hole of the fourth guide portion 654. Here, a portion of the fourth guide portion 654 may be modified to be inserted into a hole of the third guide portion 633.

Thereby, the third guide portion 633 and the fourth guide portion 654 mutually limit each other's movement in the vehicle up-down direction Db. Also, since the third guide portion 633 and the fourth guide portion 654 extend in the vehicle front-rear direction Da, an outer peripheral surface of the third guide portion 633 and an inner peripheral surface of the fourth guide portion 654 slide relative to each other in the vehicle front-rear direction Da.

The pedal device 1 of the twenty-first embodiment is configured in the above-described manner. Even in the twenty-first embodiment, the advantages, which are similar to those of the twelfth embodiment, are achieved.

Twenty-Second Embodiment

Figure 30:
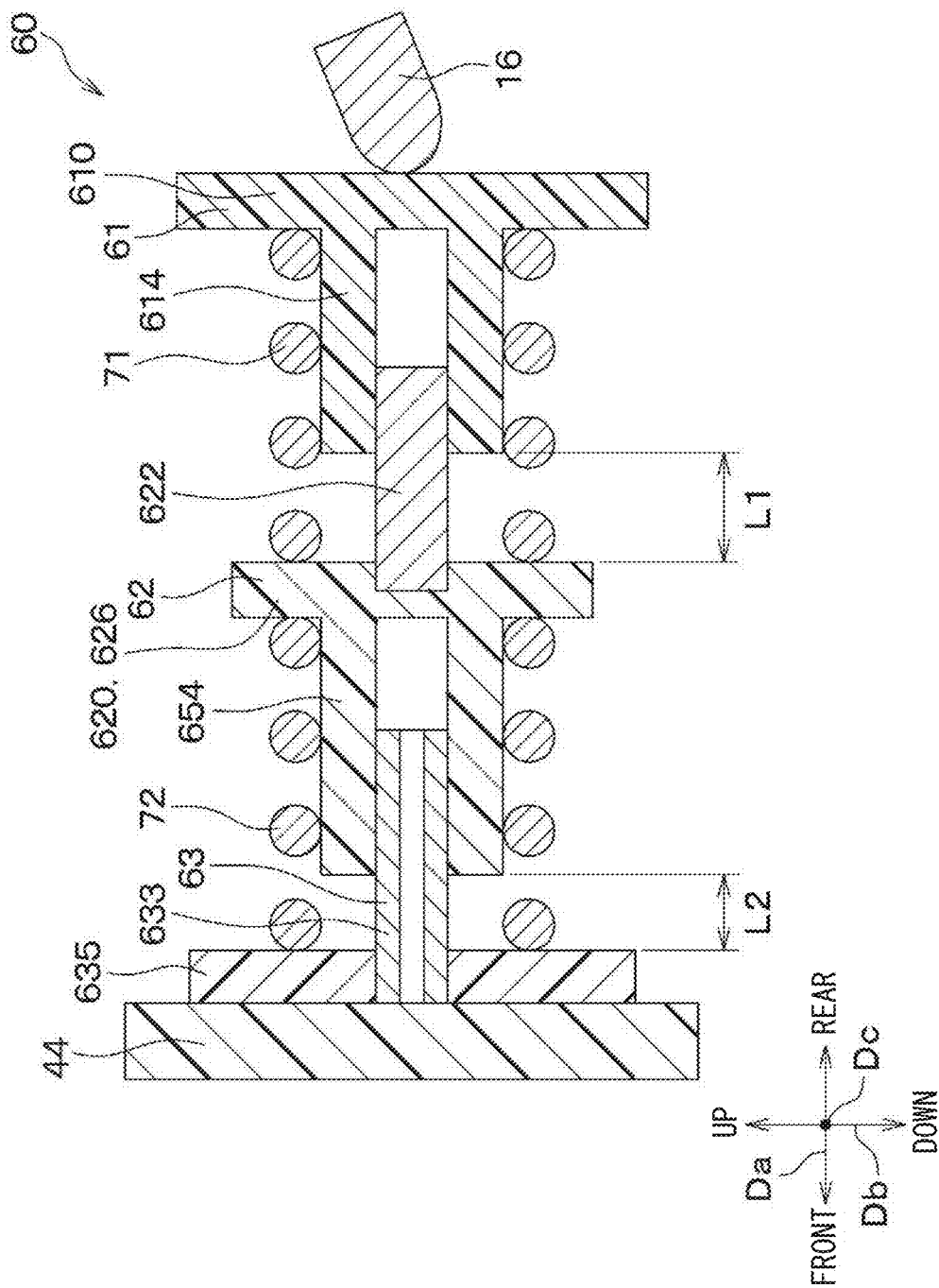
FIG. 30 is a cross-sectional view of a reaction force generating mechanism of a pedal device of a twenty-second embodiment.

In the twenty-second embodiment, as shown in FIG. 30, the configurations of the first guide portion 614 and the second guide portion 622 are different from those of the twenty-first embodiment. The rest of the present embodiment is the same as that of the twenty-first embodiment.

The first guide portion 614 is made of resin instead of the metal. Furthermore, the first guide portion 614 is shaped in a cylindrical tubular form instead of the solid cylindrical form.

The second guide portion 622 is made of metal instead of the resin. Furthermore, the second guide portion 622 is shaped in a solid cylindrical form instead of the cylindrical tubular form. Furthermore, a portion of the second guide portion 622 is inserted into a hole of the first guide portion 614. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an inner peripheral surface of the first guide portion 614 and an outer peripheral surface of the second guide portion 622 slide relative to each other in the vehicle front-rear direction Da.

The pedal device 1 of the twenty-second embodiment is configured in the above-described manner. Even in the twenty-second embodiment, the advantages, which are similar to those of the twenty-first embodiment, are achieved.

Twenty-Third Embodiment

Figure 31:
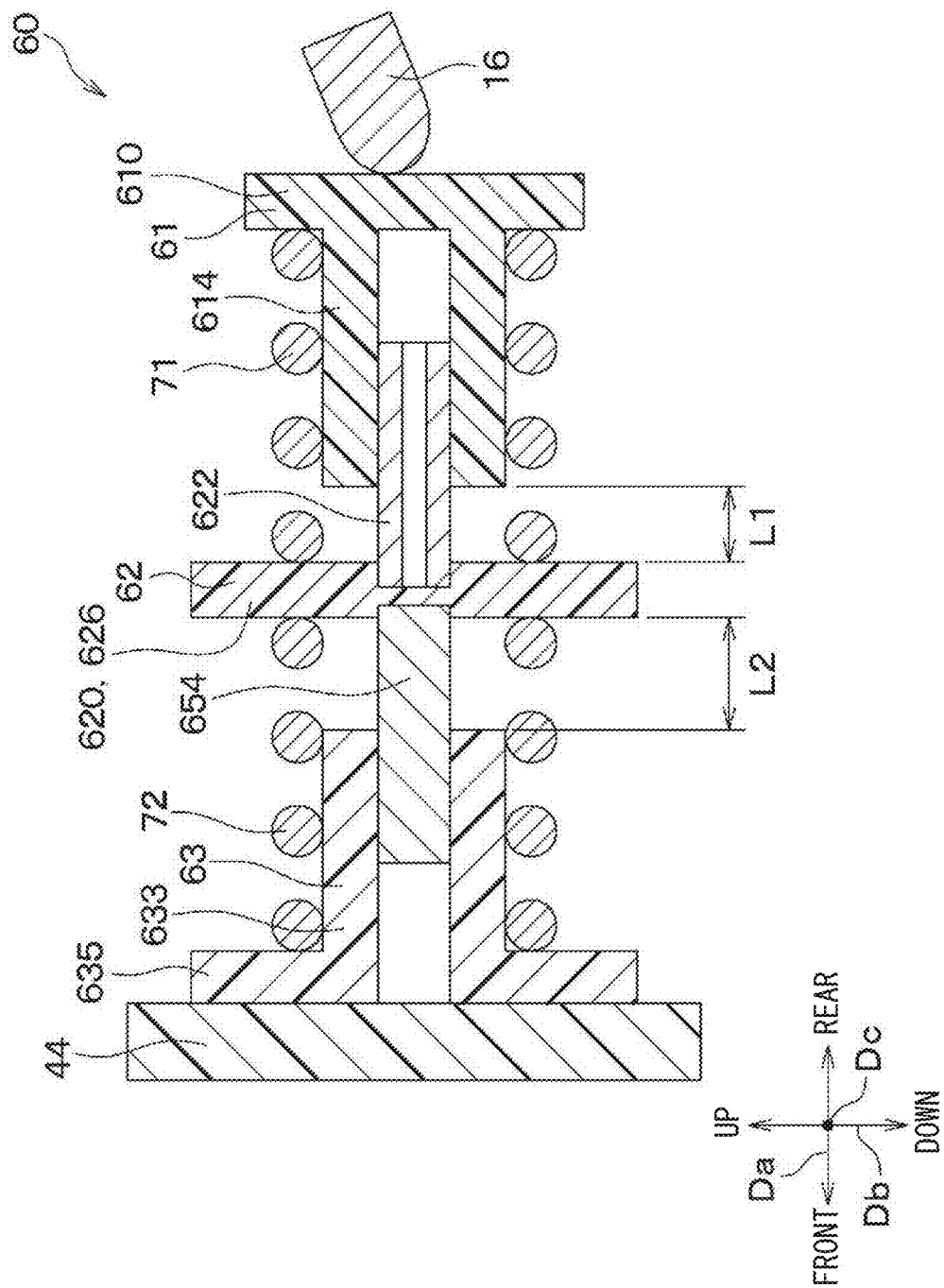
FIG. 31 is a cross-sectional view of a reaction force generating mechanism of a pedal device of a twenty-third embodiment.

In the twenty-third embodiment, as shown in FIG. 31, the configurations of the first guide portion 614, the second guide portion 622, the third guide portion 633 and the fourth guide portion 654 are different from those of the twelfth embodiment. The rest of the present embodiment is the same as that of the twelfth embodiment.

The first guide portion 614 and the second guide portion 622 are placed at the inside of the first resilient member 71.

The third guide portion 633 is made of resin instead of the metal. Furthermore, the third guide portion 633 is shaped in a cylindrical tubular form instead of the solid cylindrical form.

The fourth guide portion 654 is made of metal instead of the resin. Furthermore, the fourth guide portion 654 is shaped in a solid cylindrical form instead of the cylindrical tubular form. Furthermore, a portion of the fourth guide portion 654 is inserted into a hole of the third guide portion 633. Thereby, the third guide portion 633 and the fourth guide portion 654 mutually limit each other's movement in the vehicle up-down direction Db. Also, since the third guide portion 633 and the fourth guide portion 654 extend in the vehicle front-rear direction Da, an inner peripheral surface of the third guide portion 633 and an outer peripheral surface of the fourth guide portion 654 slide relative to each other in the vehicle front-rear direction Da.

The pedal device 1 of the twenty-third embodiment is configured in the above-described manner. Even in the twenty-third embodiment, the advantages, which are similar to those of the twelfth embodiment, are achieved.

Twenty-Fourth Embodiment

Figure 32:
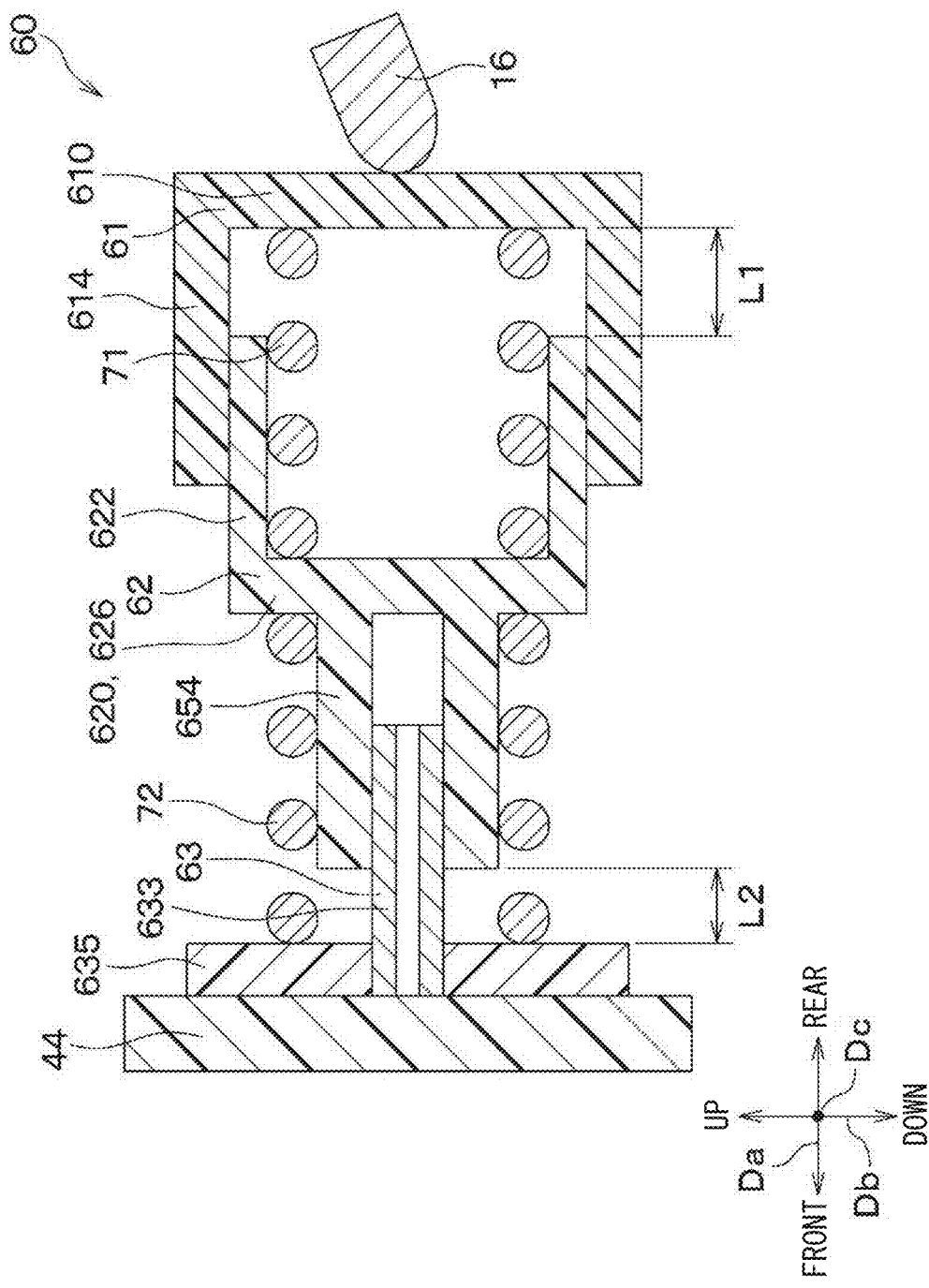
FIG. 32 is a cross-sectional view of a reaction force generating mechanism of a pedal device of a twenty-fourth embodiment.

In the twenty-fourth embodiment, as shown in FIG. 32, the configuration of the third guide portion 633 is different from that of the twelfth embodiment. The rest of the present embodiment is the same as that of the twelfth embodiment.

The third guide portion 633 is shaped in a cylindrical tubular form instead of the solid cylindrical form. Furthermore, a portion of the third guide portion 633 is inserted into a hole of the fourth guide portion 654. Here, a portion of the fourth guide portion 654 may be modified to be inserted into a hole of the third guide portion 633.

The pedal device 1 of the twenty-fourth embodiment is configured in the above-described manner. Even in the twenty-fourth embodiment, the advantages, which are similar to those of the twelfth embodiment, are achieved.

Twenty-Fifth Embodiment

Figure 33:
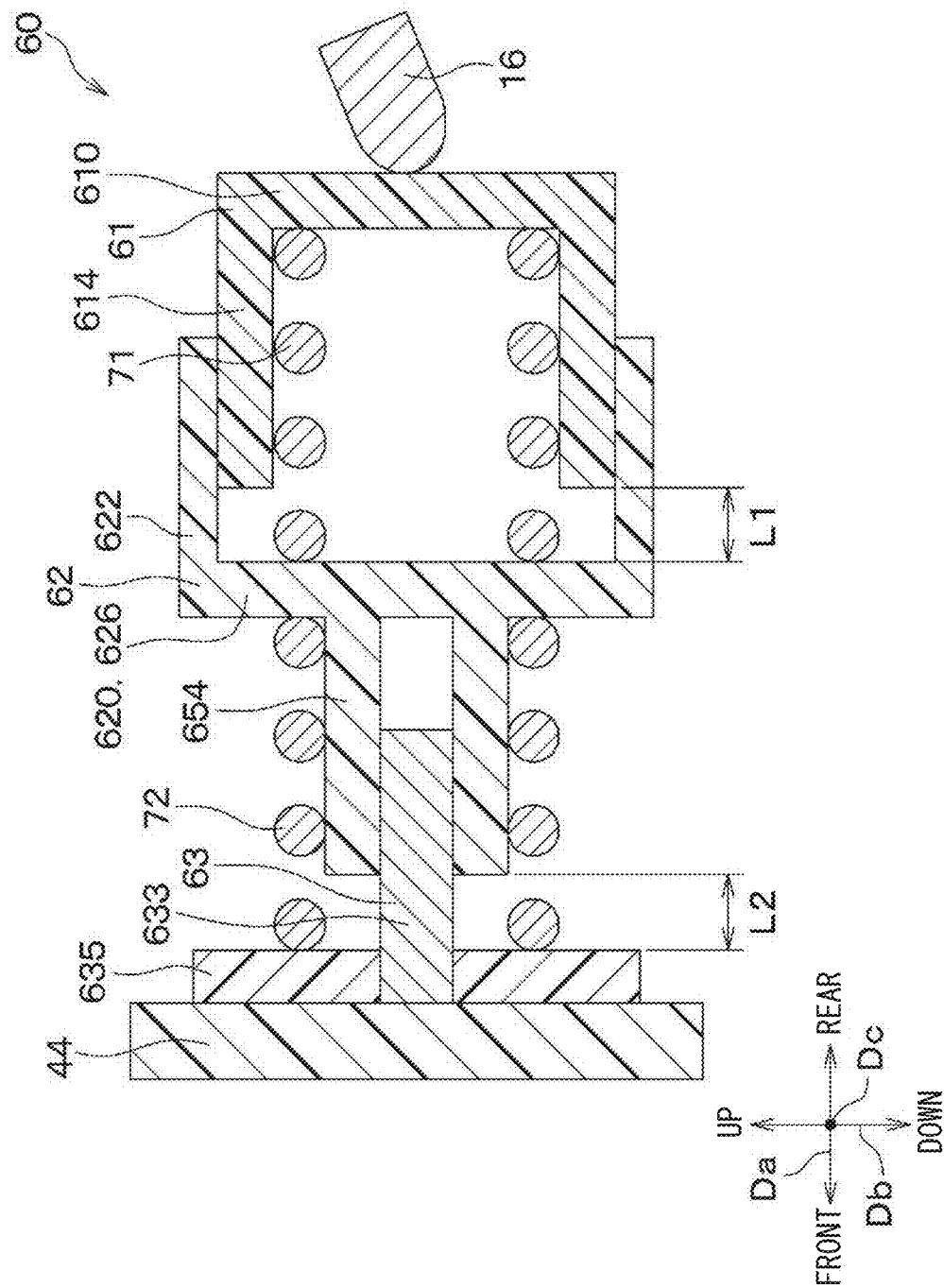
FIG. 33 is a cross-sectional view of a reaction force generating mechanism of a pedal device of a twenty-fifth embodiment.

In the twenty-fifth embodiment, as shown in FIG. 33, the configurations of the first guide portion 614 and the second guide portion 622 are different from those of the twelfth embodiment. The rest of the present embodiment is the same as that of the twelfth embodiment.

Instead of inserting the portion of the second guide portion 622 into the hole of the first guide portion 614, a portion of the first guide portion 614 is inserted into a hole of the second guide portion 622. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

The pedal device 1 of the twenty-fifth embodiment is configured in the above-described manner. Even in the twenty-fifth embodiment, the advantages, which are similar to those of the twelfth embodiment, are achieved.

Twenty-Sixth Embodiment

Figure 34:
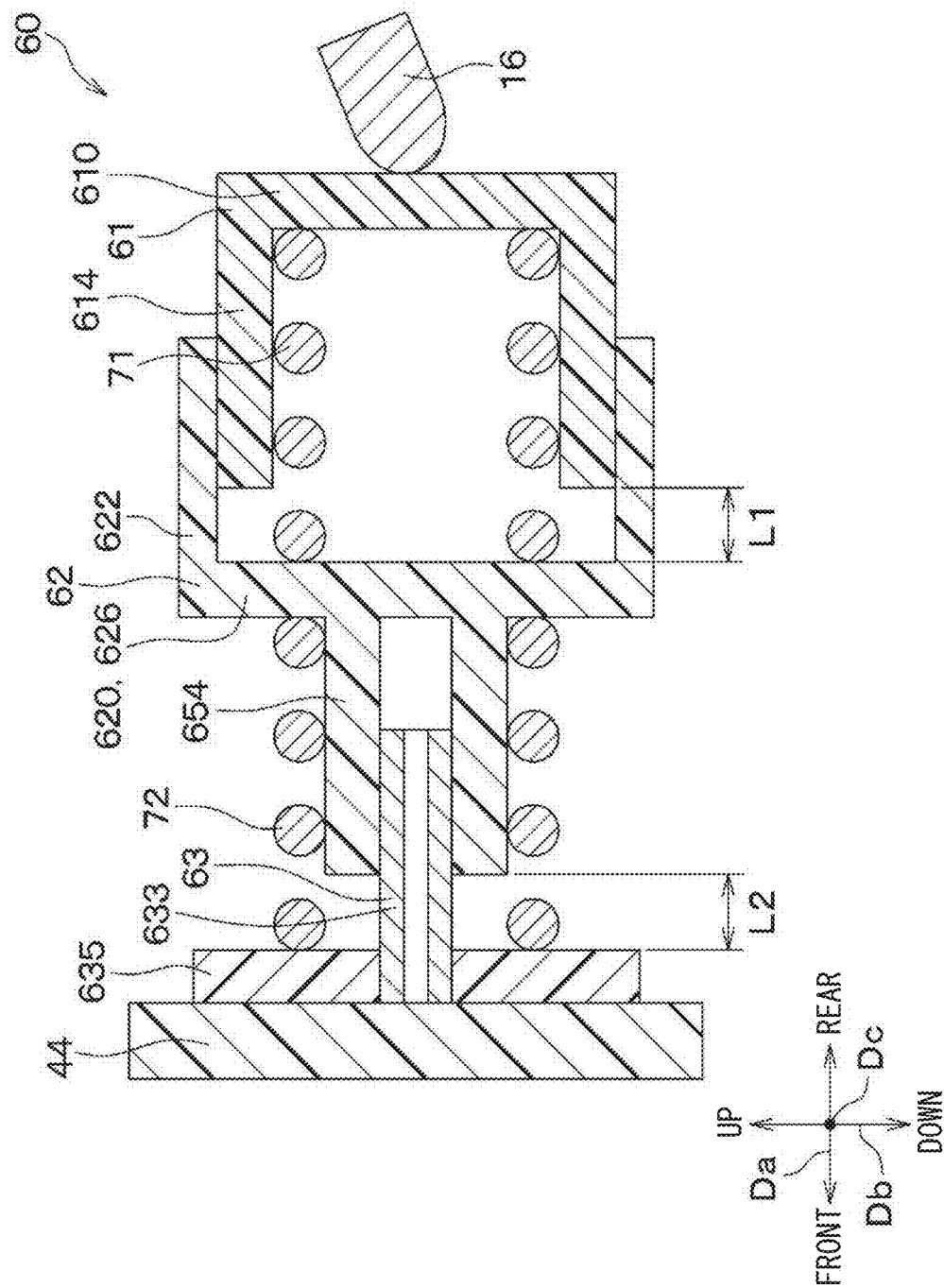
FIG. 34 is a cross-sectional view of a reaction force generating mechanism of a pedal device of a twenty-sixth embodiment.

In the twenty-sixth embodiment, as shown in FIG. 34, the configurations of the first guide portion 614 and the second guide portion 622 are different from those of the twenty-fourth embodiment. The rest of the present embodiment is the same as that of the twenty-fourth embodiment.

Instead of inserting the portion of the second guide portion 622 into the hole of the first guide portion 614, a portion of the first guide portion 614 is inserted into a hole of the second guide portion 622. Thereby, the first guide portion 614 and the second guide portion 622 mutually limit each other's movement in the vehicle up-down direction Db. Also, since the first guide portion 614 and the second guide portion 622 extend in the vehicle front-rear direction Da, an outer peripheral surface of the first guide portion 614 and an inner peripheral surface of the second guide portion 622 slide relative to each other in the vehicle front-rear direction Da.

The pedal device 1 of the twenty-sixth embodiment is configured in the above-described manner. Even in the twenty-sixth embodiment, the advantages, which are similar to those of the twenty-fourth embodiment, are achieved.

Twenty-Seventh Embodiment

Figure 35:
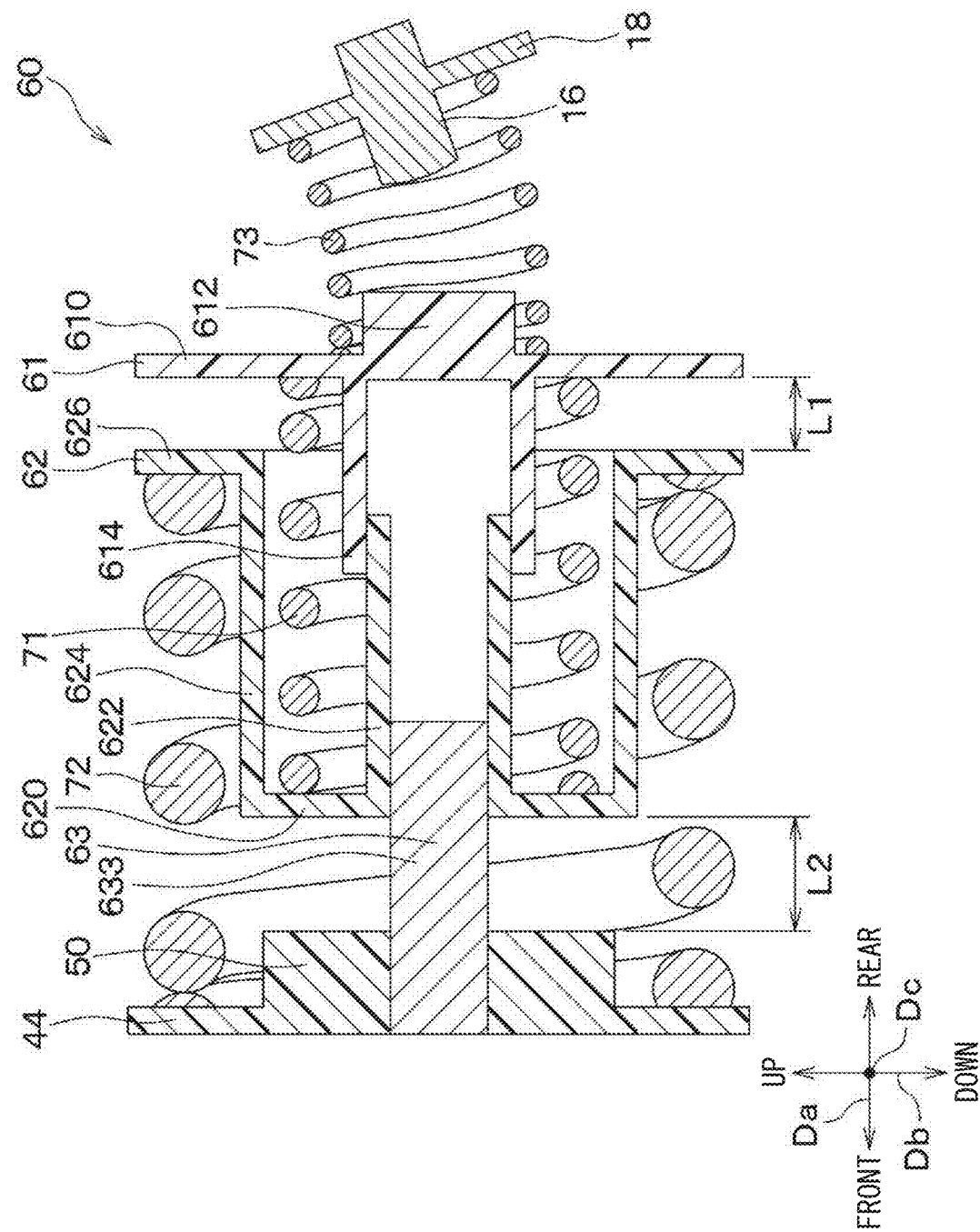
FIG. 35 is a cross-sectional view of a reaction force generating mechanism of a pedal device of a twenty-seventh embodiment.

In the twenty-seventh embodiment, as shown in FIG. 35, the configurations of the first guide portion 614, the second guide portion 622 and the third guide portion 633 are different from those of the first embodiment. The rest of the present embodiment is the same as that of the first embodiment.

Here, it is assumed that a sliding portion between the first guide portion 614 and the second guide portion 622 is projected (i.e., imagined to be extended) toward a sliding portion between the second guide portion 622 and the third guide portion 633 in the vehicle up-down direction Db. At this time, in the first embodiment, the sliding portion between the first guide portion 614 and the second guide portion 622, as projected in the vehicle up-down direction Db, overlaps with the sliding portion between the second guide portion 622 and the third guide portion 633. The sliding portion between the first guide portion 614 and the second guide portion 622, as projected, overlaps with the sliding portion between the second guide portion 622 and the third guide portion 633 both when the pedal portion 12 is not pressed by the driver and when the pedal portion 12 is pressed by the driver. The sliding portion between the first guide portion 614 and the second guide portion 622 corresponds to a contact portion between the first guide portion 614 and the second guide portion 622. Furthermore, the sliding portion between the second guide portion 622 and the third guide portion 633 corresponds to a contact portion between the second guide portion 622 and the third guide portion 633.

In contrast, in the twenty-seventh embodiment, the sliding portion between the first guide portion 614 and the second guide portion 622, as projected in the vehicle up-down direction Db, does not overlap with the sliding portion between the second guide portion 622 and the third guide portion 633. The sliding portion between the first guide portion 614 and the second guide portion 622, as projected, does not overlap with the sliding portion between the second guide portion 622 and the third guide portion 633 both when the pedal portion 12 is not pressed by the driver and when the pedal portion 12 is pressed by the driver.

The pedal device 1 of the twenty-seventh embodiment is configured in the above-described manner. Even in the twenty-seventh embodiment, the advantages, which are similar to those of the first embodiment, are achieved. Furthermore, in the twenty-seventh embodiment, the following advantages are also achieved.

[3] Here, it is assumed that the sliding portion between the first guide portion 614 and the second guide portion 622, as projected in the vehicle up-down direction Db, overlaps with the sliding portion between the second guide portion 622 and the third guide portion 633. Furthermore, it is assumed that due to, for example, water absorption, expansion, and contraction of the second guide portion 622 caused by the force applied from the outside of the pedal device 1 or the operating environment of the pedal device 1, the dimensions of the sliding portion of the second guide portion 622 may change due to deformation of the sliding portion of the second guide portion 622. In this case, the sliding portion between the inner peripheral surface of the first guide portion 614 and the outer peripheral surface of the second guide portion 622 may possibly be deformed, and the sliding portion between the inner peripheral surface of the second guide portion 622 and the outer peripheral surface of the third guide portion 633 may possibly be deformed. Therefore, it is possible that the inner peripheral surface of the first guide portion 614 and the outer peripheral surface of the second guide portion 622 may not slide relative to each other in the vehicle front-rear direction Da, and the inner peripheral surface of the second guide portion 622 and the outer peripheral surface of the third guide portion 633 may not slide relative to each other in the vehicle front-rear direction Da.

In contrast, in the twenty-seventh embodiment, the sliding portion between the first guide portion 614 and the second guide portion 622, as projected in the vehicle up-down direction Db, does not overlap with and is spaced from the sliding portion between the second guide portion 622 and the third guide portion 633.

Therefore, even when the sliding portion between the inner peripheral surface of the first guide portion 614 and the outer peripheral surface of the second guide portion 622 is deformed due to, for example, the water absorption, the expansion, and the contraction described above, the deformation of the sliding portion between the inner peripheral surface of the second guide portion 622 and the outer peripheral surface of the third guide portion 633 is limited. Furthermore, even when the sliding portion between the inner peripheral surface of the second guide portion 622 and the outer peripheral surface of the third guide portion 633 is deformed due to, for example, the water absorption, the expansion, and the contraction described above, the deformation of the sliding portion between the inner peripheral surface of the first guide portion 614 and the outer peripheral surface of the second guide portion 622 is limited. Therefore, even if one of the two sliding portions described above is jammed, i.e., is fixed, the sliding operation can be carried out at the other one of the two sliding portions. Thus, the locking of the rotation of the pedal 10 at the time of pressing the pedal 10 is limited.

Twenty-Eighth Embodiment

Figure 36:
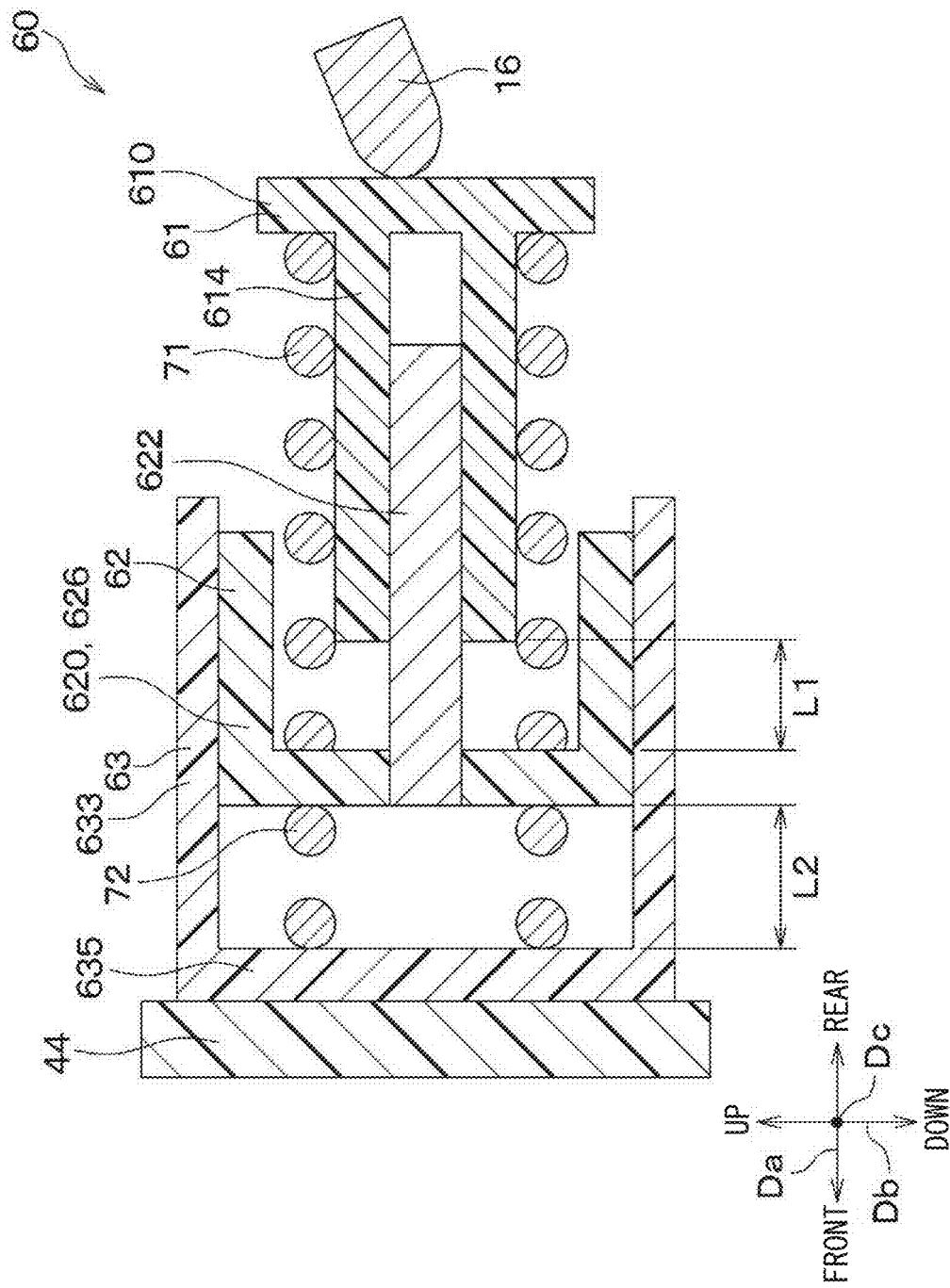
FIG. 36 is a cross-sectional view of a reaction force generating mechanism of a pedal device of a twenty-eighth embodiment.

In the twenty-eighth embodiment, as shown in FIG. 36, the configurations of the second support portion 620, the third support portion 626, the first guide portion 614, the second guide portion 622 and the third guide portion 633 are different from those of the fifth embodiment. The rest of the present embodiment is the same as that of the fifth embodiment.

The second support portion 620 and the third support portion 626 are formed integrally in one-piece and has a bottom portion and a peripheral portion. The bottom portion of the second support portion 620 and the third support portion 626 is shaped in a plate form extending in the vehicle up-down direction Db. The peripheral portion of the second support portion 620 and the third support portion 626 is shaped in a cylindrical tubular form extending from the bottom portion toward the vehicle rear side.

Here, it is assumed that a sliding portion between the first guide portion 614 and the second guide portion 622 is projected in the vehicle up-down direction Db toward a sliding portion between: the second support portion 620 and the third support portion 626; and the third guide portion 633. At this time, in the fifth embodiment, the sliding portion between the first guide portion 614 and the second guide portion 622, as projected in the vehicle up-down direction Db, does not overlap with the sliding portion between: the second support portion 620 and the third support portion 626; and the third guide portion 633. Furthermore, when the pedal portion 12 is not pressed by the driver, the sliding portion between the first guide portion 614 and the second guide portion 622, as projected in the vehicle up-down direction Db, does not overlap with the sliding portion between: the second support portion 620 and the third support portion 626; and the third guide portion 633. Also, even when the pedal portion 12 is pressed by the driver, the sliding portion between the first guide portion 614 and the second guide portion 622, as projected in the vehicle up-down direction Db, does not overlap with the sliding portion between: the second support portion 620 and the third support portion 626; and the third guide portion 633. The sliding portion between: the second support portion 620 and the third support portion 626; and the third guide portion 633, corresponds to a contact portion between: the second support portion 620 and the third support portion 626; and the third guide portion 633.

In contrast, in the twenty-eighth embodiment, the sliding portion between the first guide portion 614 and the second guide portion 622, as projected in the vehicle up-down direction Db, overlaps with the sliding portion between: the second support portion 620 and the third support portion 626; and the third guide portion 633. Furthermore, when the pedal portion 12 is not pressed by the driver, the sliding portion between the first guide portion 614 and the second guide portion 622, as projected in the vehicle up-down direction Db, overlaps with the sliding portion between: the second support portion 620 and the third support portion 626; and the third guide portion 633. Also, even when the pedal portion 12 is pressed by the driver, the sliding portion between the first guide portion 614 and the second guide portion 622, as projected in the vehicle up-down direction Db, overlaps with the sliding portion between: the second support portion 620 and the third support portion 626; and the third guide portion 633.

The pedal device 1 of the twenty-eighth embodiment is configured in the above-described manner. Even in the twenty-eighth embodiment, the advantages, which are similar to those of the fifth embodiment, are achieved. Furthermore, in the twenty-eighth embodiment, the following advantages are also achieved.

[4] It is assumed that the sliding portion between the first guide portion 614 and the second guide portion 622 is projected in the vehicle up-down direction Db toward the sliding portion between: the second support portion 620 and the third support portion 626; and the third guide portion 633. At this time, the sliding portion between the first guide portion 614 and the second guide portion 622, as projected in the vehicle up-down direction Db, overlaps with the sliding portion between: the second support portion 620 and the third support portion 626; and the third guide portion 633.

Therefore, the size of the reaction force generating mechanism 60, as measured in the vehicle front-rear direction Da, is reduced compared to the case where the sliding portion between the first guide portion 614 and the second guide portion 622, as projected in the vehicle up-down direction Db, does not overlap with the sliding portion between: the second support portion 620 and the third support portion 626; and the third guide portion 633. Therefore, an increase in the size of the pedal device 1 is limited.

Twenty-Ninth Embodiment

Figure 37:
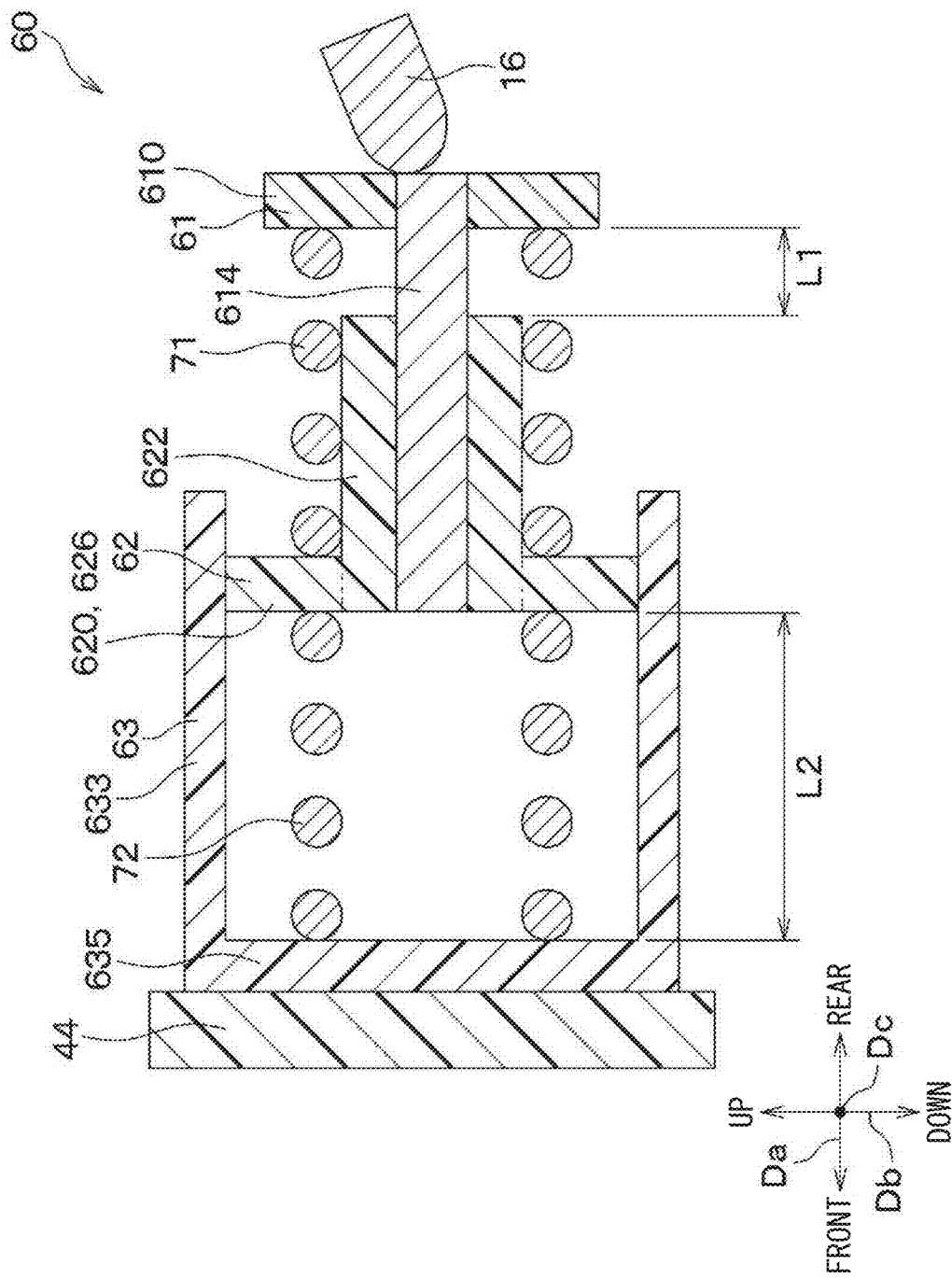
FIG. 37 is a cross-sectional view of a reaction force generating mechanism of a pedal device of a twenty-ninth embodiment.

In the twenty-ninth embodiment, as shown in FIG. 37, the configurations of the first guide portion 614 and the second guide portion 622 are different from those of the sixth embodiment. The rest of the present embodiment is the same as that of the sixth embodiment.

Here, it is assumed that a sliding portion between the first guide portion 614 and the second guide portion 622 is projected in the vehicle up-down direction Db toward a sliding portion between: the second support portion 620 and the third support portion 626; and the third guide portion 633. At this time, the sliding portion between the first guide portion 614 and the second guide portion 622, as projected in the vehicle up-down direction Db, overlaps with the sliding portion between: the second support portion 620 and the third support portion 626; and the third guide portion 633. Furthermore, these sliding portions overlap with each other both when the pedal portion 12 is not pressed by the driver and when the pedal portion 12 is pressed by the driver.

The pedal device 1 of the twenty-ninth embodiment is configured in the above-described manner. Even in the twenty-ninth embodiment, the advantages, which are similar to those of the sixth embodiment, are achieved. Furthermore, in the twenty-ninth embodiment, the advantage discussed in the section [4] recited above is also achieved.

Thirtieth Embodiment

Figure 38:
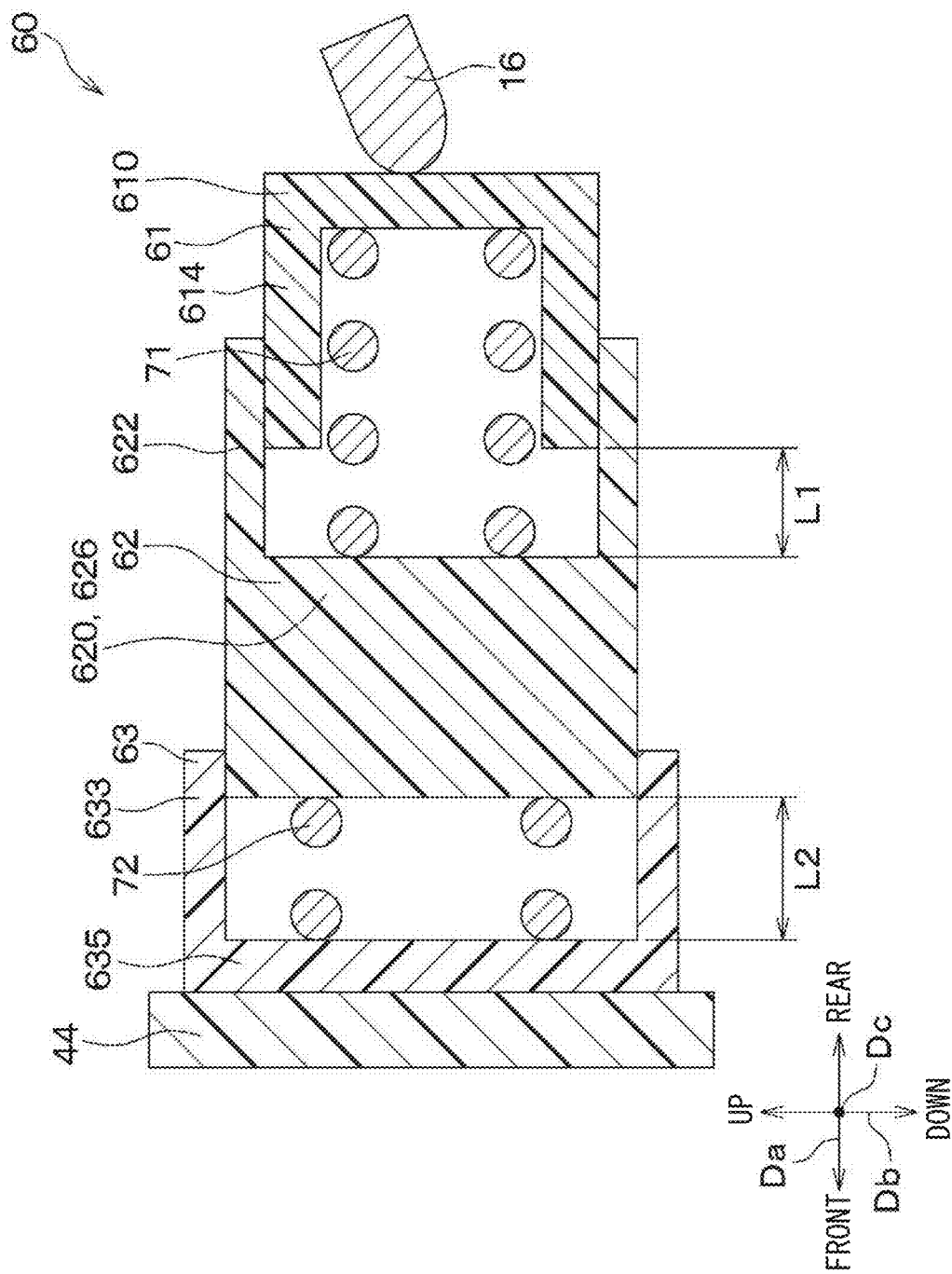
FIG. 38 is a cross-sectional view of a reaction force generating mechanism of a pedal device of a thirtieth embodiment.

In the thirtieth embodiment, as shown in FIG. 38, the configurations of the second support portion 620, the third support portion 626, the first guide portion 614, the second guide portion 622 and the third guide portion 633 are different from those of the seventh embodiment. The rest of the present embodiment is the same as that of the seventh embodiment.

A length of the second support portion 620 and the third support portion 626, as measured in the vehicle front-rear direction Da, is increased compared to the seventh embodiment. Furthermore, it is assumed that a sliding portion between the first guide portion 614 and the second guide portion 622 is projected in the vehicle up-down direction Db toward a sliding portion between: the second support portion 620 and the third support portion 626; and the third guide portion 633. At this time, the sliding portion between the first guide portion 614 and the second guide portion 622, as projected in the vehicle up-down direction Db, does not overlap with the sliding portion between: the second support portion 620 and the third support portion 626; and the third guide portion 633. Furthermore, these sliding portions do not overlap with each other both when the pedal portion 12 is not pressed by the driver and when the pedal portion 12 is pressed by the driver.

The pedal device 1 of the thirtieth embodiment is configured in the above-described manner. Even in the thirtieth embodiment, the advantages, which are similar to those of the seventh embodiment, are achieved. Furthermore, in the thirtieth embodiment, the advantage discussed in the section [3] recited above is also achieved.

Thirty-First Embodiment

Figure 39:
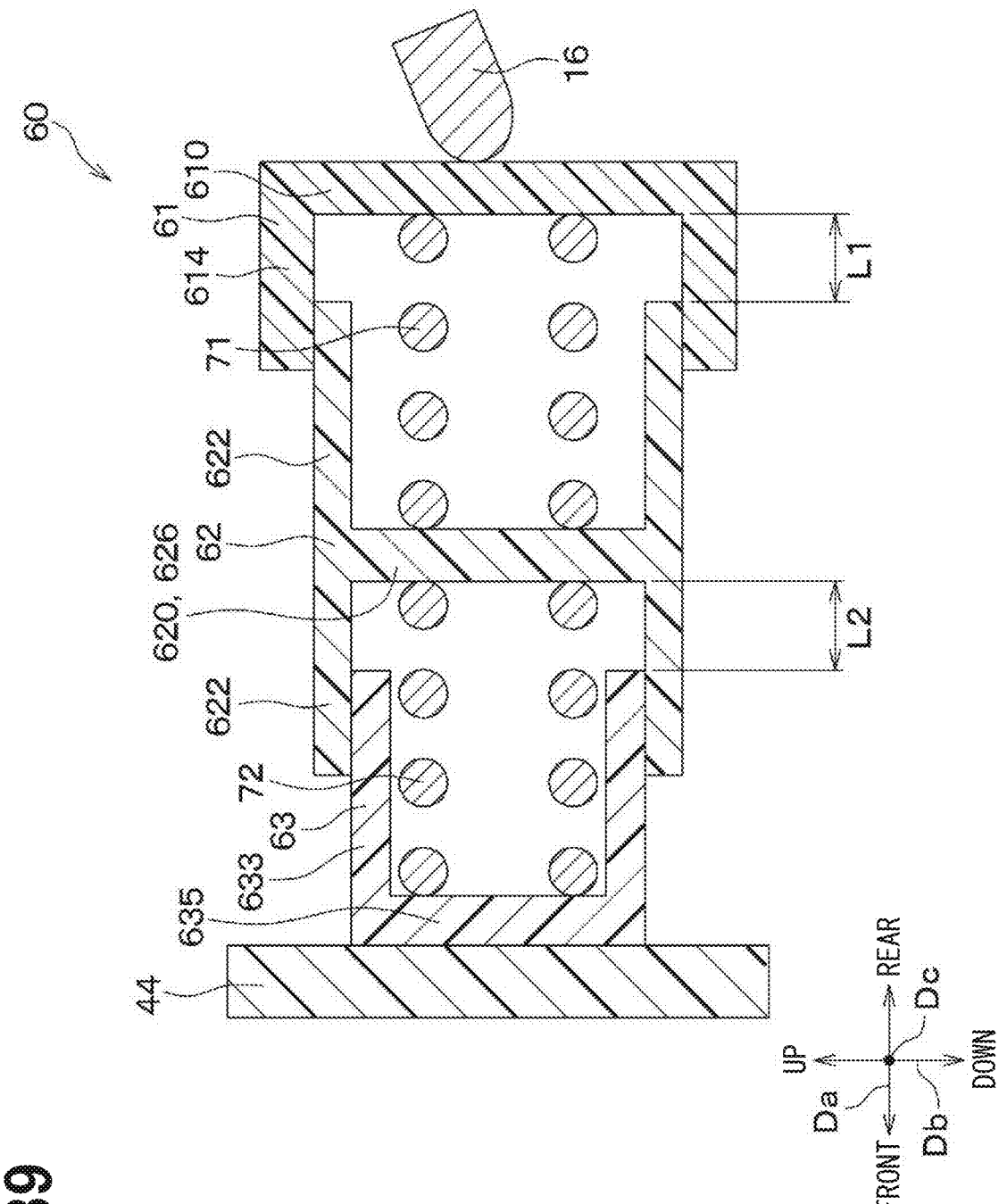
FIG. 39 is a cross-sectional view of a reaction force generating mechanism of a pedal device of a thirty-first embodiment.

In the thirty-first embodiment, as shown in FIG. 39, the configurations of the first guide portion 614, the second guide portion 622 and the third guide portion 633 are different from those of the eighth embodiment. The rest of the present embodiment is the same as that of the eighth embodiment.

A length of the first guide portion 614, as measured in the vehicle front-rear direction Da, is reduced compared to the eighth embodiment. Furthermore, a length of the second guide portion 622, as measured in the vehicle front-rear direction Da, is increased compared to the eighth embodiment. Furthermore, it is assumed that a sliding portion between the first guide portion 614 and the second guide portion 622 is projected toward a sliding portion between the second guide portion 622 and the third guide portion 633 in the vehicle up-down direction Db. At this time, the sliding portion between the first guide portion 614 and the second guide portion 622, as projected in the vehicle up-down direction Db, does not overlap with the sliding portion between the second guide portion 622 and the third guide portion 633. Furthermore, these sliding portions do not overlap with each other both when the pedal portion 12 is not pressed by the driver and when the pedal portion 12 is pressed by the driver.

The pedal device 1 of the thirty-first embodiment is configured in the above-described manner. Even in the thirty-first embodiment, the advantages, which are similar to those of the eighth embodiment, are achieved. Furthermore, in the thirty-first embodiment, the advantage discussed in the section [3] recited above is also achieved.

Thirty-Second Embodiment

Figure 40:
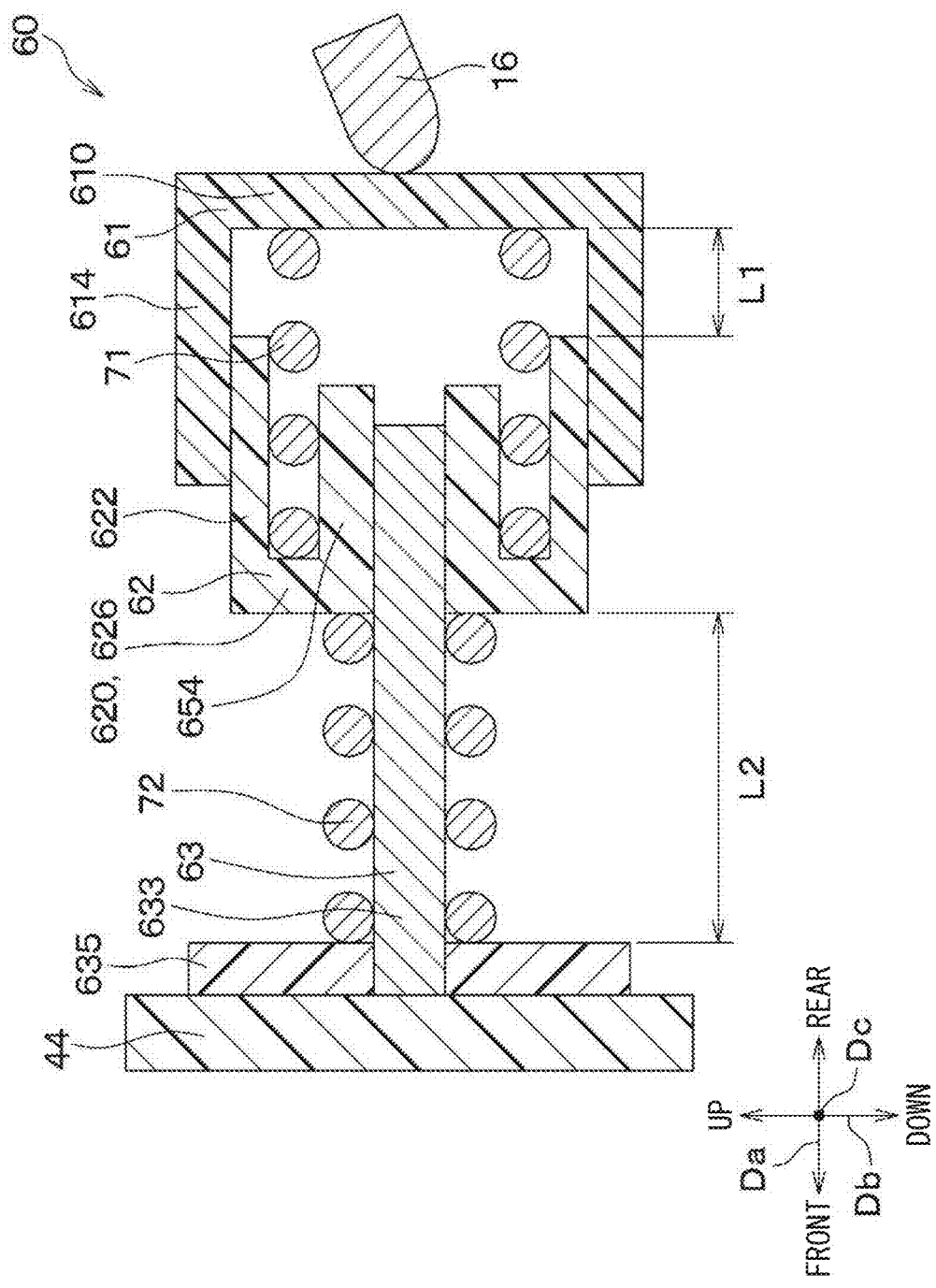
FIG. 40 is a cross-sectional view of a reaction force generating mechanism of a pedal device of a thirty-second embodiment.

In the thirty-second embodiment, as shown in FIG. 40, the configurations of the first guide portion 614, the second guide portion 622, the third guide portion 633 and the fourth guide portion 654 are different from those of the twelfth embodiment. The rest of the present embodiment is the same as that of the twelfth embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. The sliding portion between the first guide portion 614 and the second guide portion 622, as projected, overlaps with the sliding portion between the fourth guide portion 654 and the third guide portion 633 both when the pedal portion 12 is not pressed by the driver and when the pedal portion 12 is pressed by the driver. The sliding portion between the fourth guide portion 654 and the third guide portion 633 corresponds to a contact portion between the fourth guide portion 654 and the third guide portion 633.

The pedal device 1 of the thirty-second embodiment is configured in the above-described manner. Even in the thirty-second embodiment, the advantages, which are similar to those of the twelfth embodiment, are achieved. Furthermore, in the thirty-second embodiment, the advantage discussed in the section [4] recited above is also achieved.

Thirty-Third Embodiment

Figure 41:
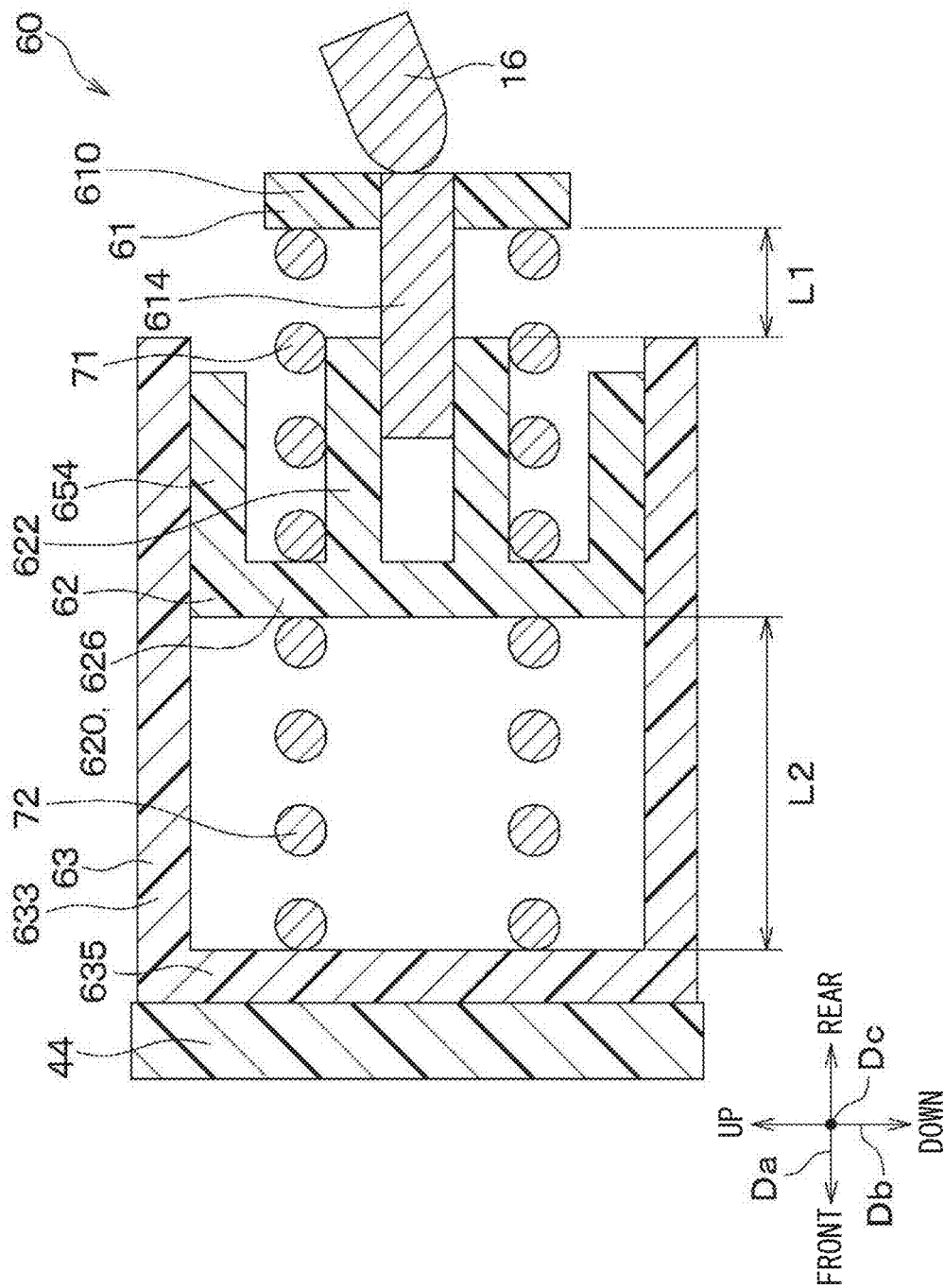
FIG. 41 is a cross-sectional view of a reaction force generating mechanism of a pedal device of a thirty-third embodiment.

In the thirty-third embodiment, as shown in FIG. 41, the configurations of the first guide portion 614, the second guide portion 622, the third guide portion 633 and the fourth guide portion 654 are different from those of the twenty-first embodiment. The rest of the present embodiment is the same as that of the twenty-first embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, the inner peripheral surface of the third guide portion 633 and the outer peripheral surface of the fourth guide portion 654 slide relative to each other instead of sliding relatively between the outer peripheral surface of the third guide portion 633 and the inner peripheral surface of the fourth guide portion 654 in the vehicle front-rear direction Da. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver.

The pedal device 1 of the thirty-third embodiment is configured in the above-described manner. Even in the thirty-third embodiment, the advantages, which are similar to those of the twenty-first embodiment, are achieved. Furthermore, in the thirty-third embodiment, the advantage discussed in the section [4] recited above is also achieved.

Thirty-Fourth Embodiment

Figure 42:
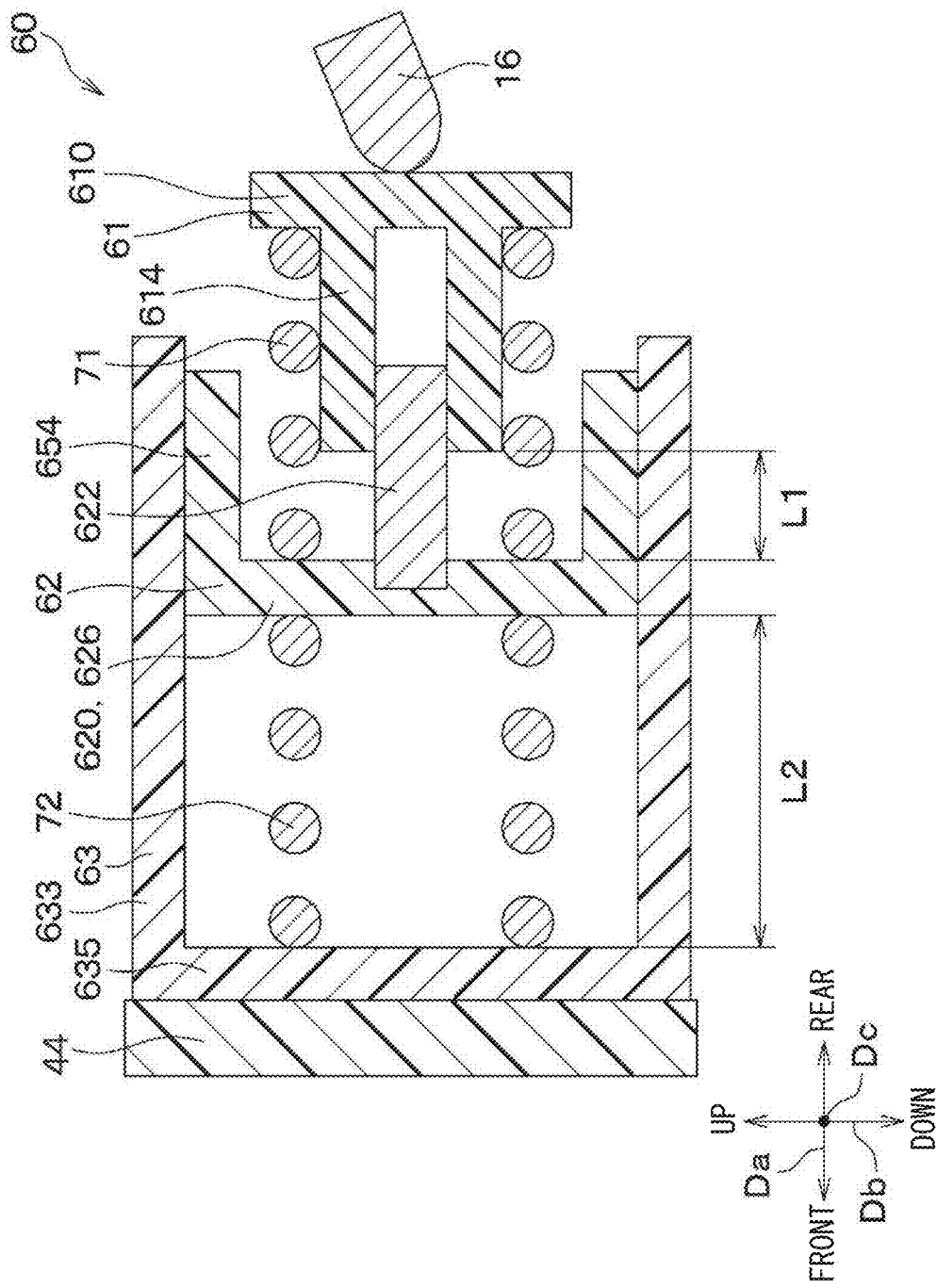
FIG. 42 is a cross-sectional view of a reaction force generating mechanism of a pedal device of a thirty-fourth embodiment.

In the thirty-fourth embodiment, as shown in FIG. 42, the configurations of the first guide portion 614, the second guide portion 622, the third guide portion 633 and the fourth guide portion 654 are different from those of the twenty-second embodiment. The rest of the present embodiment is the same as that of the twenty-second embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, the inner peripheral surface of the third guide portion 633 and the outer peripheral surface of the fourth guide portion 654 slide relative to each other instead of sliding relatively between the outer peripheral surface of the third guide portion 633 and the inner peripheral surface of the fourth guide portion 654 in the vehicle front-rear direction Da. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver.

The pedal device 1 of the thirty-fourth embodiment is configured in the above-described manner. Even in the thirty-fourth embodiment, the advantages, which are similar to those of the twenty-second embodiment, are achieved. Furthermore, in the thirty-fourth embodiment, the advantage discussed in the section [4] recited above is also achieved.

Thirty-Fifth Embodiment

Figure 43:
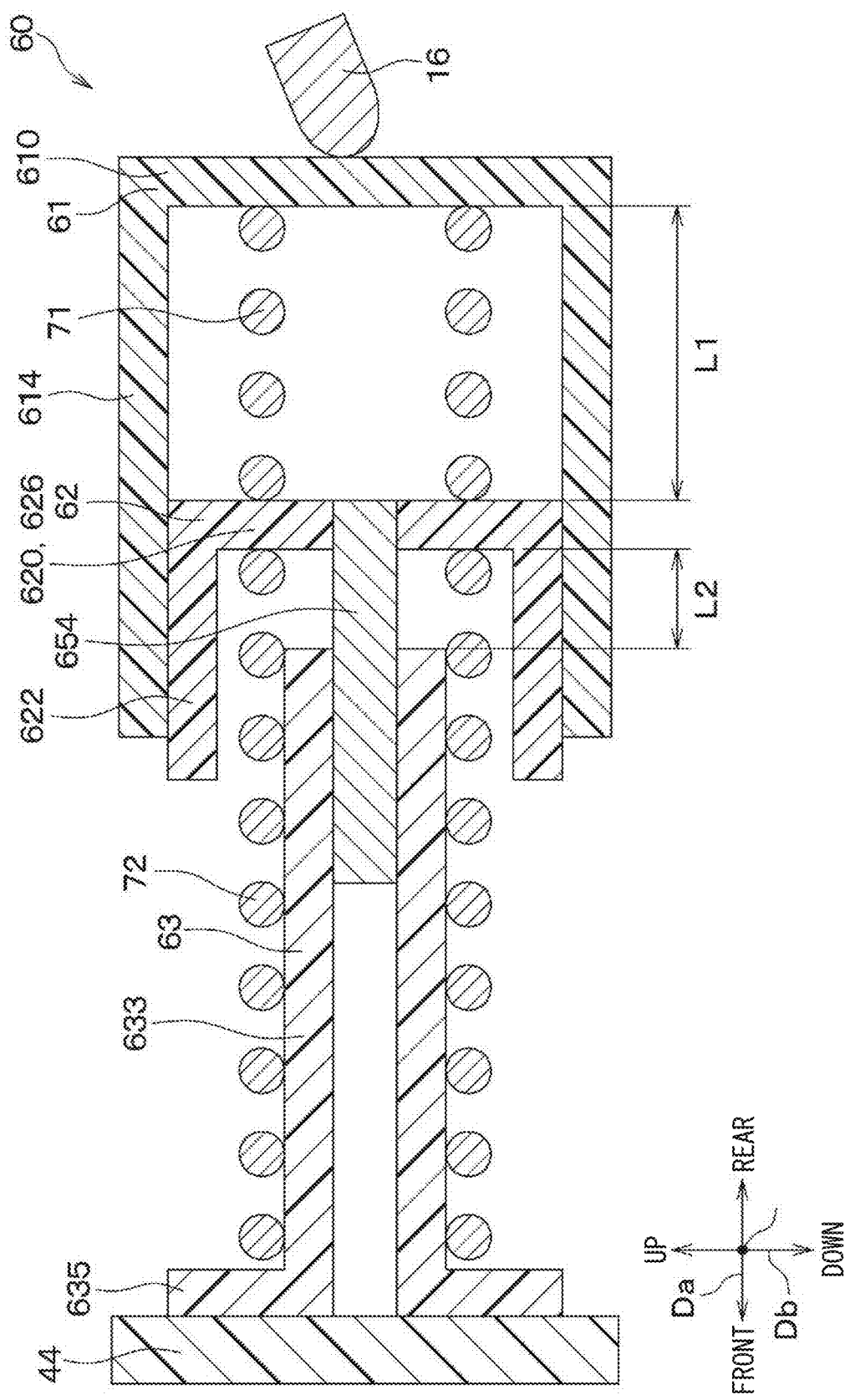
FIG. 43 is a cross-sectional view of a reaction force generating mechanism of a pedal device of a thirty-fifth embodiment.

In the thirty-fifth embodiment, as shown in FIG. 43, the configurations of the first guide portion 614, the second guide portion 622, the third guide portion 633 and the fourth guide portion 654 are different from those of the twenty-third embodiment. The rest of the present embodiment is the same as that of the twenty-third embodiment.

The second guide portion 622 extends toward the vehicle front side from the boundary with the second support portion 620 and the third support portion 626 instead of extending toward the vehicle rear side from the boundary with the second support portion 620 and the third support portion 626. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver.

The pedal device 1 of the thirty-fifth embodiment is configured in the above-described manner. Even in the thirty-fifth embodiment, the advantages, which are similar to those of the twenty-third embodiment, are achieved. Furthermore, in the thirty-fifth embodiment, the advantage discussed in the section [4] recited above is also achieved.

Thirty-Sixth Embodiment

Figure 44:
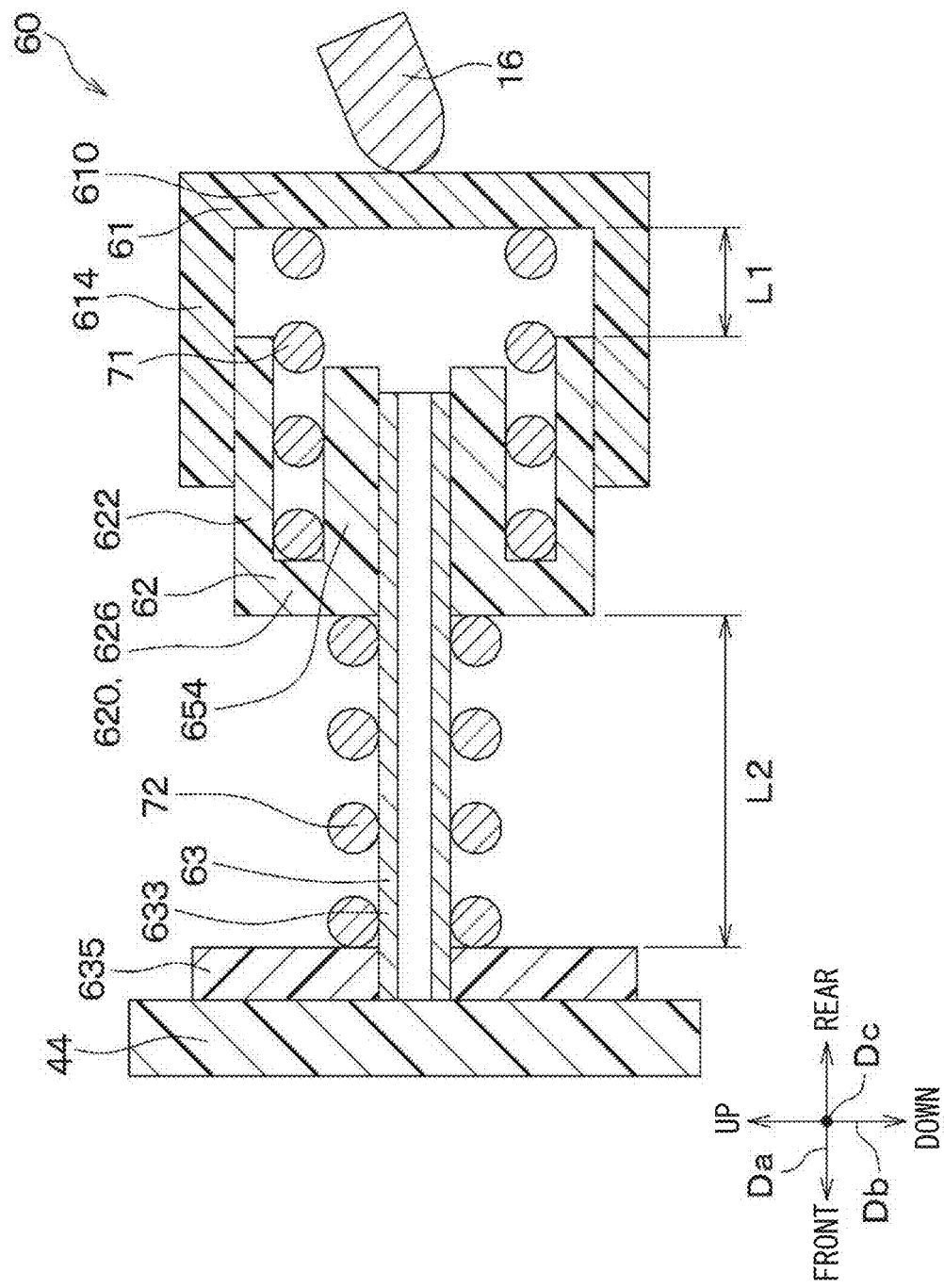
FIG. 44 is a cross-sectional view of a reaction force generating mechanism of a pedal device of a thirty-sixth embodiment.

In the thirty-sixth embodiment, as shown in FIG. 44, the configurations of the first guide portion 614, the second guide portion 622, the third guide portion 633 and the fourth guide portion 654 are different from those of the twenty-fourth embodiment. The rest of the present embodiment is the same as that of the twenty-fourth embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver. In the thirty-sixth embodiment, the outer peripheral surface of the third guide portion 633 and the inner peripheral surface of the fourth guide portion 654 slide relative to each other in the vehicle front-rear direction Da. However, the present disclosure is not limited to this. For example, the inner peripheral surface of the third guide portion 633 may be configured to slide relative to an outer peripheral surface of the fourth guide portion 654.

The pedal device 1 of the thirty-sixth embodiment is configured in the above-described manner. Even in the thirty-sixth embodiment, the advantages, which are similar to those of the twenty-fourth embodiment, are achieved. Furthermore, in the thirty-sixth embodiment, the advantage discussed in the section [4] recited above is also achieved.

Thirty-Seventh Embodiment

Figure 45:
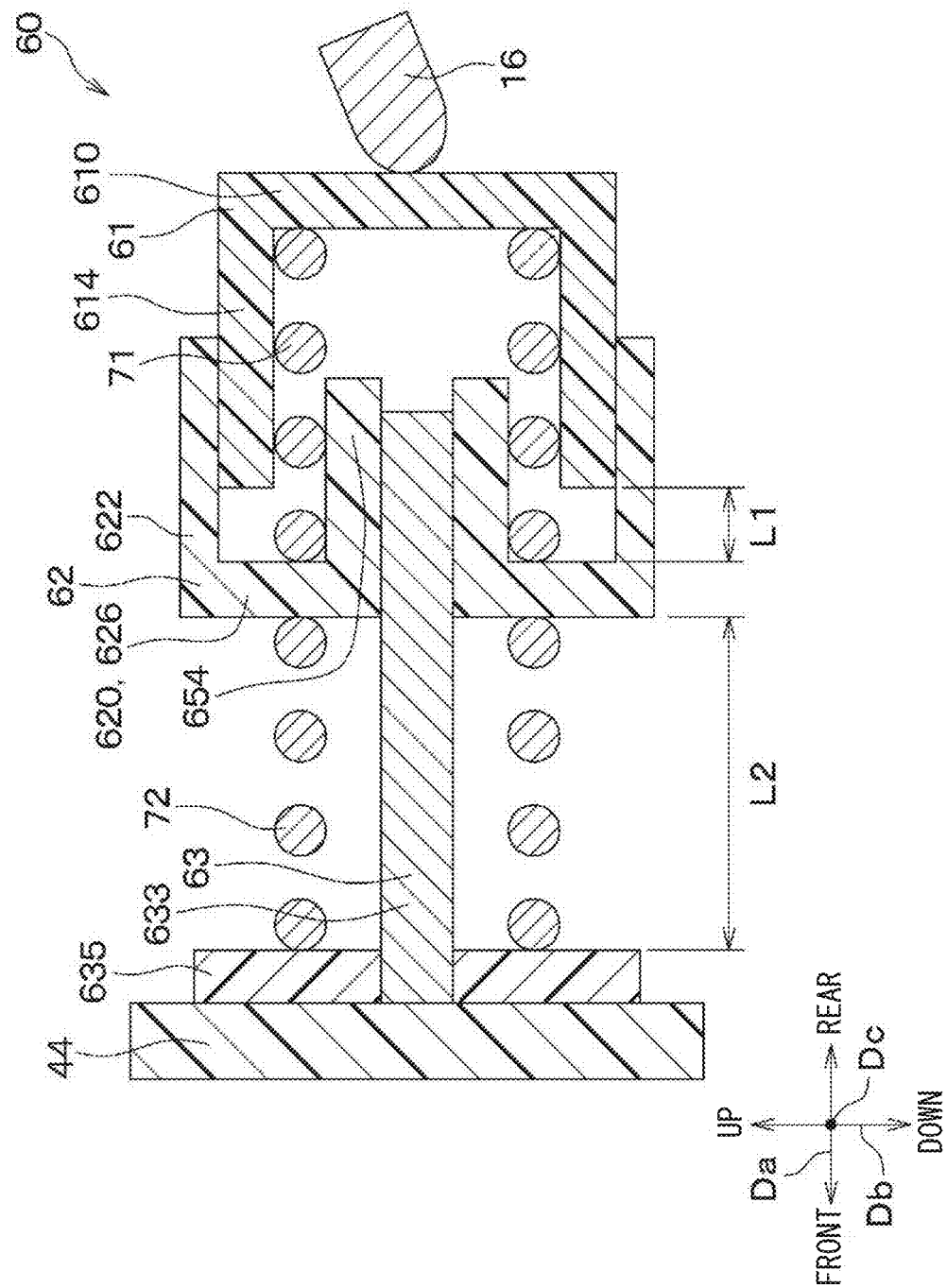
FIG. 45 is a cross-sectional view of a reaction force generating mechanism of a pedal device of a thirty-seventh embodiment.

In the thirty-seventh embodiment, as shown in FIG. 45, the configurations of the first guide portion 614, the second guide portion 622, the third guide portion 633 and the fourth guide portion 654 are different from those of the twenty-fifth embodiment. The rest of the present embodiment is the same as that of the twenty-fifth embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver.

The pedal device 1 of the thirty-seventh embodiment is configured in the above-described manner. Even in the thirty-seventh embodiment, the advantages, which are similar to those of the twenty-fifth embodiment, are achieved. Furthermore, in the thirty-seventh embodiment, the advantage discussed in the section [4] recited above is also achieved.

Thirty-Eighth Embodiment

Figure 46:
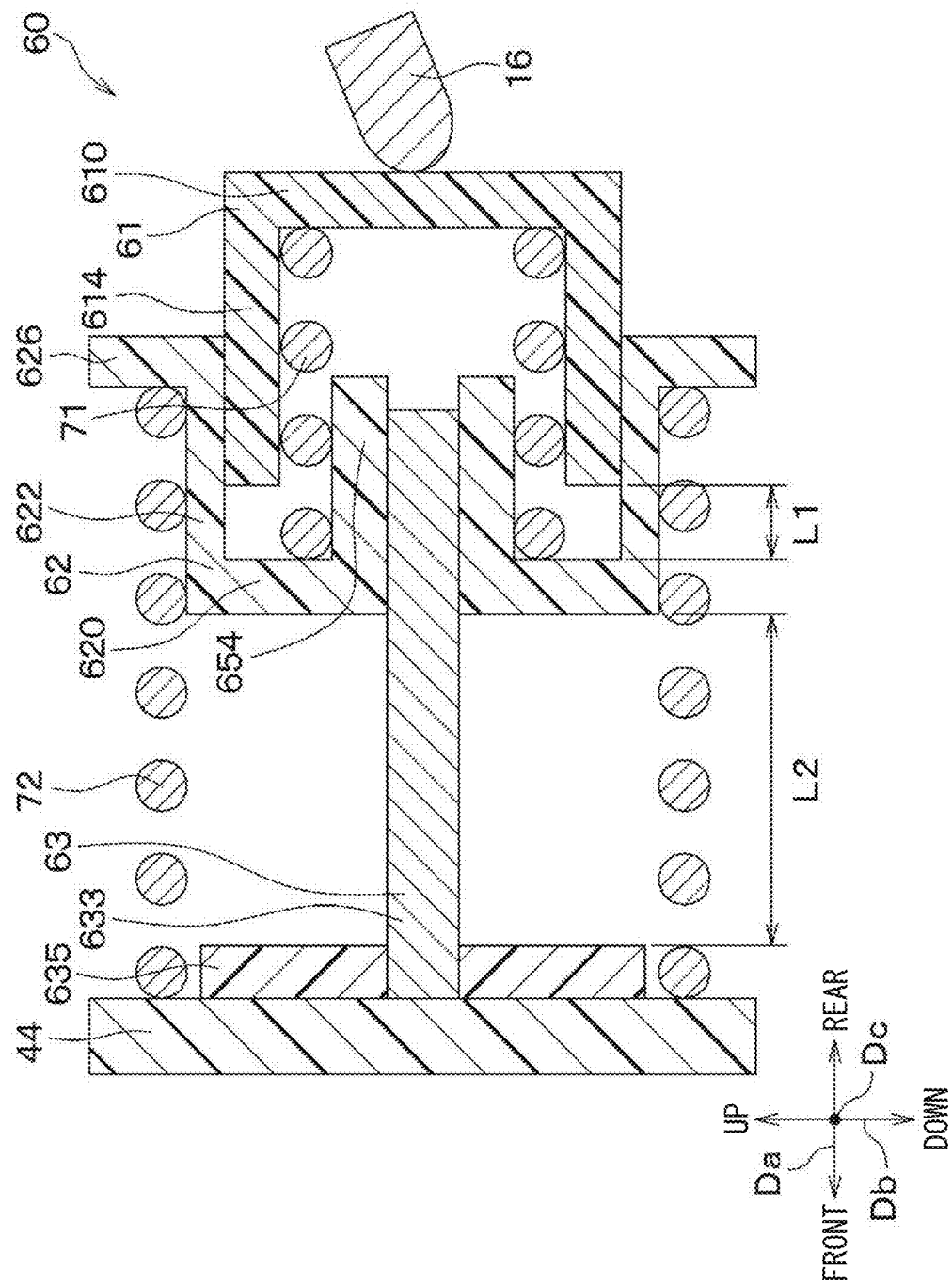
FIG. 46 is a cross-sectional view of a reaction force generating mechanism of a pedal device of a thirty-eighth embodiment.

In the thirty-eighth embodiment, as shown in FIG. 46, the configurations of the second support portion 620, the third support portion 626 and the second resilient member 72 are different from those of the thirty-seventh embodiment. The rest of the present embodiment is the same as that of the thirty-seventh embodiment.

The third support portion 626 is joined to a part of the second guide portion 622, which is opposite to the second support portion 620, so that the third support portion 626 is placed on the vehicle rear side of the second support portion 620. The third support portion 626 is shaped in a ring form and extends in the vehicle up-down direction Db from the part of the second guide portion 622 which is opposite to the second support portion 620.

The second resilient member 72 is supported by the housing tubular portion 44 and the third support portion 626 instead of being supported by the guide member bottom portion 635, the second support portion 620 and the third support portion 626.

The pedal device 1 of the thirty-eighth embodiment is configured in the above-described manner. Even in the thirty-eighth embodiment, the advantages, which are similar to those of the thirty-seventh embodiment, are achieved.

Thirty-Ninth Embodiment

Figure 47:
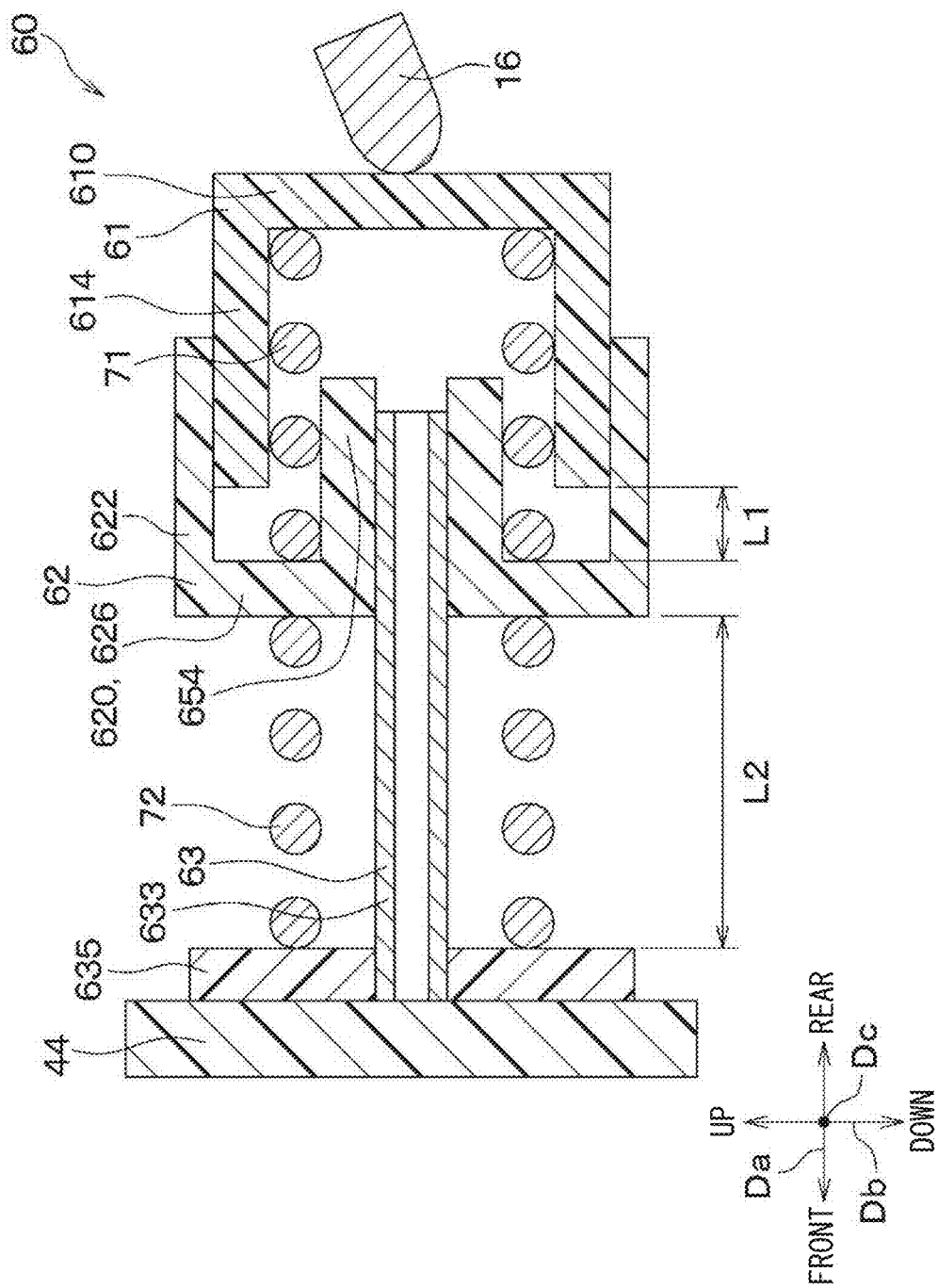
FIG. 47 is a cross-sectional view of a reaction force generating mechanism of a pedal device of a thirty-ninth embodiment.

In the thirty-ninth embodiment, as shown in FIG. 47, the configurations of the first guide portion 614, the second guide portion 622, the third guide portion 633 and the fourth guide portion 654 are different from those of the twenty-sixth embodiment. The rest of the present embodiment is the same as that of the twenty-sixth embodiment.

The fourth guide portion 654 extends toward the vehicle rear side from the boundary with the second support portion 620 and the third support portion 626 instead of extending toward the vehicle front side from the boundary with the second support portion 620 and the third support portion 626. Furthermore, it is assumed that a sliding portion between the first guide portion 614 and the second guide portion 622 is projected toward a sliding portion between the fourth guide portion 654 and the third guide portion 633 in the vehicle up-down direction Db. At this time, the sliding portion between the first guide portion 614 and the second guide portion 622, as projected in the vehicle up-down direction Db, overlaps with the sliding portion between the fourth guide portion 654 and the third guide portion 633. Furthermore, these sliding portions overlap with each other both when the pedal portion 12 is not pressed by the driver and when the pedal portion 12 is pressed by the driver.

The pedal device 1 of the thirty-ninth embodiment is configured in the above-described manner. Even in the thirty-ninth embodiment, the advantages, which are similar to those of the twenty-sixth embodiment, are achieved. Furthermore, in the thirty-ninth embodiment, the advantage discussed in the section [4] recited above is also achieved.

Fortieth Embodiment

Figure 48:
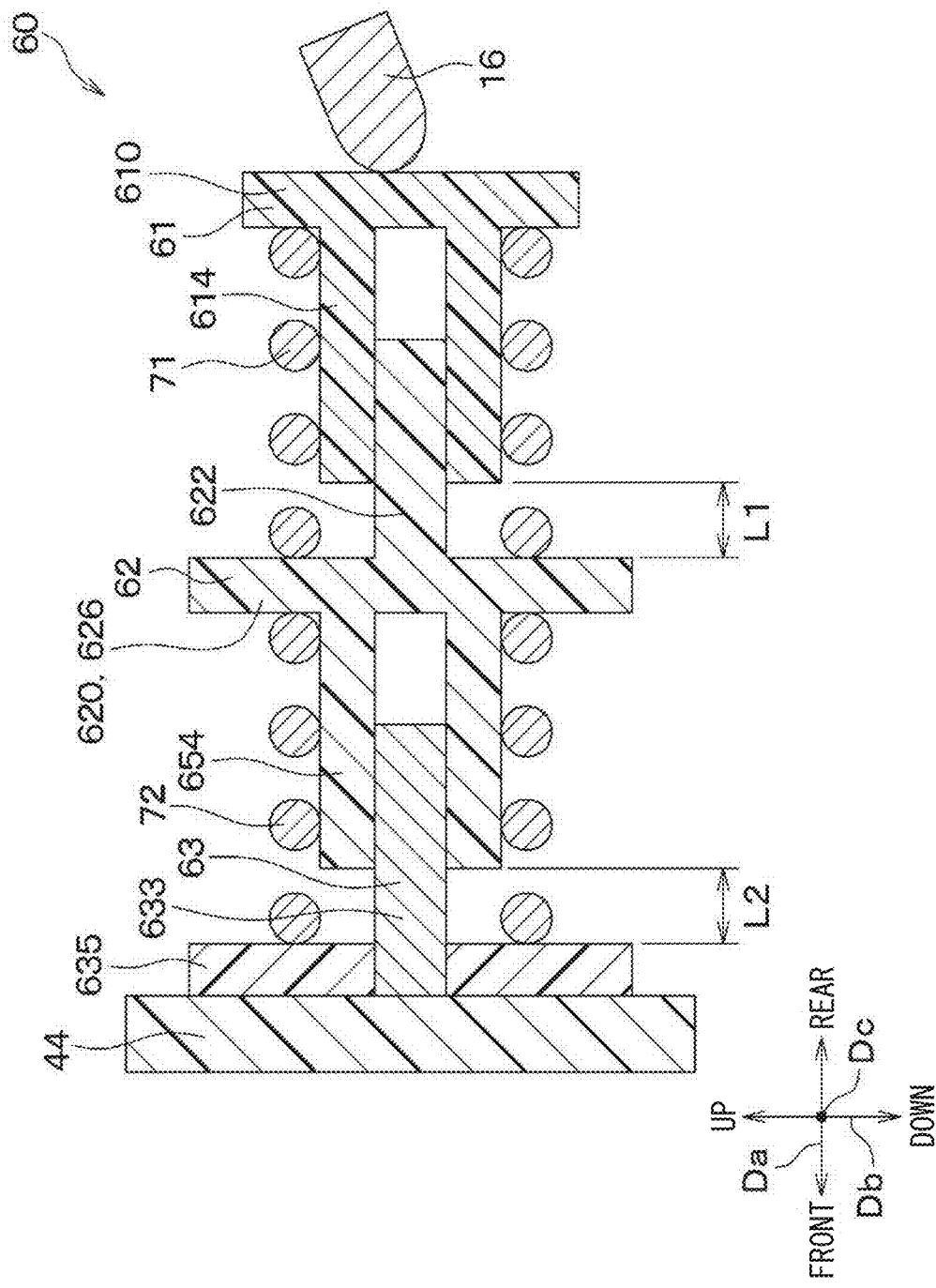
FIG. 48 is a cross-sectional view of a reaction force generating mechanism of a pedal device of a fortieth embodiment.

In the fortieth embodiment, as shown in FIG. 48, the configuration of the second holder 62 is different from that of the ninth embodiment. The rest of the present embodiment is the same as that of the ninth embodiment.

Specifically, the second support portion 620, the third support portion 626, the second guide portion 622 and the fourth guide portion 654 of the second holder 62 are formed integrally in one-piece from resin instead of forming the second guide portion 622 from the metal.

The pedal device 1 of the fortieth embodiment is configured in the above-described manner. Even in the fortieth embodiment, the advantages, which are similar to those of the ninth embodiment, are achieved.

Other Embodiments

The present disclosure is not limited to the embodiments described above, and the embodiments described above may be appropriately modified. Needless to say, in each of the embodiments described above, the elements of the embodiment are not necessarily essential except when it is clearly indicated that they are essential and when they are clearly considered to be essential in principle.

In each of the embodiments described above, the pedal device 1 is used as the brake pedal in the brake-by-wire system 150 that controls the brakes of the vehicle. In contrast, the pedal device 1 is not limited to be used as the brake pedal. For example, the pedal device 1 may be used as an accelerator pedal used for accelerating the vehicle.

In each of the embodiments described above, the reaction force is generated by the restoring forces generated through the compression of the first resilient member 71, the second resilient member 72 and the third resilient member 73. However, the present disclosure is not limited to this. For example, the arrangement of the reaction force generating mechanism 60 may be changed such that the reaction force is generated by restoring forces generated by the expanding (pulling) the first resilient member 71, the second resilient member 72 and the third resilient member 73. Each of the coil spring of the first resilient member 71, the coil spring of the second resilient member 72 and the coil spring of the third resilient member 73 is an equally spaced coil spring. However, the present disclosure is not limited to this. For example, each of the coil spring of the first resilient member 71, the coil spring of the second resilient member 72 and the coil spring of the third resilient member 73 may be a conical coil spring or an unequally spaced coil spring.

In each of the embodiments described above, the pedal device 1 is a pendant type device. However, the present disclosure is not limited to this. The pedal device 1 may be an organ type device. In the case of the organ type, in response to an increase in the pedal force of the driver applied to the pedal 10, a portion of the pedal 10, which is located on the vehicle front side of the rotational axis O, is rotated toward the dash panel 200.

In each of the embodiments described above, in the brake-by-wire system 150, the master cylinder 126 generates the hydraulic pressure in the brake fluid flowing through the brake circuit 120. The configuration is not limited to the master cylinder 126 generating the hydraulic pressure in the brake fluid flowing through the brake circuit 120. For example, a hydraulic pump may generate the hydraulic pressure in the brake fluid flowing through the brake circuit 120.

In the first embodiment described above, the third guide portion 633 is shaped in the solid columnar form. Alternatively, the third guide portion 633 may be shaped in a tubular form. In this case, the third guide portion 633 may be configured to slide relative to the holder tubular portion 624 or the third support portion 626. Furthermore, the first guide portion 614 slides relative to the second guide portion 622. Alternatively, the first guide portion 614 may be configured to slide relative to the holder tubular portion 624 or the third support portion 626.

The embodiments described above may be combined as appropriate.

(Characteristics of Present Disclosure)
(First Aspect)

According to a first aspect, there is provided a pedal device including:
- a pedal that is configured to rotate about a rotational axis when the pedal is pressed by an operator;
- a first resilient member that is configured to generate a reaction force against a pedal force applied from the operator to the pedal through deformation of the first resilient member in response to application of a force from the pedal to the first resilient member at a time of rotating the pedal;
- a second resilient member that is configured to generate a reaction force against the pedal force applied from the operator to the pedal through deformation of the second resilient member in response to the application of the force from the pedal to the second resilient member at the time of rotating the pedal;
- a first holder that includes a first support portion, which is placed adjacent to the pedal and supports one end part of the first resilient member, and a first guide portion, which extends from the first support portion in a deforming direction of the first resilient member, wherein the deforming direction of the first resilient member is defined as a direction in which the first resilient member is configured to deform;

a second holder that includes a second support portion, which supports another end part of the first resilient member opposite to the one end part of the first resilient member, a second guide portion which extends from the second support portion in the deforming direction of the first resilient member, and a third support portion that supports one end part of the second resilient member;

a fourth support portion that supports another end part of the second resilient member opposite to the one end part of the second resilient member; and a third guide portion that extends from the fourth support portion in a deforming direction of the second resilient member, wherein the deforming direction of the second resilient member is defined as a direction in which the second resilient member is configured to deform, wherein:

the force applied from the pedal at the time of rotating the pedal moves the first guide portion in the deforming direction of the first resilient member to execute a relative movement of the first guide portion relative to the second guide portion, thereby causing the first guide portion to slide relative to the second guide portion in the deforming direction of the first resilient member, and resulting in the deformation of the first resilient member; and the force applied from the pedal at the time of rotating the pedal moves the second holder in the deforming direction of the second resilient member to execute a relative movement of the second holder relative to the third guide portion, thereby causing the second holder to slide relative to the third guide portion in the deforming direction of the second resilient member, and resulting in the deformation of the second resilient member.

(Second Aspect)

According to a second aspect, there is provided the pedal device according to the first aspect, wherein:

the first guide portion and the second guide portion are configured to slide relative to each other in the deforming direction of the first resilient member at a time when the second holder and the third guide portion are fixed to each other; and the second holder and the third guide portion are configured to slide relative to each other in the deforming direction of the second resilient member at a time when the first guide portion and the second guide portion are fixed to each other.

(Third Aspect)

According to a third aspect, there is provided the pedal device according to the first or second aspect, wherein:

the first guide portion is shaped in a tubular form;
the second guide portion is shaped in a tubular form; and
the third guide portion is shaped in a solid columnar form.

(Fourth Aspect)

According to a fourth aspect, there is provided the pedal device according to the first or second aspect, wherein:

the first guide portion is shaped in a tubular form;
the second guide portion is shaped in a solid columnar form; and
the third guide portion is shaped in a tubular form.

(Fifth Aspect)

According to a fifth aspect, there is provided the pedal device according to the first or second aspect, wherein:

the first guide portion is shaped in a solid columnar form;
the second guide portion is shaped in a tubular form; and
the third guide portion is shaped in a tubular form.

(Sixth Aspect)

According to a sixth aspect, there is provided the pedal device according to the first or second aspect, wherein:

the first guide portion is shaped in a solid columnar form;
the second guide portion is shaped in a tubular form; and
the third guide portion is shaped in a solid columnar form.

(Seventh Aspect)

According to a seventh aspect, there is provided the pedal device according to the first or second aspect, wherein:

the second holder further includes a fourth guide portion that extends in the deforming direction of the second resilient member;
the first guide portion is shaped in a tubular form;
the second guide portion is shaped in a solid columnar form;
the fourth guide portion is shaped in a tubular form; and
the third guide portion is shaped in a solid columnar form and is configured to slide relative to the fourth guide portion in the deforming direction of the second resilient member.

(Eighth Aspect)

According to an eighth aspect, there is provided the pedal device according to the first or second aspect, wherein:

the second holder further includes a fourth guide portion that extends in the deforming direction of the second resilient member;
the first guide portion is shaped in a solid columnar form;
the second guide portion is shaped in a tubular form;
the fourth guide portion is shaped in a solid columnar form; and
the third guide portion is shaped in a tubular form and is configured to slide relative to the fourth guide portion in the deforming direction of the second resilient member.

(Ninth Aspect)

According to a ninth aspect, there is provided the pedal device according to the first or second aspect, wherein:

the second holder further includes a fourth guide portion that extends in the deforming direction of the second resilient member;
the first guide portion is shaped in a tubular form;
the second guide portion is shaped in a tubular form;
the fourth guide portion is shaped in a tubular form; and
the third guide portion is shaped in a solid columnar form and is configured to slide relative to the fourth guide portion in the deforming direction of the second resilient member.

(Tenth Aspect)

According to a tenth aspect, there is provided the pedal device according to the first or second aspect, wherein:

the second holder further includes a fourth guide portion that extends in the deforming direction of the second resilient member;
the first guide portion is shaped in a tubular form;
the second guide portion is shaped in a solid columnar form;
the fourth guide portion is shaped in a solid columnar form; and
the third guide portion is shaped in a tubular form and is configured to slide relative to the fourth guide portion in the deforming direction of the second resilient member.

(Eleventh Aspect)

According to an eleventh aspect, there is provided the pedal device according to the first or second aspect, wherein:

the second holder further includes a fourth guide portion that extends in the deforming direction of the second resilient member;
the first guide portion is shaped in a solid columnar form;
the second guide portion is shaped in a tubular form; and
the fourth guide portion is shaped in a tubular form; and
the third guide portion is shaped in a solid columnar form and is configured to slide relative to the fourth guide portion in the deforming direction of the second resilient member.

(Twelfth Aspect)

According to a twelfth aspect, there is provided the pedal device according to the first or second aspect, wherein:

the second holder further includes a fourth guide portion that extends in the deforming direction of the second resilient member;
the first guide portion is shaped in a solid columnar form;
the second guide portion is shaped in a tubular form;
the fourth guide portion is shaped in a tubular form; and
the third guide portion is shaped in a tubular form and is configured to slide relative to the fourth guide portion in the deforming direction of the second resilient member.

(Thirteenth Aspect)

According to a thirteenth aspect, there is provided the pedal device according to the first or second aspect, wherein:

the second holder further includes a fourth guide portion that extends in the deforming direction of the second resilient member;
the first guide portion is shaped in a tubular form;
the second guide portion is shaped in a solid columnar form;
the fourth guide portion is shaped in a tubular form; and
the third guide portion is shaped in a tubular form and is configured to slide relative to the fourth guide portion in the deforming direction of the second resilient member.

(Fourteenth Aspect)

According to a fourteenth aspect, there is provided, the pedal device according to the first or second aspect, wherein:

the second holder further includes a fourth guide portion that extends in the deforming direction of the second resilient member;
the first guide portion is shaped in a tubular form;
the second guide portion is shaped in a tubular form;
the fourth guide portion is shaped in a solid columnar form; and
the third guide portion is shaped in a tubular form and is configured to slide relative to the fourth guide portion in the deforming direction of the second resilient member.

(Fifteenth Aspect)

According to a fifteenth aspect, there is provided the pedal device according to the first or second aspect, wherein:

the first guide portion is shaped in a tubular form;
the second guide portion is shaped in a tubular form;
the third guide portion is shaped in a tubular form; and
the third guide portion is configured to slide relative to the second guide portion in the deforming direction of the second resilient member.

(Sixteenth Aspect)

According to a sixteenth aspect, there is provided the pedal device according to the first or second aspect, wherein:

the second holder further includes a fourth guide portion that extends in the deforming direction of the second resilient member;
the first guide portion is shaped in a tubular form;
the second guide portion is shaped in a tubular form;
the fourth guide portion is shaped in a tubular form; and
the third guide portion is shaped in a tubular form and is configured to slide relative to the fourth guide portion in the deforming direction of the second resilient member.

(Seventeenth Aspect)

According to a seventeenth aspect, there is provided the pedal device according to any one of the third to fourteenth aspects, wherein at least one of the solid columnar forms is a solid cylindrical form.

(Eighteenth Aspect)

According to an eighteenth aspect, there is provided the pedal device according to any one of the third to seventeenth aspects, wherein at least one of the tubular forms is a cylindrical tubular form.

(Nineteenth Aspect)

According to a nineteenth aspect, there is provided the pedal device according to any one of the first to eighteenth aspects, wherein each of the deforming direction of the first resilient member and the deforming direction of the second resilient member is a linear direction that is perpendicular to the rotational axis.

(Twentieth Aspect)

According to a twentieth aspect, there is provided the pedal device according to any one of the first to eighteenth aspects, wherein each of the deforming direction of the first resilient member and the deforming direction of the second resilient member is a rotational direction that is centered on an axis extending in an axial direction of the rotational axis.

(Twenty-First Aspect)

According to a twenty-first aspect, there is provided the pedal device according to any one of the first to twentieth aspects, wherein when the second resilient member is projected in a direction perpendicular to the deforming direction of the second resilient member, the second resilient member, as projected, overlaps with the first resilient member.

(Twenty-Second Aspect)

According to a twenty-second aspect, there is provided the pedal device according to any one of the first to twenty-first aspects, wherein:

a space is formed at an inside of the first resilient member; and
the first guide portion is placed at the inside of the first resilient member.

(Twenty-Third Aspect)

According to a twenty-third aspect, there is provided the pedal device according to any one of the first to twenty-first aspects, wherein:

a space is formed at an inside of the first resilient member; and the second guide portion is placed at the inside of the first resilient member.

(Twenty-Fourth Aspect)

According to a twenty-fourth aspect, there is provided the pedal device according to any one of the first to twenty-third aspects, wherein:

a space is formed at an inside of the second resilient member; and the second guide portion is placed at the inside of the second resilient member.

(Twenty-Fifth Aspect)

According to a twenty-fifth aspect, there is provided the pedal device according to any one of the first to twenty-third aspects, wherein:

a space is formed at an inside of the second resilient member; and the third guide portion is placed at the inside of the second resilient member.

(Twenty-Sixth Aspect)

According to a twenty-sixth aspect, there is provided the pedal device according to any one of the first to twenty-fifth aspects, further including a limiting portion that is configured to limit movement of the first resilient member in a direction perpendicular to the deforming direction of the first resilient member.

(Twenty-Seventh Aspect)

According to a twenty-seventh aspect, there is provided the pedal device according to any one of the first to twenty-fifth aspects, further including a limiting portion that is configured to limit movement of the second resilient member in a direction perpendicular to the deforming direction of the second resilient member.

(Twenty-Eighth Aspect)

According to a twenty-eighth aspect, there is provided the pedal device according to any one of the first to twenty-seventh aspects, wherein the first guide portion includes metal.

(Twenty-Ninth Aspect)

According to a twenty-ninth aspect, there is provided the pedal device according to the twenty-eighth aspect, wherein the first support portion includes resin.

(Thirtieth Aspect)

According to a thirtieth aspect, there is provided the pedal device according to the twenty-eighth or twenty-ninth aspect, wherein the second guide portion includes resin.

(Thirty-First Aspect)

According to a thirty-first aspect, there is provided the pedal device according to any one of the first to twenty-seventh aspects, wherein the second guide portion includes metal.

(Thirty-Second Aspect)

According to a thirty-second aspect, there is provided the pedal device according to the thirty-first aspect, wherein the second support portion includes resin.

(Thirty-Third Aspect)

According to a thirty-third aspect, there is provided the pedal device according to any one of the first to twenty-seventh aspects, wherein the third guide portion includes metal.

(Thirty-Fourth Aspect)

According to a thirty-fourth aspect, there is provided the pedal device according to the thirty-third aspect, wherein the fourth support portion includes resin.

(Thirty-Fifth Aspect)

According to a thirty-fifth aspect, there is provided the pedal device according to the thirty-second or thirty-third aspect, wherein the second holder includes resin.

(Thirty-Sixth Aspect)

According to a thirty-sixth aspect, there is provided the pedal device according to any one of the first to thirty-fifth aspects, wherein each of the first resilient member and the second resilient member is a coil spring.

(Thirty-Seventh Aspect)

According to a thirty-seventh aspect, there is provided the pedal device according to any one of the first to thirty-sixth aspects, wherein the pedal is a brake pedal used at a vehicle.

(Thirty-Eighth Aspect)

According to a thirty-eighth aspect, there is provided the pedal device according to the thirty-seventh aspect, further including an opposing portion that is opposed to the second holder in the deforming direction of the second resilient member, wherein:

the first holder is opposed to the second holder in the deforming direction of the first resilient member and is configured to be moved toward the second holder by the force applied from the pedal at the time of rotating the pedal;

the second holder is configured to be moved toward the opposing portion by the force applied from the pedal at the time of rotating the pedal;

a first distance is defined as a moving distance of the first holder from a position at a time of starting to press the pedal by the operator to a position where the first holder and the second holder contact each other in the deforming direction of the first resilient member;

a second distance is defined as a moving distance of the second holder from a position at the time of starting to press the pedal by the operator to a position where the second holder contacts the opposing portion in the deforming direction of the second resilient member;

in a state where the second holder and the third guide portion are fixed to each other, when the first holder moves the first distance, an absolute value of an amount of speed reduction of the vehicle becomes equal to or larger than a first threshold value, thereby stopping the vehicle; and in a state where the first guide portion and the second guide portion are fixed to each other, when the second holder moves the second distance, the absolute value of the amount of speed reduction of the vehicle becomes equal to or larger than a second threshold value, thereby stopping the vehicle.

(Thirty-Ninth Aspect)

According to a thirty-ninth aspect, there is provided the pedal device according to the third or fifteenth aspect, wherein when a sliding portion between the first guide portion and the second guide portion is projected in a direction perpendicular to the deforming direction of the first resilient member, the sliding portion between the first guide portion and the second guide portion, as projected, does not overlap with and is spaced from a sliding portion between the second holder and the third guide portion.

(Fortieth Aspect)

According to a fortieth aspect, there is provided the pedal device according to the fourth or fifth aspect, wherein when a sliding portion between the first guide portion and the second guide portion is projected in a direction perpendicular to the deforming direction of the first resilient member, the sliding portion between the first guide portion and the second guide portion, as projected, overlaps with a sliding portion between the second holder and the third guide portion.

(Forty-First Aspect)

According to a forty-first aspect, there is provided the pedal device according to any one of the ninth, twelfth, thirteenth, fourteenth and sixteenth aspects, wherein when a sliding portion between the first guide portion and the second guide portion is projected in a direction perpendicular to the deforming direction of the first resilient member, the sliding portion between the first guide portion and the second guide portion, as projected, overlaps with a sliding portion between the fourth guide portion and the third guide portion.

What is claimed is:

1. A pedal device comprising:
   a pedal that is configured to rotate about a rotational axis when the pedal is pressed by an operator;
   a first resilient member that is configured to generate a reaction force against a pedal force applied from the operator to the pedal through deformation of the first resilient member in response to application of a force from the pedal to the first resilient member at a time of rotating the pedal;

a second resilient member that is configured to generate a reaction force against the pedal force applied from the operator to the pedal through deformation of the second resilient member in response to the application of the force from the pedal to the second resilient member at the time of rotating the pedal;

a first holder that includes a first support portion, which is placed adjacent to the pedal and supports one end part of the first resilient member, and a first guide portion, which extends from the first support portion in a deforming direction of the first resilient member, wherein the deforming direction of the first resilient member is defined as a direction in which the first resilient member is configured to deform;

a second holder that includes a second support portion, which supports another end part of the first resilient member opposite to the one end part of the first resilient member, a second guide portion which extends from the second support portion in the deforming direction of the first resilient member, and a third support portion that supports one end part of the second resilient member;

a fourth support portion that supports another end part of the second resilient member opposite to the one end part of the second resilient member; and a third guide portion that extends from the fourth support portion in a deforming direction of the second resilient member, wherein the deforming direction of the second resilient member is defined as a direction in which the second resilient member is configured to deform, wherein:

the force applied from the pedal at the time of rotating the pedal moves the first guide portion in the deforming direction of the first resilient member to execute a relative movement of the first guide portion relative to the second guide portion, thereby causing the first guide portion to slide relative to the second guide portion in the deforming direction of the first resilient member, and resulting in the deformation of the first resilient member;

the force applied from the pedal at the time of rotating the pedal moves the second holder in the deforming direction of the second resilient member to execute a relative movement of the second holder relative to the third guide portion, thereby causing the second holder to slide relative to the third guide portion in the deforming direction of the second resilient member, and resulting in the deformation of the second resilient member; and the third guide portion and the fourth support portion are fixed and are therefore nonrotatable.

2. The pedal device according to claim 1, wherein:
the first guide portion and the second guide portion are configured to slide relative to each other in the deforming direction of the first resilient member at a time when the second holder and the third guide portion are fixed to each other; and
the second holder and the third guide portion are configured to slide relative to each other in the deforming direction of the second resilient member at a time when the first guide portion and the second guide portion are fixed to each other.

3. The pedal device according to claim 1, wherein:
the first guide portion is shaped in a tubular form;
the second guide portion is shaped in a tubular form; and
the third guide portion is shaped in a solid columnar form.

4. The pedal device according to claim 3, wherein the solid columnar form is a solid cylindrical form.

5. The pedal device according to claim 3, wherein at least one of the tubular forms is a cylindrical tubular form.

6. The pedal device according to claim 3, wherein when a sliding portion between the first guide portion and the second guide portion is projected in a direction perpendicular to the deforming direction of the first resilient member, the sliding portion between the first guide portion and the second guide portion, as projected, does not overlap with and is spaced from a sliding portion between the second holder and the third guide portion.

7. The pedal device according to claim 1, wherein:
the first guide portion is shaped in a tubular form;
the second guide portion is shaped in a solid columnar form; and
the third guide portion is shaped in a tubular form.

8. The pedal device according to claim 7, wherein when a sliding portion between the first guide portion and the second guide portion is projected in a direction perpendicular to the deforming direction of the first resilient member, the sliding portion between the first guide portion and the second guide portion, as projected, overlaps with a sliding portion between the second holder and the third guide portion.

9. The pedal device according to claim 1, wherein:
the first guide portion is shaped in a solid columnar form;
the second guide portion is shaped in a tubular form; and
the third guide portion is shaped in a tubular form.

10. The pedal device according to claim 1, wherein:
the first guide portion is shaped in a solid columnar form;
the second guide portion is shaped in a tubular form; and
the third guide portion is shaped in a solid columnar form.

11. The pedal device according to claim 1, wherein:
the second holder further includes a fourth guide portion that extends in the deforming direction of the second resilient member;
the first guide portion is shaped in a tubular form;
the second guide portion is shaped in a solid columnar form;
the fourth guide portion is shaped in a tubular form; and
the third guide portion is shaped in a solid columnar form and is configured to slide relative to the fourth guide portion in the deforming direction of the second resilient member.

12. The pedal device according to claim 1, wherein:
the second holder further includes a fourth guide portion that extends in the deforming direction of the second resilient member;
the first guide portion is shaped in a solid columnar form;
the second guide portion is shaped in a tubular form;
the fourth guide portion is shaped in a solid columnar form; and
the third guide portion is shaped in a tubular form and is configured to slide relative to the fourth guide portion in the deforming direction of the second resilient member.

13. The pedal device according to claim 1, wherein:
the second holder further includes a fourth guide portion that extends in the deforming direction of the second resilient member;
the first guide portion is shaped in a tubular form;
the second guide portion is shaped in a tubular form;
the fourth guide portion is shaped in a tubular form; and the third guide portion is shaped in a solid columnar form and is configured to slide relative to the fourth guide portion in the deforming direction of the second resilient member.

14. The pedal device according to claim 13, wherein when a sliding portion between the first guide portion and the second guide portion is projected in a direction perpendicular to the deforming direction of the first resilient member, the sliding portion between the first guide portion and the second guide portion, as projected, overlaps with a sliding portion between the fourth guide portion and the third guide portion.

15. The pedal device according to claim 1, wherein:
the second holder further includes a fourth guide portion that extends in the deforming direction of the second resilient member;
the first guide portion is shaped in a tubular form;
the second guide portion is shaped in a solid columnar form;
the fourth guide portion is shaped in a solid columnar form; and
the third guide portion is shaped in a tubular form and is configured to slide relative to the fourth guide portion in the deforming direction of the second resilient member.

16. The pedal device according to claim 1, wherein:
the second holder further includes a fourth guide portion that extends in the deforming direction of the second resilient member;
the first guide portion is shaped in a solid columnar form;
the second guide portion is shaped in a tubular form; and
the fourth guide portion is shaped in a tubular form; and
the third guide portion is shaped in a solid columnar form and is configured to slide relative to the fourth guide portion in the deforming direction of the second resilient member.

17. The pedal device according to claim 1, wherein:
the second holder further includes a fourth guide portion that extends in the deforming direction of the second resilient member;
the first guide portion is shaped in a solid columnar form;
the second guide portion is shaped in a tubular form;
the fourth guide portion is shaped in a tubular form; and
the third guide portion is shaped in a tubular form and is configured to slide relative to the fourth guide portion in the deforming direction of the second resilient member.

18. The pedal device according to claim 1, wherein:
the second holder further includes a fourth guide portion that extends in the deforming direction of the second resilient member;
the first guide portion is shaped in a tubular form;
the second guide portion is shaped in a solid columnar form;
the fourth guide portion is shaped in a tubular form; and
the third guide portion is shaped in a tubular form and is configured to slide relative to the fourth guide portion in the deforming direction of the second resilient member.

19. The pedal device according to claim 1, wherein:
the second holder further includes a fourth guide portion that extends in the deforming direction of the second resilient member;
the first guide portion is shaped in a tubular form;
the second guide portion is shaped in a tubular form;
the fourth guide portion is shaped in a solid columnar form; and
the third guide portion is shaped in a tubular form and is configured to slide relative to the fourth guide portion in the deforming direction of the second resilient member.

20. The pedal device according to claim 1, wherein:
the first guide portion is shaped in a tubular form;
the second guide portion is shaped in a tubular form;
the third guide portion is shaped in a tubular form; and
the third guide portion is configured to slide relative to the second guide portion in the deforming direction of the second resilient member.

21. The pedal device according to claim 1, wherein:
the second holder further includes a fourth guide portion that extends in the deforming direction of the second resilient member;
the first guide portion is shaped in a tubular form;
the second guide portion is shaped in a tubular form;
the fourth guide portion is shaped in a tubular form; and
the third guide portion is shaped in a tubular form and is configured to slide relative to the fourth guide portion in the deforming direction of the second resilient member.

22. The pedal device according to claim 1, wherein each of the deforming direction of the first resilient member and the deforming direction of the second resilient member is a linear direction that is perpendicular to the rotational axis.

23. The pedal device according to claim 1, wherein each of the deforming direction of the first resilient member and the deforming direction of the second resilient member is a rotational direction that is centered on an axis extending in an axial direction of the rotational axis.

24. The pedal device according to claim 1, wherein when the second resilient member is projected in a direction perpendicular to the deforming direction of the second resilient member, the second resilient member, as projected, overlaps with the first resilient member.

25. The pedal device according to claim 1, wherein:
a space is formed at an inside of the first resilient member; and
the first guide portion is placed at the inside of the first resilient member.

26. The pedal device according to claim 1, wherein:
a space is formed at an inside of the first resilient member; and
the second guide portion is placed at the inside of the first resilient member.

27. The pedal device according to claim 1, wherein:
a space is formed at an inside of the second resilient member; and
the second guide portion is placed at the inside of the second resilient member.

28. The pedal device according to claim 1, wherein:
a space is formed at an inside of the second resilient member; and
the third guide portion is placed at the inside of the second resilient member.

29. The pedal device according to claim 1, further comprising a limiting portion that is configured to limit movement of the first resilient member in a direction perpendicular to the deforming direction of the first resilient member.

30. The pedal device according to claim 1, further comprising a limiting portion that is configured to limit movement of the second resilient member in a direction perpendicular to the deforming direction of the second resilient member.

31. The pedal device according to claim 1, wherein the first guide portion includes metal.

32. The pedal device according to claim 31, wherein the first support portion includes resin.

33. The pedal device according to claim 31, wherein the second guide portion includes resin.

34. The pedal device according to claim 1, wherein the second guide portion includes metal.

35. The pedal device according to claim 34, wherein the second support portion includes resin.

36. The pedal device according to claim 1, wherein the third guide portion includes metal.

37. The pedal device according to claim 36, wherein the fourth support portion includes resin.

38. The pedal device according to claim 35, wherein the second holder includes resin.

39. The pedal device according to claim 1, wherein each of the first resilient member and the second resilient member is a coil spring.

40. The pedal device according to claim 1, wherein the pedal is a brake pedal used at a vehicle.

41. The pedal device according to claim 40, further comprising an opposing portion that is opposed to the second holder in the deforming direction of the second resilient member, wherein:

the first holder is opposed to the second holder in the deforming direction of the first resilient member and is configured to be moved toward the second holder by the force applied from the pedal at the time of rotating the pedal;

the second holder is configured to be moved toward the opposing portion by the force applied from the pedal at the time of rotating the pedal;

a first distance is defined as a moving distance of the first holder from a position at a time of starting to press the pedal by the operator to a position where the first holder and the second holder contact each other in the deforming direction of the first resilient member;

a second distance is defined as a moving distance of the second holder from a position at the time of starting to press the pedal by the operator to a position where the second holder contacts the opposing portion in the deforming direction of the second resilient member;

in a state where the second holder and the third guide portion are fixed to each other, when the first holder moves the first distance, an absolute value of an amount of speed reduction of the vehicle becomes equal to or larger than a first threshold value, thereby stopping the vehicle; and in a state where the first guide portion and the second guide portion are fixed to each other, when the second holder moves the second distance, the absolute value of the amount of speed reduction of the vehicle becomes equal to or larger than a second threshold value, thereby stopping the vehicle.

\* \* \* \* \*